United States Patent [19]

Inoue

[11] Patent Number: 5,867,473
[45] Date of Patent: Feb. 2, 1999

[54] DISK PLAYBACK WITH CLAMPING MECHANISM AND MISALIGNMENT DETECTOR

[75] Inventor: Yoshihisa Inoue, Saitama, Japan

[73] Assignee: Nakamichi Corporation, Japan

[21] Appl. No.: 611,526

[22] Filed: Mar. 5, 1996

[30] Foreign Application Priority Data

Mar. 5, 1995 [JP] Japan .................................. 7-072288

[51] Int. Cl.⁶ .................................................. G11B 17/022
[52] U.S. Cl. ........................................................ 369/271
[58] Field of Search .................................... 369/270–271, 369/75.2, 77.1, 77.2; 360/99.06, 99.07, 99.02–99.03

[56] References Cited

U.S. PATENT DOCUMENTS

| | | | |
|---|---|---|---|
| 4,682,320 | 7/1987 | Alayer de Costemore d'Arc . | 369/77.1 |
| 4,901,172 | 2/1990 | Nakazawa et al. ................... | 360/99.06 |
| 4,979,161 | 12/1990 | Verhagen ............................... | 369/77.2 |
| 5,001,700 | 3/1991 | Rowden et al. ......................... | 369/270 |
| 5,031,169 | 7/1991 | Kato et al. .............................. | 369/271 |
| 5,142,523 | 8/1992 | Kamoshita .............................. | 369/271 |

FOREIGN PATENT DOCUMENTS

| | | |
|---|---|---|
| 0558302 | 9/1993 | European Pat. Off. . |
| 0708441 | 4/1996 | European Pat. Off. . |
| 2538597 | 6/1984 | France . |
| 2909-099 | 9/1980 | Germany ............................... 369/271 |
| 4134241 | 4/1993 | Germany . |
| 60-106250 | 7/1985 | Japan ..................................... 369/77.2 |
| 62-47893 | 3/1987 | Japan ..................................... 369/270 |
| 2227866 | 9/1990 | Japan . |
| 4013265 | 1/1992 | Japan . |
| 544918 | 11/1993 | Japan . |

*Primary Examiner*—Brian E. Miller
*Attorney, Agent, or Firm*—Morrison Law Firm

[57] ABSTRACT

A disk playback device holds a disk in a playback position. A turntable moves toward the disk to a raised position where its support surface is adjacent a back of the disk. A spindle inserts through a center hole of the disk to align the disk with the turntable. A clamper is held above the disk on a side of the disk opposite the turntable. The clamper is supported close enough to the disk that when the turntable is in the raised position, a magnet in the turntable exerts a substantial force on a piece of ferromagnetic material in the clamper. When the clamper is released it clamps the disk to the turntable. By bringing the clamper and turntable to the disk rather than moving the disk toward one or the other, no space is required for the displacement of the disk in a direction perpendicular to its surface. The clamper is supported by a pair of holders, slidable in a direction parallel to the surface of the disk. Wedge-shaped surfaces on the holders engage a flange on top of the clamper to lift and hold the clamper above the disk. If a disk is misaligned with the spindle when the turntable is brought to the raised position, the disk is pressed against the clamper. The clamper in turn presses against inclined surfaces of the holders causing the holders to spread apart. The spreading is detected to invoke a control routine to correct the misalignment.

3 Claims, 84 Drawing Sheets ed ABDISK PLAYBACK WITH CLAMPING MECHANISM AND MISALIGNMENT DETECTOR

BACKGROUND OF THE INVENTION

The present invention relates to a recorded disk playback device, such as a CD player, and specifically to such a device as employs a clamper to clamp the disk onto a turntable.

Disk players that employ a turntable to rotate recorded disks for playback are known. Some known devices transport the disk to a playback position and then lift the disk out of its support, for example a tray, toward a rotatable clamp. The clamp has a magnet that is attracted to the turntable surface. The turntable continues to move upward, carrying the disk off its support (eg. surface of the tray), until it is close enough to cause the clamp to settle against the disk, thereby securing it to the turntable. This moves the disk away from the mounting surface of the tray, and the magnet arranged in the clamper is attracted to the turntable. In this way the disk is clamped between the turntable and the clamp so that the turntable can rotate the disk.

One problem with the type of device described above is that a substantial amount of space is required to permit the disk to move upward perpendicular to its surface. Since compactness is usually an important design goal for such devices, this space requirement is undesirable. For example, to make a CD player for a computer that fits into the standard form factor for peripherals, space is difficult to find. Any refinements to avoid the space requirement, such as by keeping the disk in place and moving the clamping elements toward it, would add complexity and cost to the design as well as introduce additional space requirements.

OBJECT AND SUMMARY OF THE INVENTION

It is an object of the invention is to overcome the drawbacks of the prior art.

It is an object of the invention to provide a disk player that is compact.

It is an object of the invention to provide a disk player that can be manufactured for a low cost.

It is an object of the invention to provide a disk player in which a disk does not need to be displaced in a direction perpendicular to its surface to clamp the disk to a turntable.

Briefly, a disk playback device holds a disk in a playback position. A turntable moves toward the disk to a raised position where its support surface is adjacent a back of the disk. A spindle inserts through a center hole of the disk to align the disk with the turntable. A clamper is held above the disk on a side of the disk opposite the turntable. The clamper is supported close enough to the disk that when the turntable is in the raised position, a magnet in the turntable exerts a substantial force on a piece of ferromagnetic material in the clamper. When the clamper is released it clamps the disk to the turntable. By bringing the clamper and turntable to the disk rather than moving the disk toward one or the other, no space is required for the displacement of the disk in a direction perpendicular to its surface. The clamper is supported by a pair of holders, slidable in a direction parallel to the surface of the disk. Wedge-shaped surfaces on the holders engage a flange on top of the clamper to lift and hold the clamper above the disk. If a disk is misaligned with the spindle when the turntable is brought to the raised position, the disk is pressed against the clamper. The clamper in turn presses against inclined surfaces of the holders causing the holders to spread apart. The spreading is detected to invoke a control routine to correct the misalignment. The features of the clamping mechanism avoid the need for vertical movement for the recording surface of the disk during the clamping operation. Also, clamper movement is effected merely by releasing the support for the clamper. This helps to make the device more compact, and less expensive to manufacture.

According to an embodiment of the present invention, there is described, a disk player, comprising: a chassis having a playback position in fixed relation thereto, means, connected to the chassis, for supporting a disk in the playback position, means for releasing the disk in the playback position, whereby the disk is unsupported by the means for supporting, a turntable, connected to the chassis so that the turntable is movable in a first direction toward the disk in the playback position, first means for moving the turntable in the first direction toward the disk in the playback position, a clamper, for pressing the disk against the turntable, movably connected to the chassis and second means for moving the clamper toward the disk in the playback position in a direction opposite the first direction.

According to another embodiment of the present invention, there is described, a disk playback device for playing back a disk, comprising: a chassis, the disk having a recording surface and a back surface, a supported in a disk in a playback position of the disk playback device, the disk being in an orientation in which the recording surface faces in a first direction, the playback position being in fixed relation to the chassis, a turntable, movably connected to the chassis, having a support surface, means for holding the turntable in a first position toward which the back surface faces when the disk is supported in the playback position, means for moving the turntable in the first direction to a second position whereat the support surface contacts the back surface, a clamper having a clamping surface, means for supporting the clamper so that the first surface is held away from the recording surface and means for moving the clamper toward the recording surface and urging the clamper surface against the recording surface when the turntable is in the second position, whereby the disk is frictionally engaged with the turntable surface.

According to still another embodiment of the present invention, there is described, a disk playback device, comprising: a turntable having a disk mounted thereon, a clamper, on a side of the disk opposite the turntable, for clamping the disk to the turntable, supporting means for supporting the clamper at a first position away from the disk prior to a clamping of the disk and the supporting means including means for releasing the clamper, whereby the clamper is freed to move toward the disk.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
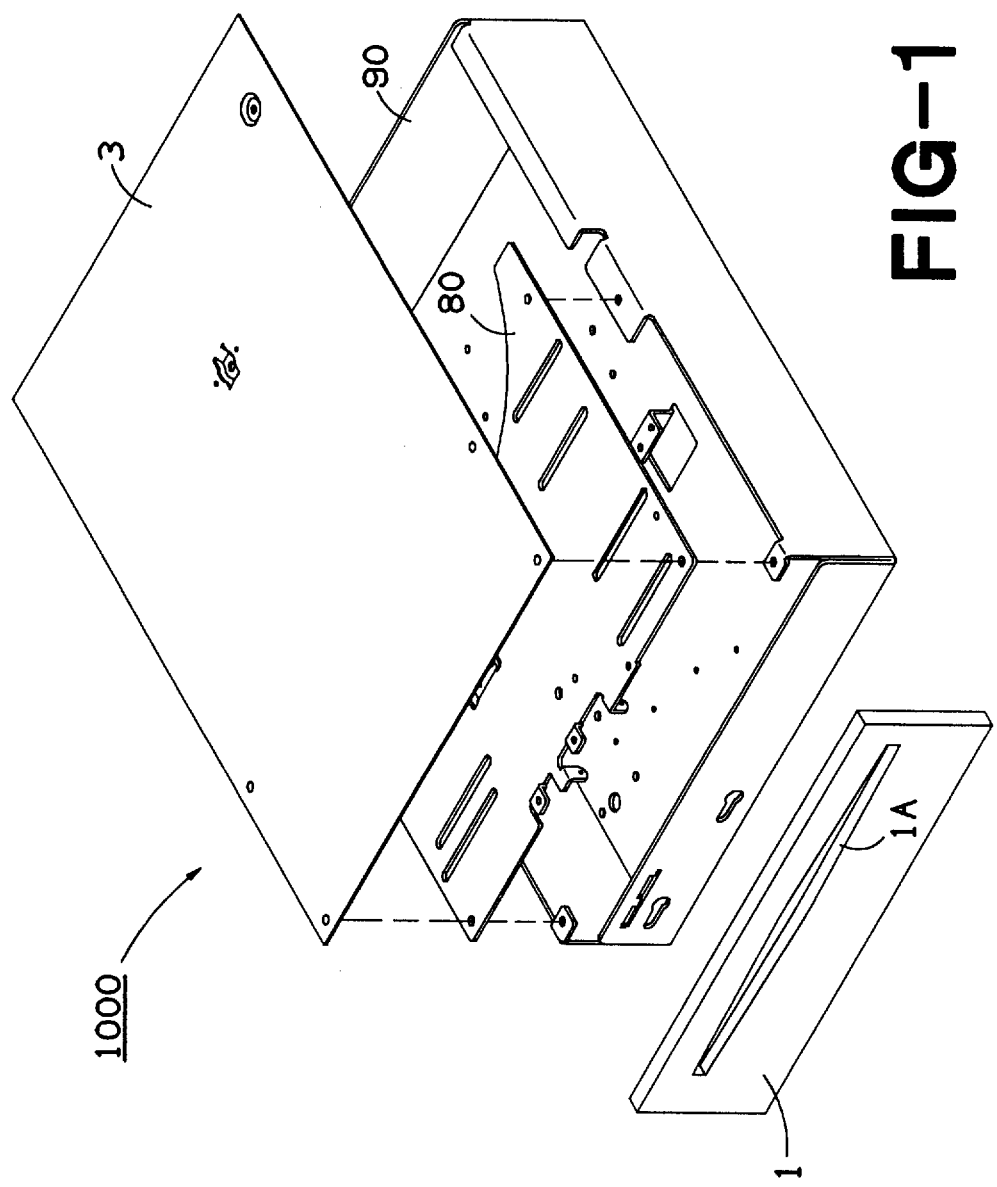
FIG. 1 is an exploded view of a main chassis of a disk player.

Referring to FIG. 1, a housing 1000 of a disk player conforms to standard dimensions for computer peripherals having a 5¼ inch half-height form factor. Housing 1000 has outer dimensions, 41.5 mm height×146 mm width×209 mm depth. The disk player includes a disk changer that stores four Cds for selective playback. Housing 1000 is generally box-shaped with four sides, a lower panel, and a top cover 3. A loading chassis 80 is attached to integral mounting brackets of two sides of main chassis 90 between top cover 3 and the lower panel of main chassis 90. Top cover 3 may be omitted when the disk player is mounted on a front panel of a computer (not shown in the drawings).

A front panel 1 is attached to a front one of the four sides of main chassis 90. Front panel 1 has an insertion aperture 1A for receiving and ejecting disks. Insertion aperture 1A is wider toward its center than at its ends. The shape of insertion aperture 1A insures that only the edges of disks contact front panel 1 when disks are inserted and removed. Therefore, recording surfaces of disks are prevented from contacting front panel 1, eliminating a potential cause of damage to disks during insertion and removal.

Figure 2:
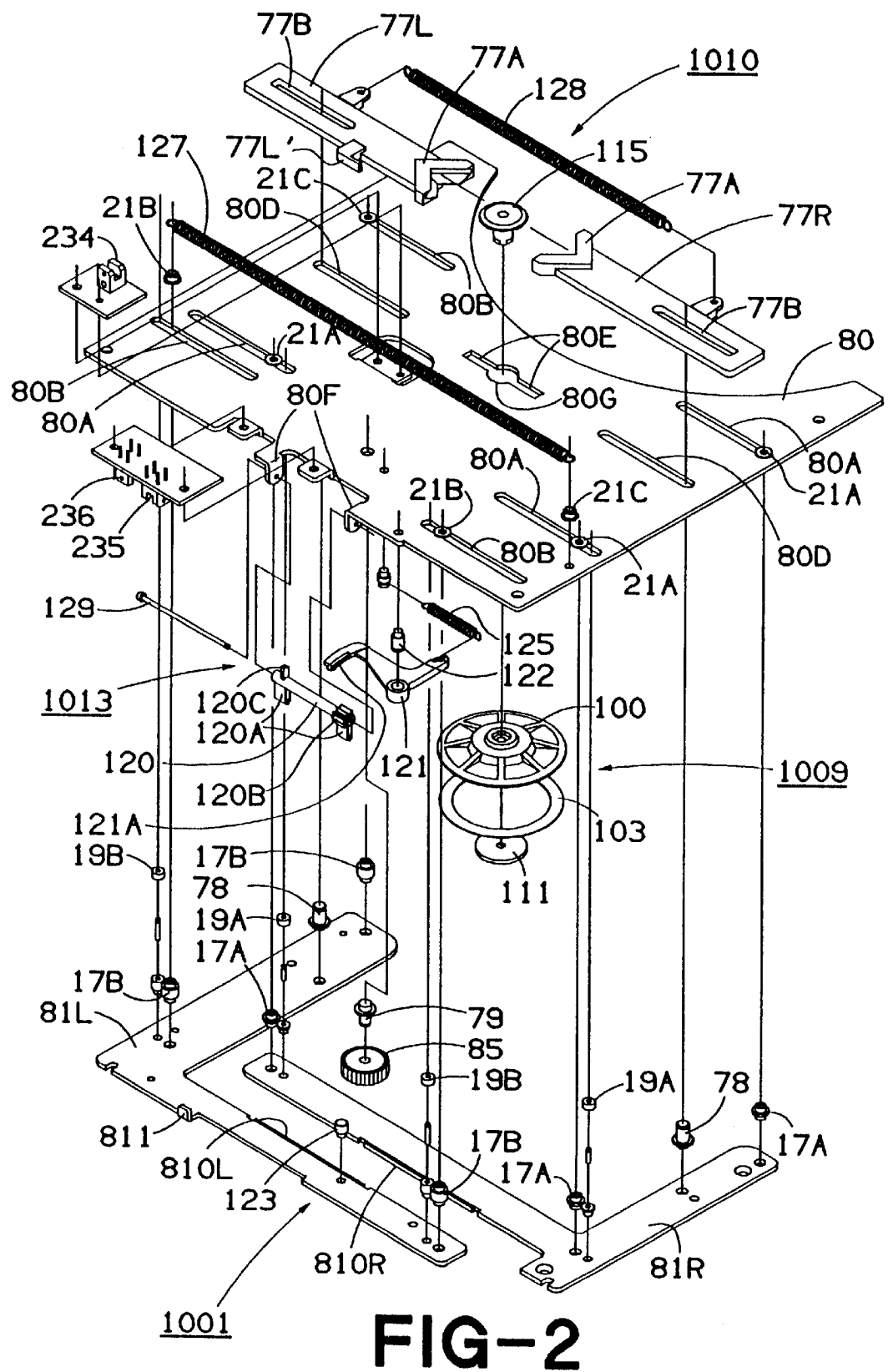
FIG. 2 is an exploded view of a support mechanism of a disk transfer mechanism, a clamper support mechanism, a disk clamper, and a disk lock mechanism, all attached to a loading chassis 80 of the main chassis of FIG. 1.
Figure 3:
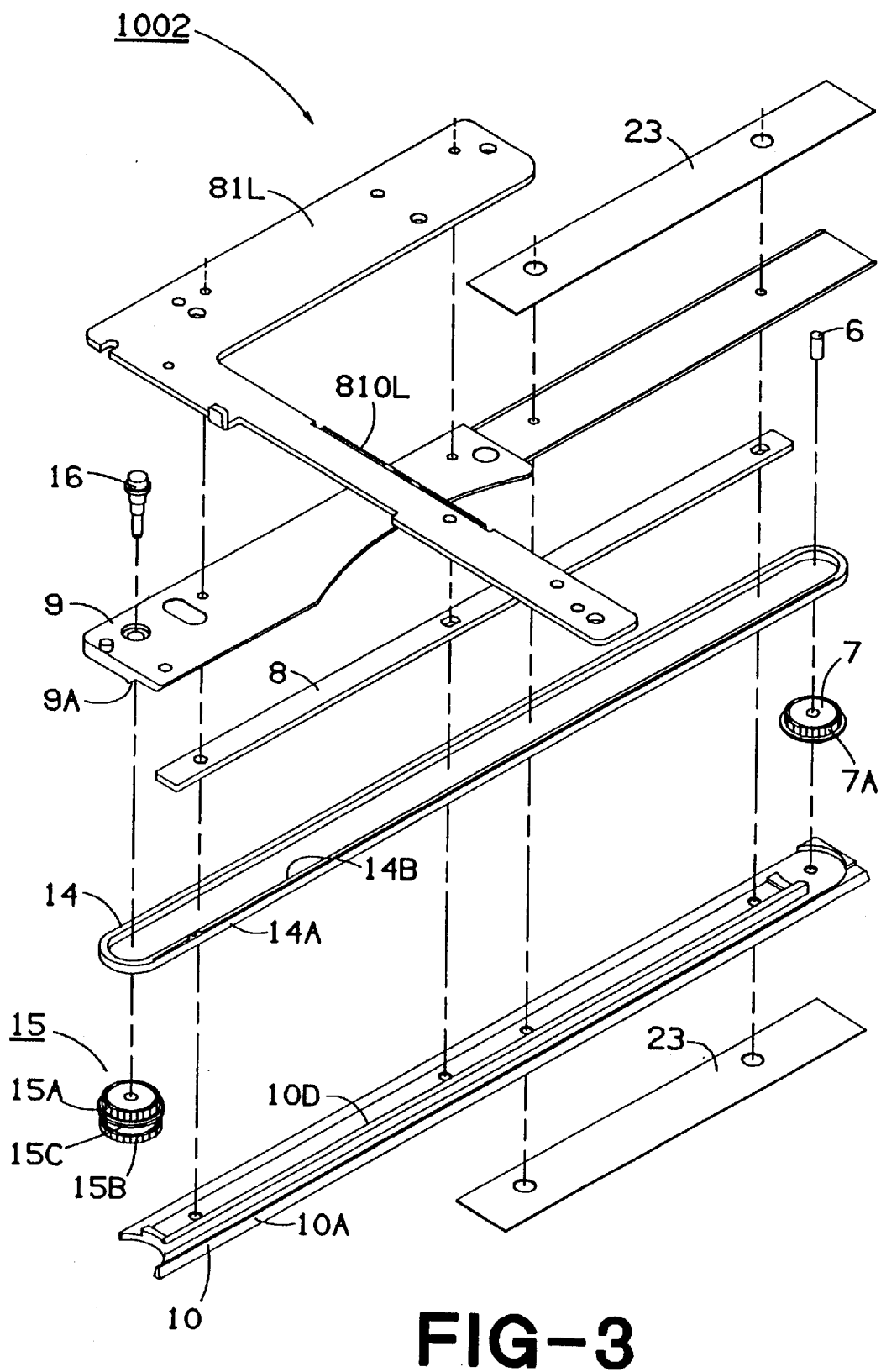
FIG. 3 is an exploded view of a drive-side disk guide of the disk transfer mechanism of FIG. 2.
Figure 4:
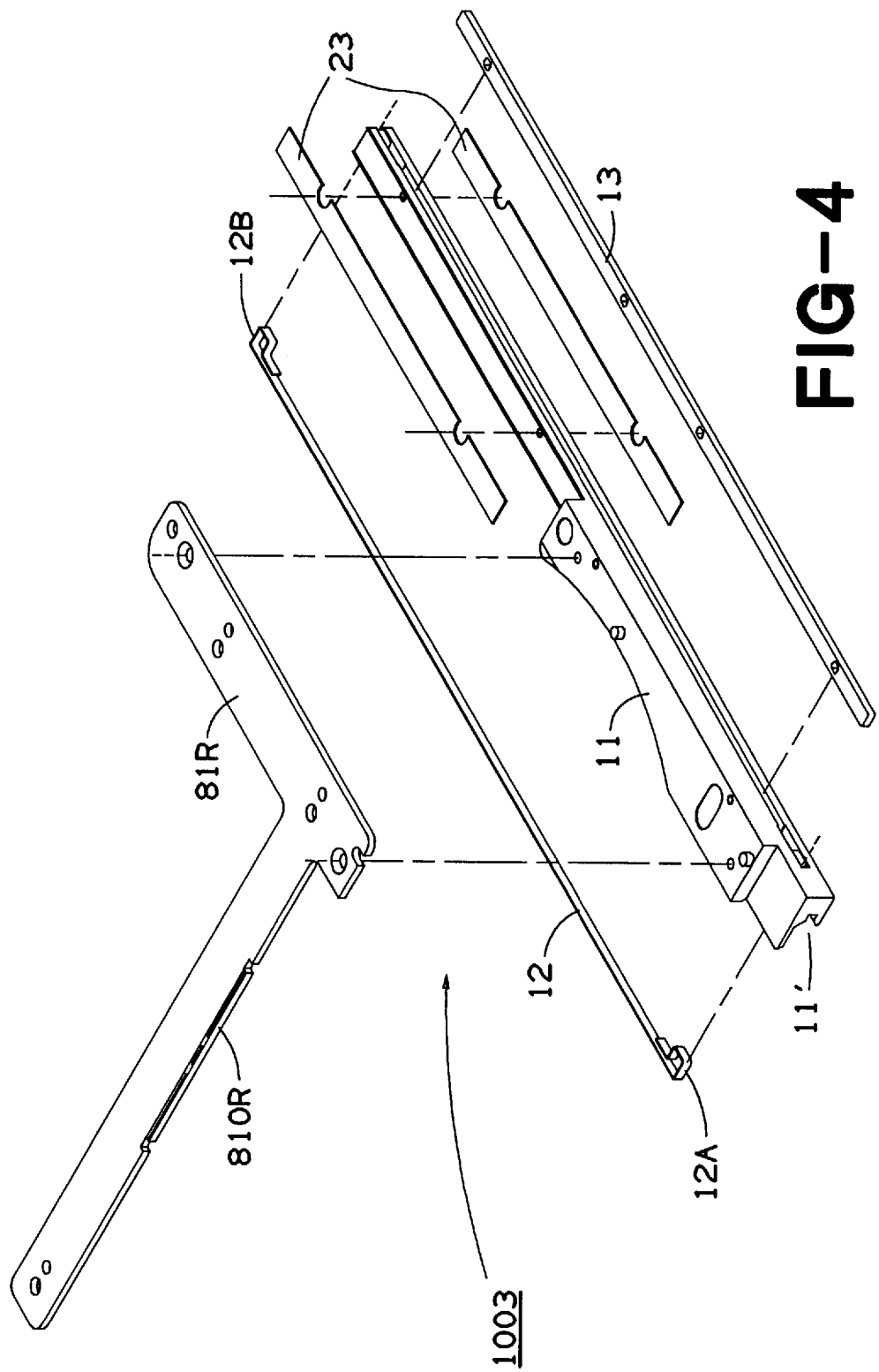
FIG. 4 is an exploded view of a fixed disk guide of the disk transfer mechanism of FIG. 2.

Referring to FIGS. 2–4, a disk transfer mechanism 1001 includes a drive-side disk guide 1002, slidably mounted on a lower side of loading chassis 80 on a left side of housing 1000. A fixed-side disk guide 1003 is slidably mounted on the lower side of loading chassis 80 toward a right side of housing 1000. L-shaped loading plates 81L and 81R hang on support pins 17A and 17B attached to their upper surfaces, respectively. Support pins 17A and 17B pass through respective transverse guide grooves 80A and 80B in loading chassis 80. Rings 21A and 21B, at ends of support pins 17A and 17B, respectively, prevent support pins 17A and 17B from slipping out of guide grooves 80A and 80B. Fixed and drive-side disk guides 1003 and 1002 attach to L-shaped loading plates 81R and 81L, respectively, thereby permitting fixed and drive-side disk guides 1003 and 1002, move transversely on the bottom of loading chassis 80.

Guide rollers 19A and 19B, rotatably mounted on upper surfaces of loading plates 81L and 81R, travel in guide grooves 80A, 80B in loading chassis 80. Guide rollers 19A, 19B fit closely within guide grooves 80A, 80B. Thus, guide rollers 19A and 19B insure accurate alignment of loading plates 81L and 81R throughout their respective ranges of movement. Support pins 17A are shorter than support pins 17B so that loading plate 81R is guided at a position closer to loading chassis 80 than loading plate 81L, permitting loading plates 81L and 81R to overlap.

Respective opposing sides of loading plates 81L and 81R have integral racks 810L and 810R. A pinion gear 85, which rotates on the bottom surface of loading chassis 80, engages with racks 810L and 810R. When loading plate 81L moves laterally, pinion gear 85 rotates in a direction that forces loading plate 81R to move an equal distance in the opposite direction of loading plate 81L. A spring 127 strung between a ring 21B on an upper portion of support pin 17B of loading plate 81L and pin 21C on an upper surface of loading chassis 80, urges loading plates 81L and 81R toward each other.

Figure 65:
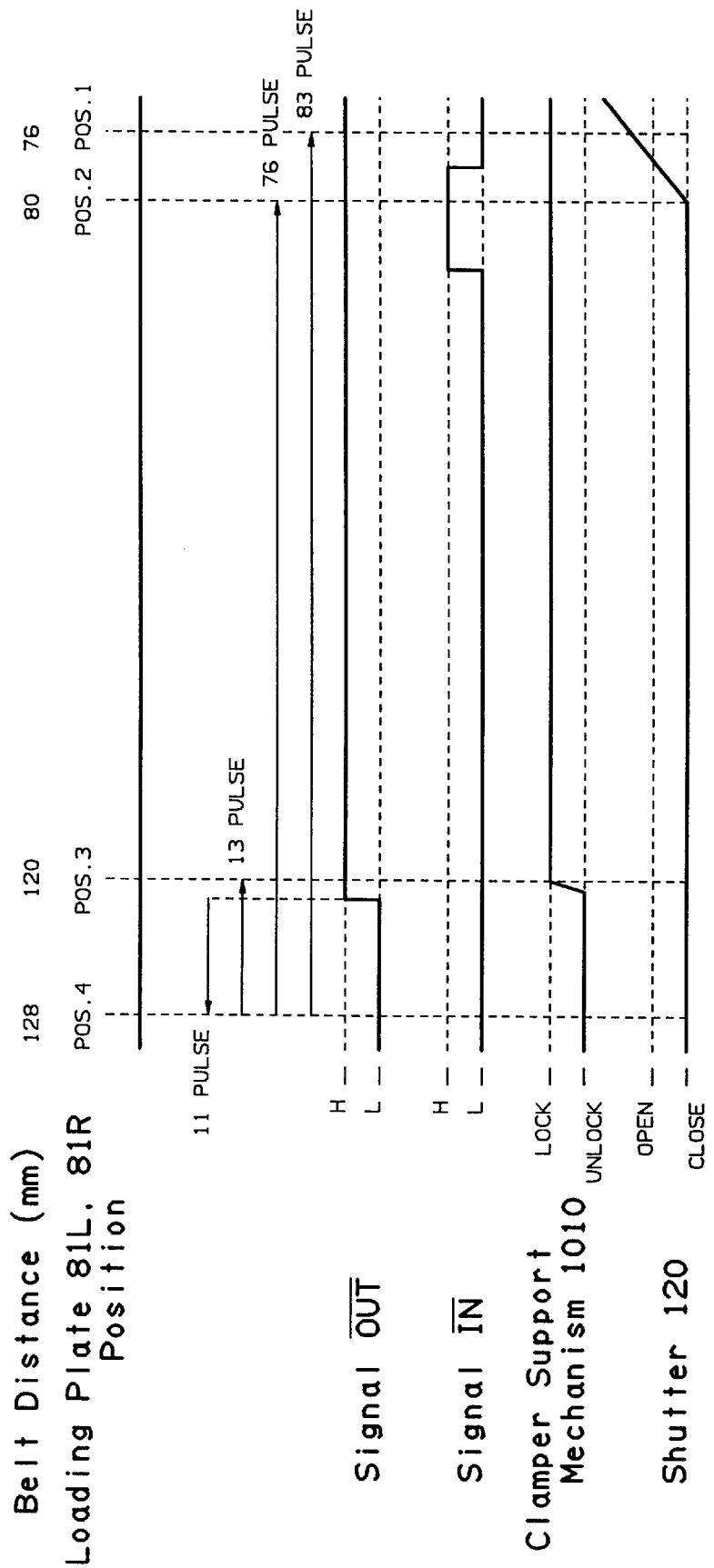
FIG. 65 is a timing chart indicating the relative states of the loading plates, the clamper support mechanism, the flap closure and signals used for transporting a disk into the disk player.

A bent portion of loading plate 81L forms an integral shutter piece 81I in loading plate 81L toward the front of housing 1000. Shutter piece 81I interrupts a light beam generated, and detected, by an optical sensor 236 on the front end of loading chassis 80. Disks are supported between fixed and drive-side disk guides 1003 and 1002. Thus, the mutual spacing of fixed and drive-side disk guides 1003 and 1002 is determined by the width of the disk they support. Optical sensor 236 is positioned so that the light beam is broken when a disk of a certain size is supported between timing and friction belts 14 and 12 respectively. Referring also to FIG. 65, a signal $\overline{IN}$, which is output by optical sensor 236, goes high (H) when the size of an inserted disk is between 78 and 84 mm, which corresponds with small diameter compact disks.

Figure 5:
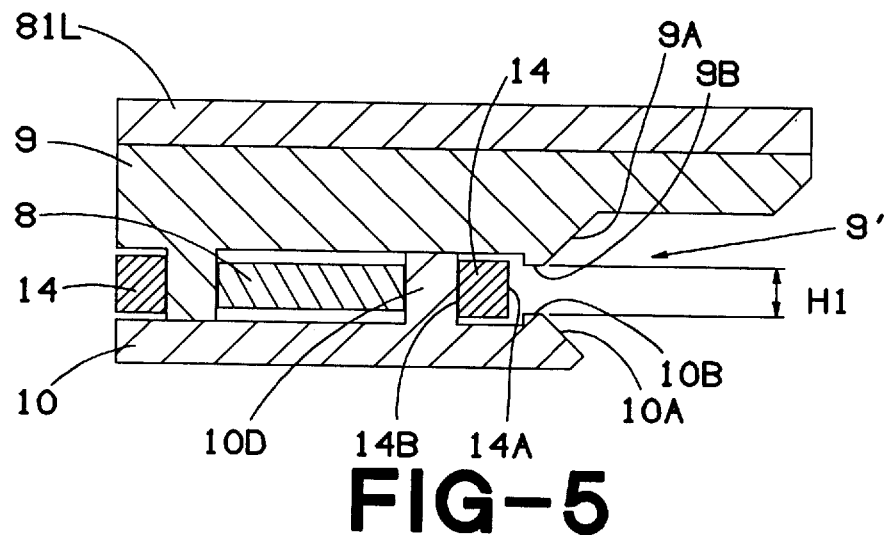
FIG. 5 is an end-wise cross-section of the drive-side disk guide of FIG. 3.

Referring to FIGS. 3 and 5, drive-side disk guide 1002 includes an upper disk guide 9 of a resin having a low friction coefficient such as Duracon. A lower surface of upper disk guide 9 forms an upper half of a guide groove 9', which guides the edge of the inserted disk on the left side of housing 1000. A sloped surface 9A, with a slope of 45 degrees, runs longitudinally on a lower surface of upper disk guide 9. A projection 9B, on a bottom end of sloped surface 9A, engages the upper surface of the disk edge. A sloped surface 10A, running longitudinally on a lower disk guide 10, slopes at a 45-degree angle in a direction opposite that of sloped surface 9A. A projection 10B on an upper end of sloped surface 10A engages a lower surface of the disk edge. A gap of 1.3 mm width (H1), between projection 9B and projection 10B, is slightly wider than the thickness of a disk (1.2 mm) so that the disk edge is guided precisely.

Referring to FIG. 3, a timing pulley 15 rotates on a shaft 16 on a forward end of upper disk guide 9. Shaft 16 projects through the lower surface of upper disk guide 9. Another shaft 6 projects upwardly from the upper surface of lower disk guide 10 at its rear end. Another timing pulley 7 rotates on shaft 6. A timing belt 14 is stretched between timing pulleys 15 and 7 to form a loop with a long axis of the loop being parallel to a direction of transport of disk D, d. An inside surface of timing belt 14 has teeth or serrations. Outside surfaces of timing pulleys 15 and 7, adjacent corresponding portions of the inside surface of timing belt 14, also have teeth or serrations to engage the teeth or serrations of timing belt 14, thereby preventing slippage of timing belt 14 with respect to timing pulleys 15 and 7.

Figure 6:
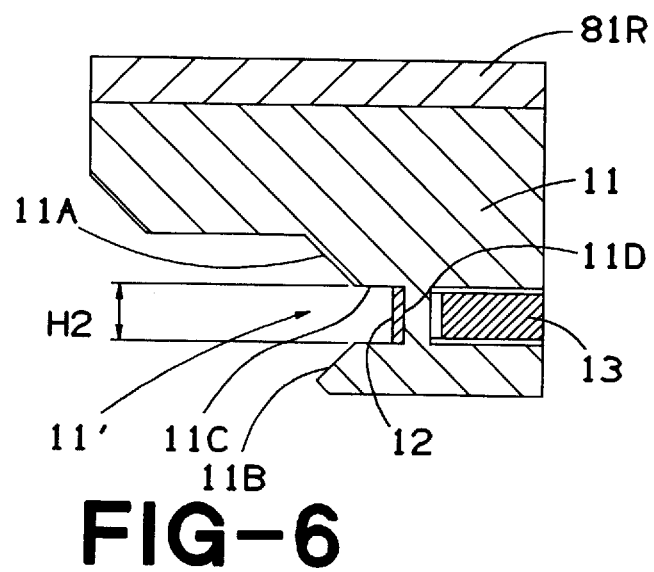
FIG. 6 is an end-wise cross-section of the fixed disk guide of FIG. 4.

Referring, now to FIGS. 4 and 6, a fixed-side disk guide 1003 supports friction belt 12. As in drive-side disk guide 1002, fixed-side disk guide 1003 has a disk guide 11 of a resin material having a low friction coefficient. A guide groove 11' is formed longitudinally on disk guide 11 to guide the disk edge opposite drive-side disk guide 1002. Guide groove 11' includes sloping surfaces 11A, 11B, and a square U-shaped groove 11C that form a channel shape with a tapered entry.

Figure 8:
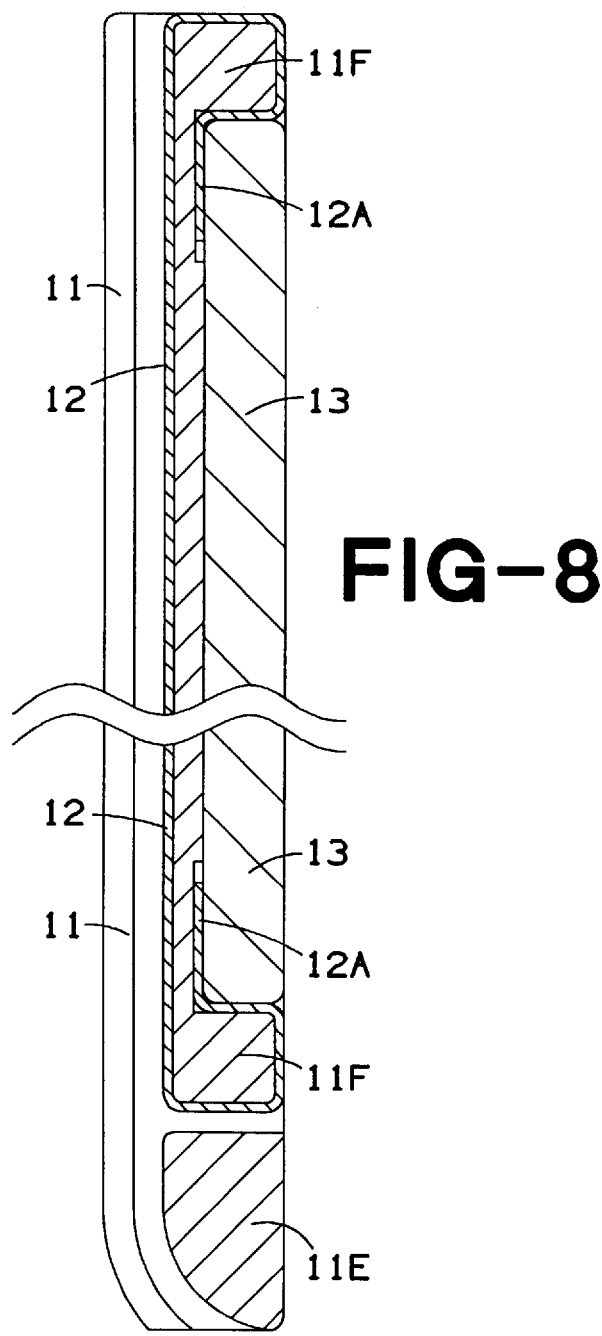
FIG. 8 is a top-wise cross-section of the fixed disk guide of FIGS. 4 and 6.

Referring now also to FIG. 8, a tapered disk guide 11E is mounted toward a front end of fixed-side disk guide 1003. A gap H2 of groove 11C is 1.5 mm wide, slightly wider than the thickness of a disk. This gap width allows the disk edge to be guided precisely without binding. Friction belt 12 is fixed to a flat wall 11D of a belt fixing piece 11F at the blind end of groove 11C. Friction belt 12 runs the length of fixed-side disk guide 1003 except for the front portion over which disk guide 11E extends. Friction belt 12 has a high friction coefficient to prevent the rim of the disk from slipping. Ends 12A of friction belt 12 are wrapped around belt fixing piece 11F and held in place by a reinforcement plate 13. Reinforcement plate 13 also supports flat wall 11D to prevent it from bowing due to the force applied by the disk running along friction belt 12.

Referring to FIG. 3, 5, and 6 an outer perimeter surface 14A of timing belt 14 is positioned to engage with the disk edge, guided between projections 9B, 10B, on the left side of housing 1000. Friction belt 12 engages the opposite edge of the disk. Timing belt 14 is revolved by timing pulley 15 to move the disk inside housing 1000. Friction belt 12 is fixed relative to loading plate 81R. Therefore, if timing belt 14 were permitted to bow, the center of the disk would move toward the left of the device causing the path of the disk to be nonlinear. Also, the distance of disk transfer, from front to rear, is determined from the angular displacement of timing pulley 15. The non-linear displacement of the disk would make it difficult to determine the fore-aft displacement of the disk from the angular displacement of timing pulley 15. This is so because, with bowing of timing belt 14 and friction in the sliding supports, the transverse movement of the disk would be a complex function of fore-aft displacement of timing pulley 15 which would vary with properties of the timing belt (which could also change over time). Therefore any bowing in timing belt 14 is likely to lead to errors in fore-aft position detection of the disk.

Figure 82:
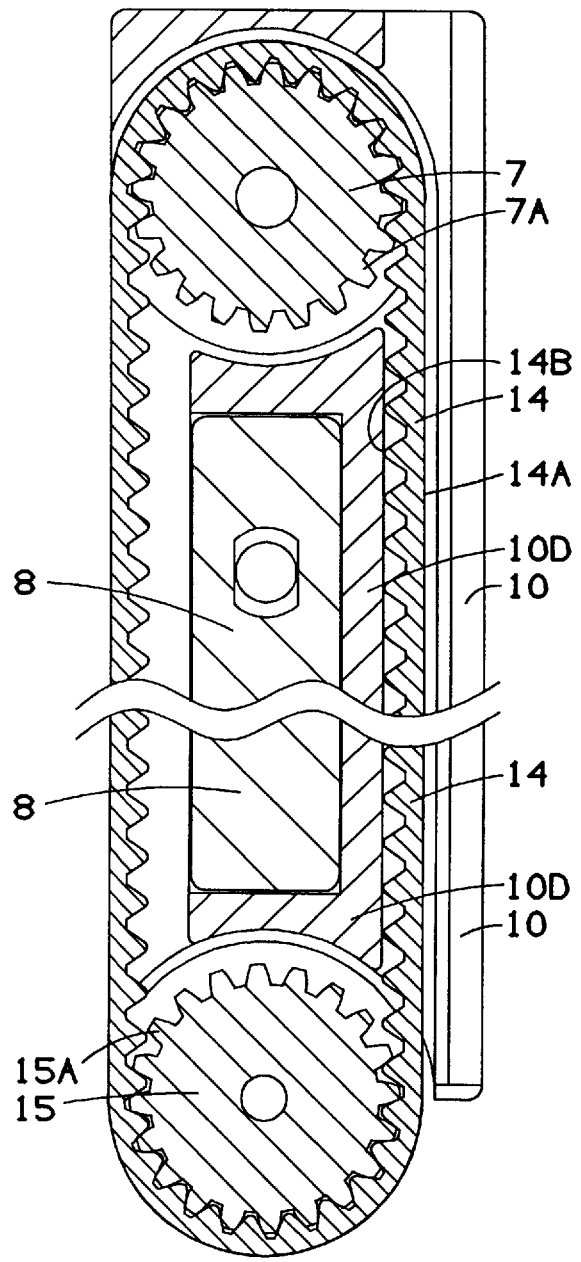
FIG. 82 is a top-wise cross-section of drive-side disk guide 1002.

Referring momentarily to FIG. 82, timing belt 14 is prevented from bowing by a guide wall 10D, on lower disk guide 10. The inside surface 14B of timing belt 14 slides over guide wall 10D. This prevents the force of the disk from pressing timing belt 14 inwardly. A metal plate 8, between disk guide 9 and disk guide 10, reinforces disk guides 9 and 10. Since disk guides 9 and 10 are of resin, metal plate 8 prevents disk guides 9 and 10 from flexing. A disk protection sheet 23, attached to the top and bottom surfaces of the rear side of disk guides 9, 10, prevent damage to stored disks (described later) above and below disk guide 9.

Figure 7:
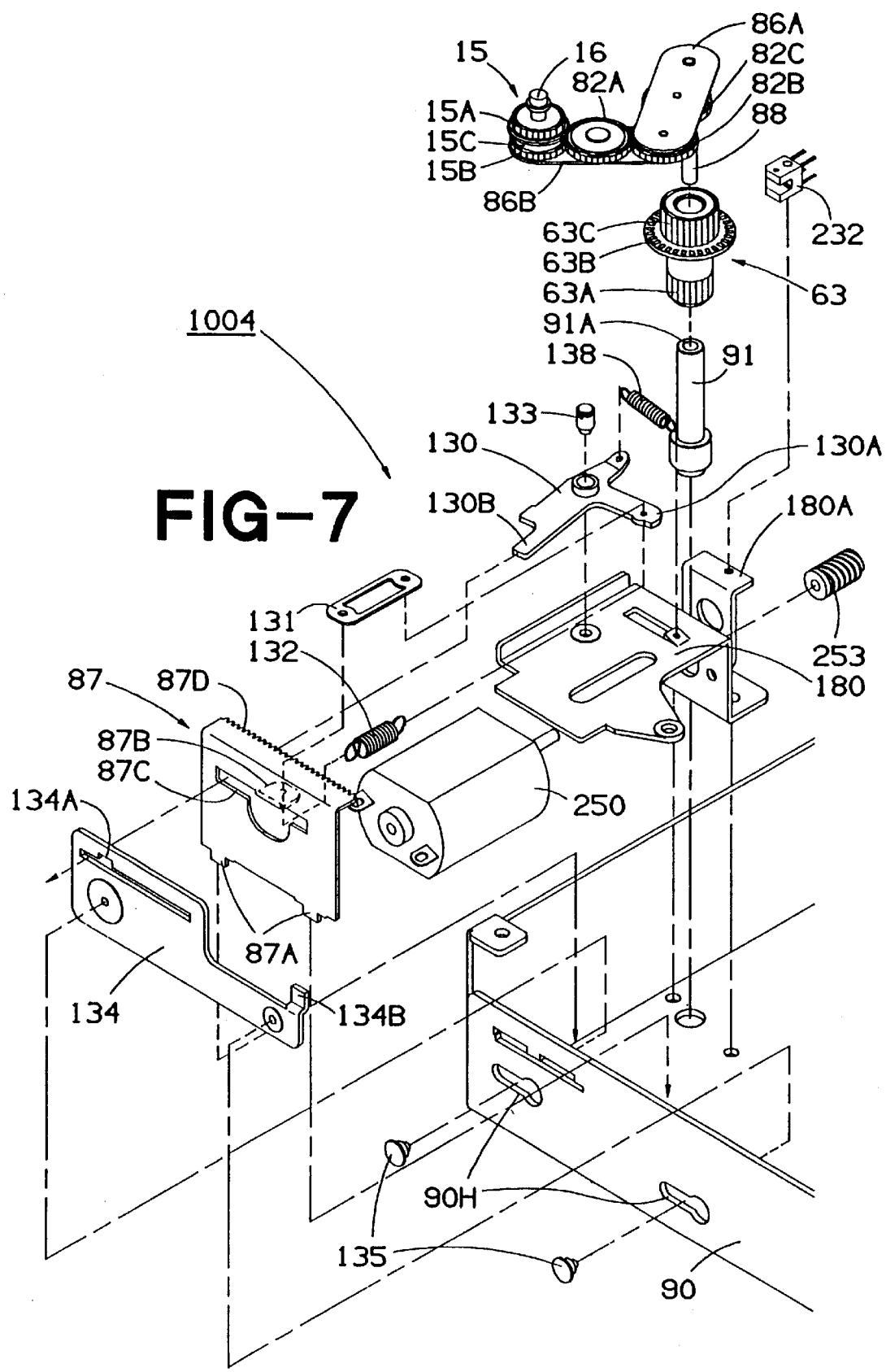
FIG. 7 is an exploded view of a loading plate opening/closing mechanism of the disk transport mechanism of FIG. 2.

Referring now to FIG. 7, a loading plate open/close mechanism 1004, rotates timing pulley 15. Motor 250 is fixedly attached to main chassis 90 on a bracket 180. A worm gear 253 is press-fitted to a rotating shaft of drive motor 250. A gear member 63 rotates on shaft 91 attached to main chassis 90. Gear 63A on a lower portion of gear member 63, engages worm gear 253. Plate 86A is fixed to a shaft 88 which fits in a center hole 91A of shaft 91, allowing plate 86A to swing freely. A gear 82B rotates on a shaft hingeably interconnecting plates 86A and 86B. Timing pulley 15 rotates on shaft 16 protruding from a distal end of plate 86B. An intermediate gear 82C, rotating at a middle of plate 86A, meshes with both gear 63C, on an upper portion of gear member 63, and gear 82B, thereby transmitting rotation of the shaft of motor 250 to gear 82B. Rotation of gear 82B is further transmitted to timing pulley 15 by a gear 82A that rotates on a middle of plate 86B. Gear 82A meshes with gear 82B and a gear 15B on a lower portion of timing pulley 15.

Referring momentarily to FIGS. 25–29, plates 86A, 86B pivot responsively the position of timing pulley 15 as timing pulley 15 moves transversely with drive-side disk guide 1002. Thus, the rotation of motor 250 is transmitted to timing pulley 15 by an extensible transmission without moving motor 250. With such an extensible transmission, there is no need for space for movement of a bulky motor. In addition, by having an extensible transmission instead of a movable motor and transmission, the mass and weight of the drive mechanism travelling with loading plate 81L is minimized, making it possible to use a weaker spring 127 to urge loading plates 81L and 81R medially together. Disk insertion is thereby made easier and more responsive. In addition, the pressure load on timing belt 14 and friction belt 12 is reduced.

Optical sensor 232 is attached to a bend 180A in a bracket 180. A shutter wheel 63B on the upper portion of gear member 63 periodically interrupts a light beam detected by optical sensor 232 as gear member 63 rotates. Optical sensor 232 generates a loading pulse signal, signal $\overline{\text{L. PULSE}}$. Because bowing of the timing belt 14 is prevented as discussed above, rotation of shutter wheel 63B is correlated in a predetermined way with movement of disk D, d. Therefore, signal $\overline{\text{L. PULSE}}$ can serve as an indication of disk movement. During disk transfer, one pulse in signal $\overline{\text{L. PULSE}}$ indicates a movement of 0.5 mm of the disk in the present embodiment. The same signal $\overline{\text{L. PULSE}}$ also indicates the distance moved by loading plate 81L during an operation that is described below. In this operation, one pulse indicates that loading plate 81L has moved 0.314 mm.

Figure 13:
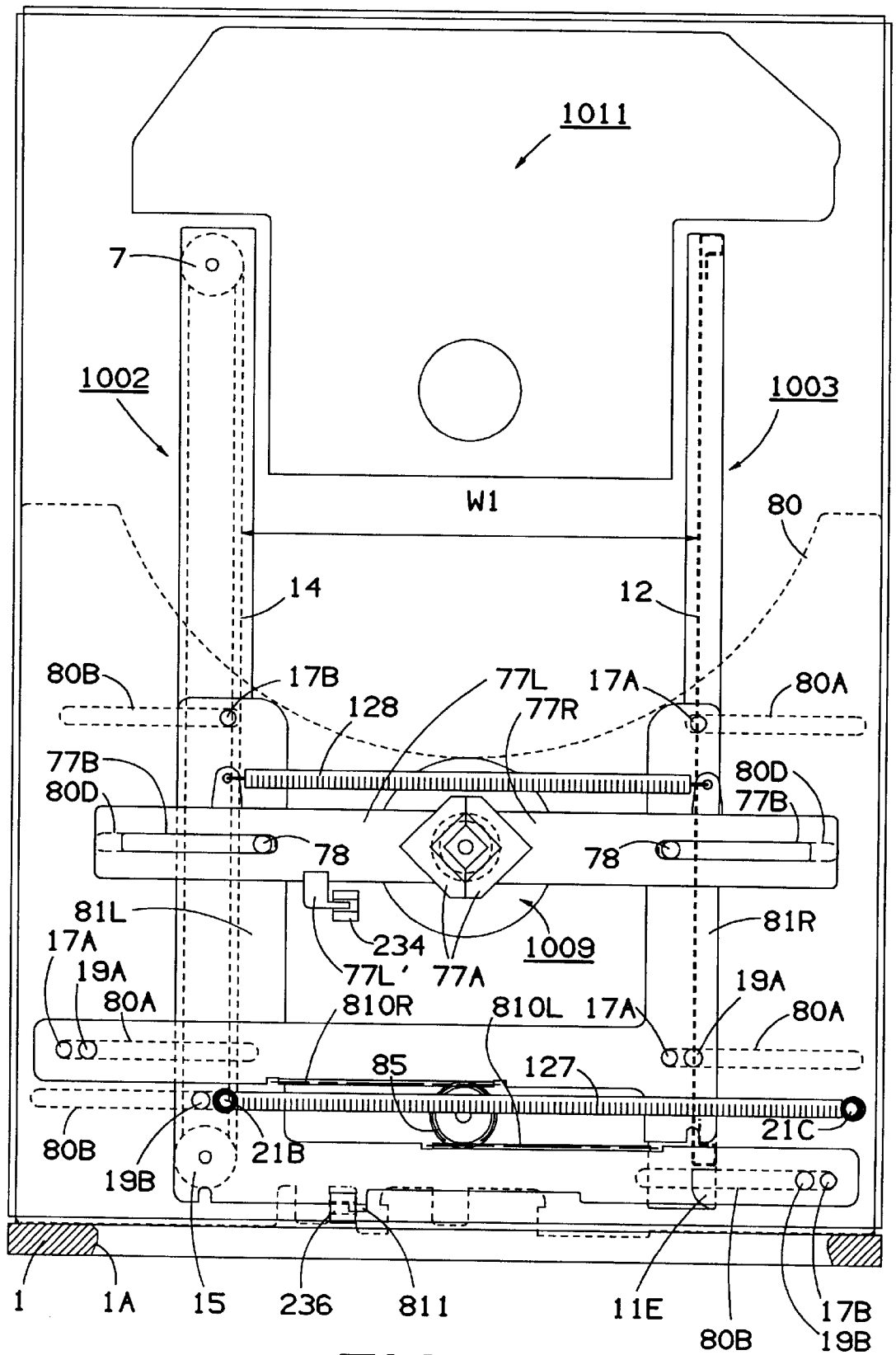
FIG. 13 is a top-view of the disk transfer mechanism of FIG. 2 in a disk receiving position.
Figure 14:
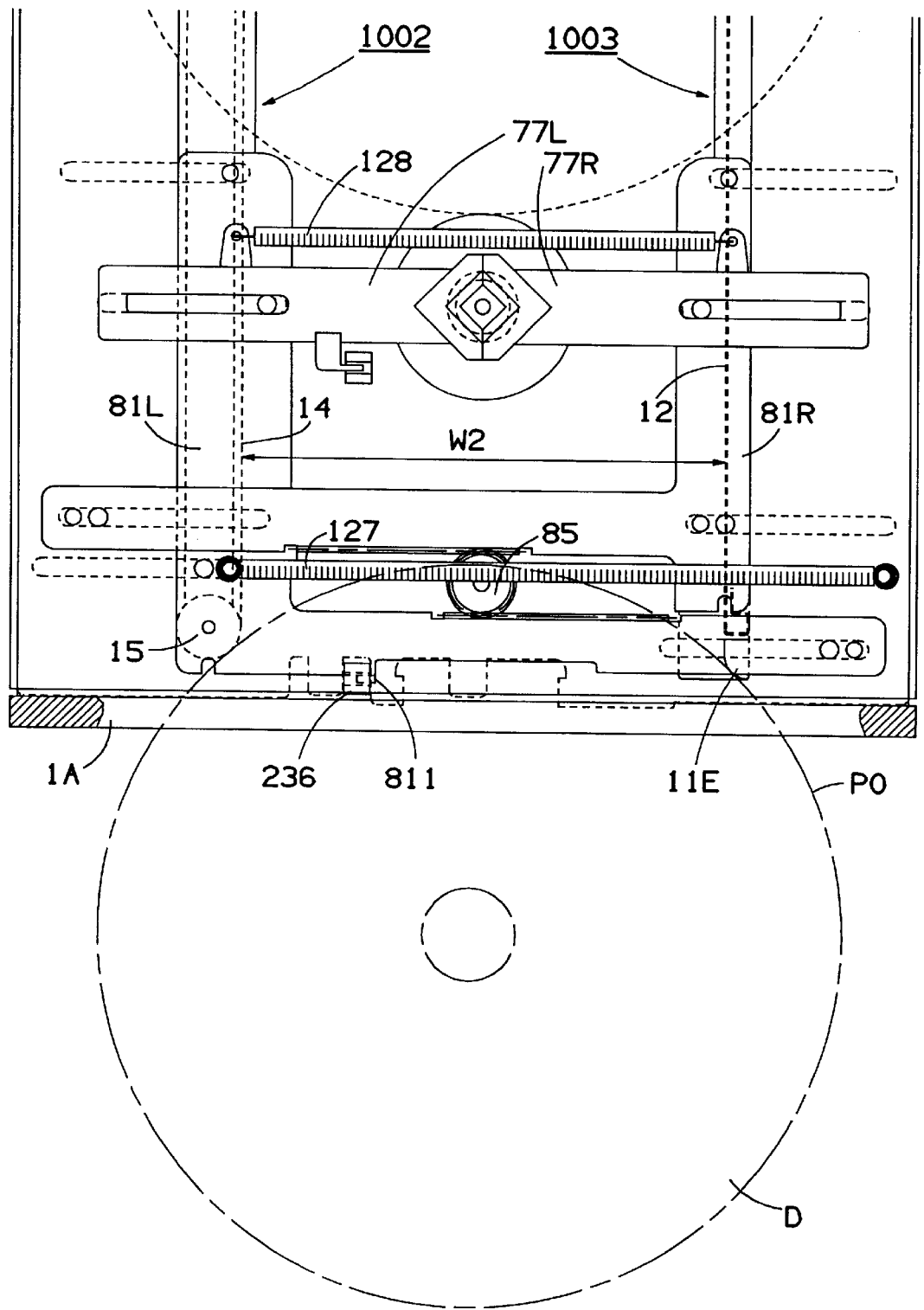
FIG. 14 is a top-view of the disk transfer mechanism of FIG. 2 with a disk in an initial stage of a disk loading operation for a large-diameter disk.
Figure 15:
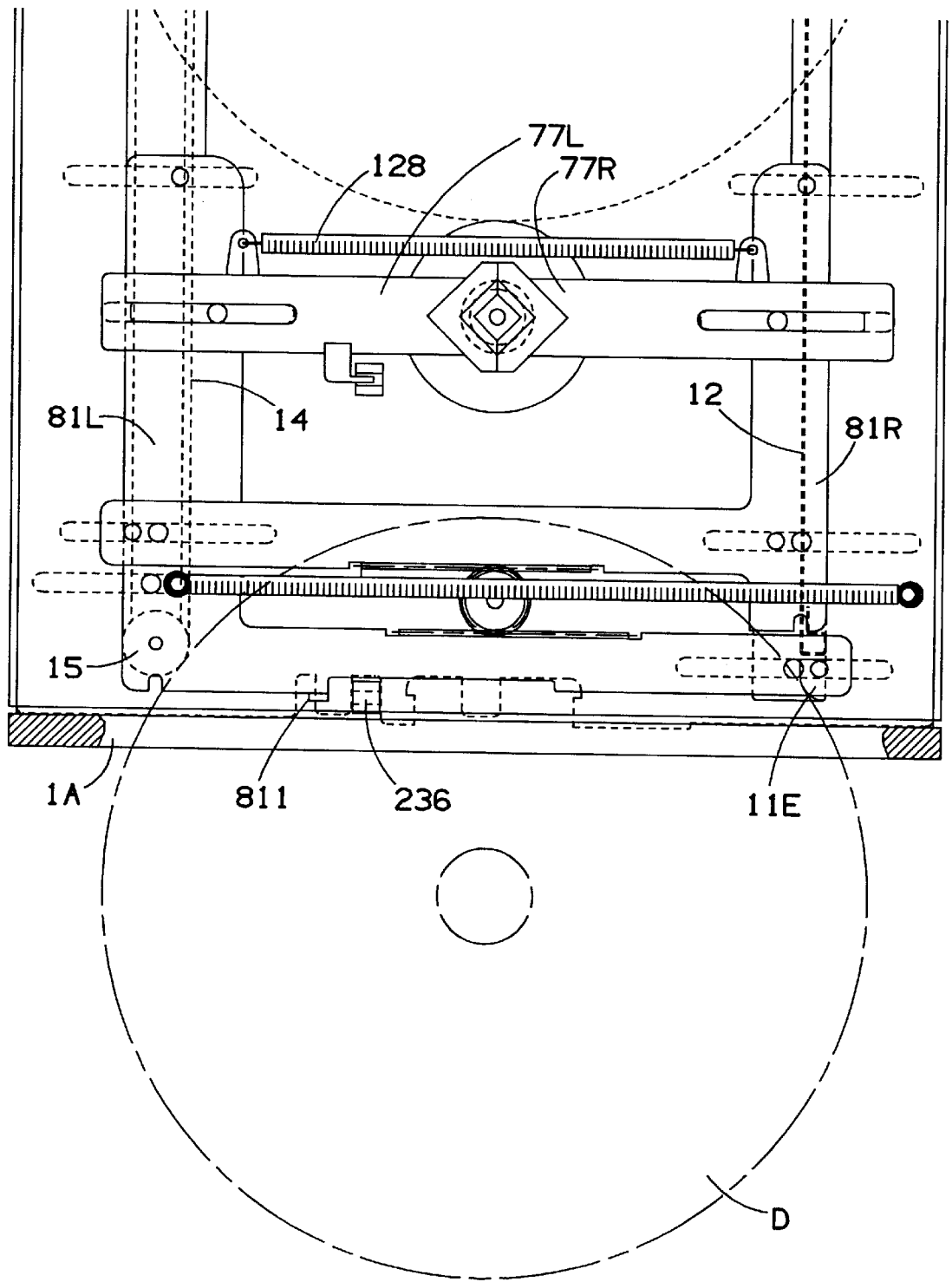
FIG. 15 is a top-view of the disk transfer mechanism of FIG. 2 in a later stage of the disk loading operation for a large-diameter disk.

Referring now also to FIG. 13, when no disk is held between drive-side and fixed-side disk guide 1002 and 1003, the force of spring 127 pulls support pins 17A and 17B together until they rest against the ends of guide grooves 80A and 80B, respectively. This places disk transfer mechanism 1001 in a disk receiving position (POS. 1). In the disk receiving position, loading plates 81L and 81R, attached to support pins 17A and 17B, respectively, are located at specified positions. The specified positions are such that the distance W1 between timing belt 14 and friction belt 12, which are supported by loading plates 81L and 81R, is 76 mm. This separation distance is slightly smaller than the 80 mm diameter of small-diameter disks. When disk transfer mechanism 1001 is in the disk receiving position, timing belt 14 is stationary and remains so until a disk D, d is inserted a certain distance.

Referring to FIGS. 13–16, when disk D, d is inserted through insertion aperture 1A, the rim of disk D, d first engages with timing belt 14 and disk guide 11E. As described above, disk guide 11E is of a resin material having a low friction coefficient. Thus, the disk rim slides freely against disk guide 11E during disk insertion. As the disk is inserted, loading plates 81L and 81R are forced apart against the force of spring 127. When disk D is inserted to the position indicated by P0, the separation distance between timing belt 14 and friction belt 12 is increased to 78 mm. This initiates disk loading.

To pull disk D inside the device, disk transfer mechanism 1001 moves timing belt 14 counterclockwise. However, unless disk D is inserted a sufficient distance, disk edge De will slide against disk guide 11E and disk D will not be drawn in. This configuration requires the user to push the disk into the disk player until disk transfer mechanism 1001 begins active transport. In general, the user will insert disk D into the device by supporting disk spindle hole Ds and disk edge De with the forefinger and the thumb of the right hand. The right hand holding disk D naturally tends to turn clockwise as the forefinger releases disk D and the thumb follows the left side edge De of disk De into the disk player, pushing gently with the thumb. Once disk transfer mechanism 1001 begins active transport, the sensation felt by a right handed user is quite natural as the disk is pulled away from the thumb, because the disk D rotates in a clockwise direction as it is transported in.

The presence of disk guide 11E and its location with respect to a right-handed user inserting a disk in a disk player located to the user's right, help to protect friction belt 12 and timing belt 14 from wear as follows. Timing belt 14 begins moving almost immediately after the disk is inserted (recall that only 2 mm additional separation is required to activate driving of timing belt 14). Thus, the left edge of disk D begins advancing into the disk player, immediately after a small separation of loading plates 81L and 81R, as timing belt 14 on the left side starts moving. Even though the user may push disk D inwardly faster than timing belt 14 advances, the right side of disk D can slip easily against the surface of disk guide 11E. A right-handed user with the disk player located to the user's right for easy access naturally tends to push against fixed-side disk guide 1003 rather than drive-side disk guide 1002. However, disk guide 11E is located on the right side to bear the force of this pushing. The force applied to disk guide 11E helps to separate fixed- and drive-side disk guides 1002 and 1003. In fact, it is possible for almost no force to be born by timing belt 14 during the manual phase of disk insertion. In addition, it is evident that disk guide 11E also protects friction belt 12 as well. Thus, the presence of disk guide 11E prevents disk D from rubbing against timing belt 14 and friction belt 12 during the initial phase of insertion. By preventing the disk from rubbing against timing belt 14 and friction belt 12, damage and wear to timing belt 14 and friction belt 12 is minimized.

Figure 19:
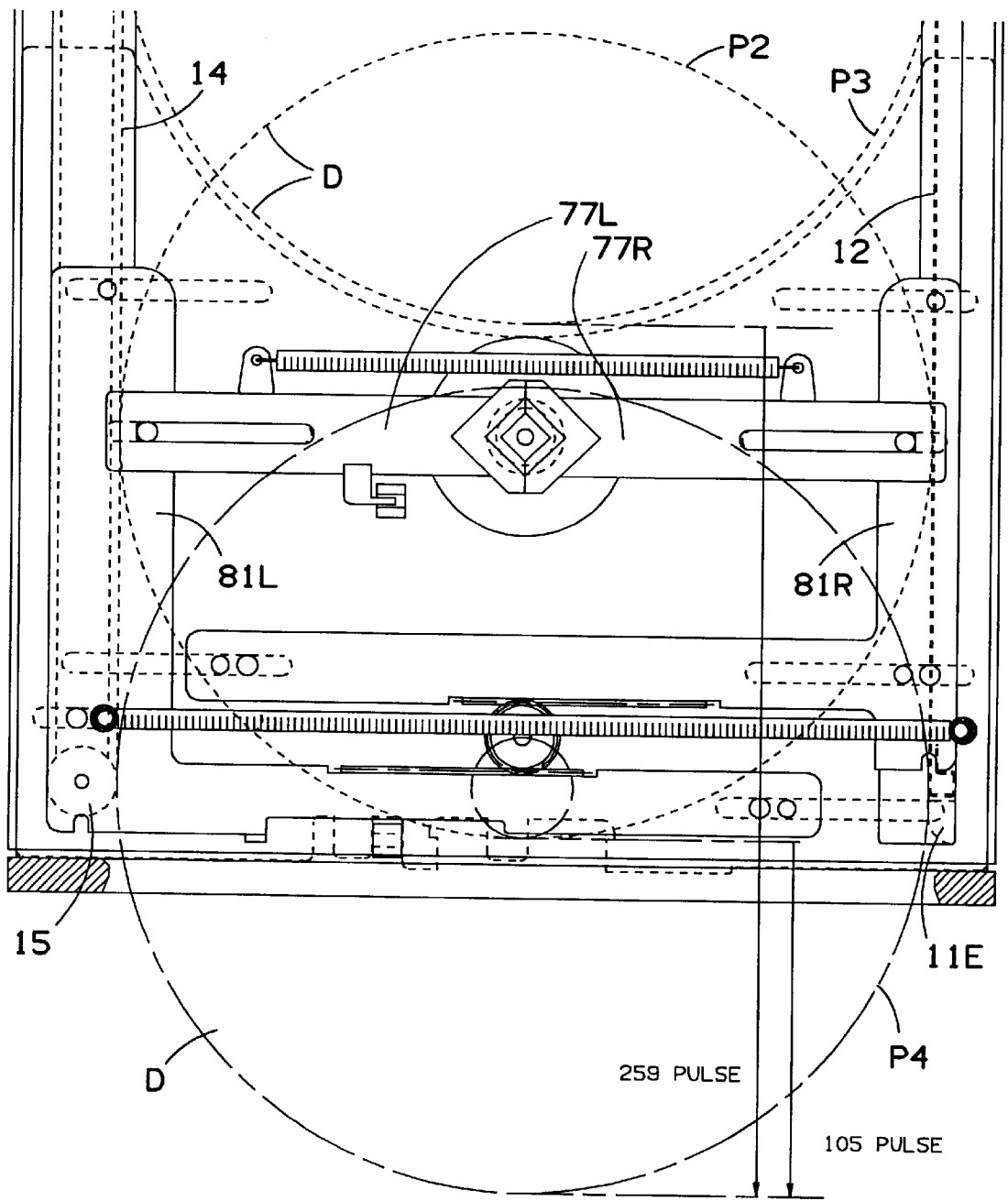
FIG. 19 is a top-view of the disk transfer mechanism of FIG. 2 showing a sequence of disk outlines indicating positions occupied by a large-diameter disk being moved from the store position to and eject position.

Once disk transfer mechanism 1001 has brought disk D to a position where it is firmly supported between timing belt 14 and friction belt 12, disk D is moved independently of the user. Disk D is brought to a playback position (P2) and then to a stock position (P3). Referring momentarily to FIG. 19, by driving timing belt 14 clockwise, disk transfer mechanism 1001 brings disk D from a stock position (P3), or a playback position (P2), to an eject position (P4) where disk D, d may be removed by the user. Disk transfer mechanism 1001 is controller to bring disk D as far to the front of the disk player as possible without causing permitting timing belt 14 and friction belt 12 to lose their grip on it. That is, timing belt 14 is stopped just before timing belt 14 and friction belt 12 would shift medially under the force of spring 127. This insures that disk D is firmly held in the eject position. The disk D is moved between the eject position, the playback position, and the stock position in response to keypad entries by the user.

Figure 17:
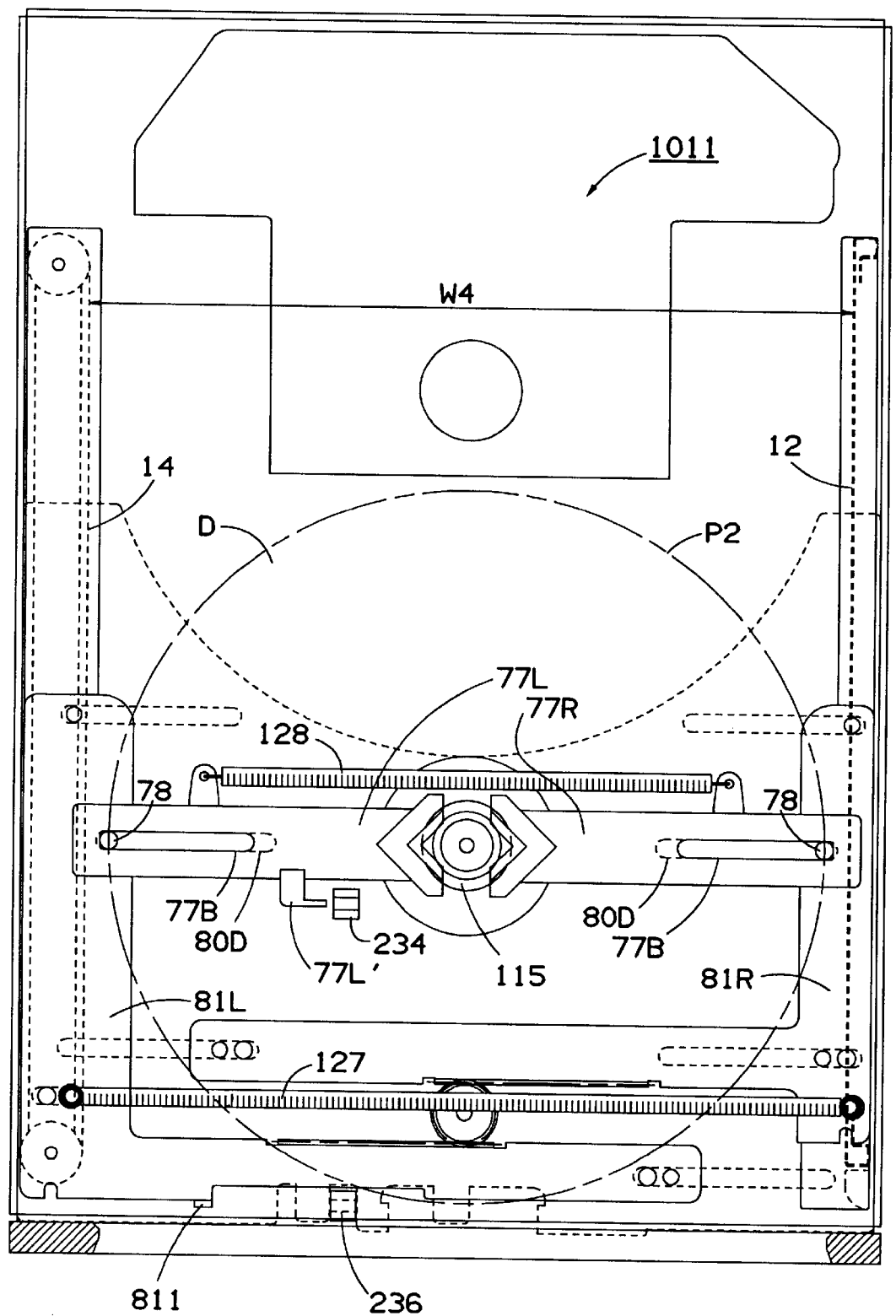
FIG. 17 is a top-view of the disk transfer mechanism of FIG. 2 showing a large-diameter disk released in the playback position in preparation for playing the disk back.
Figure 25:
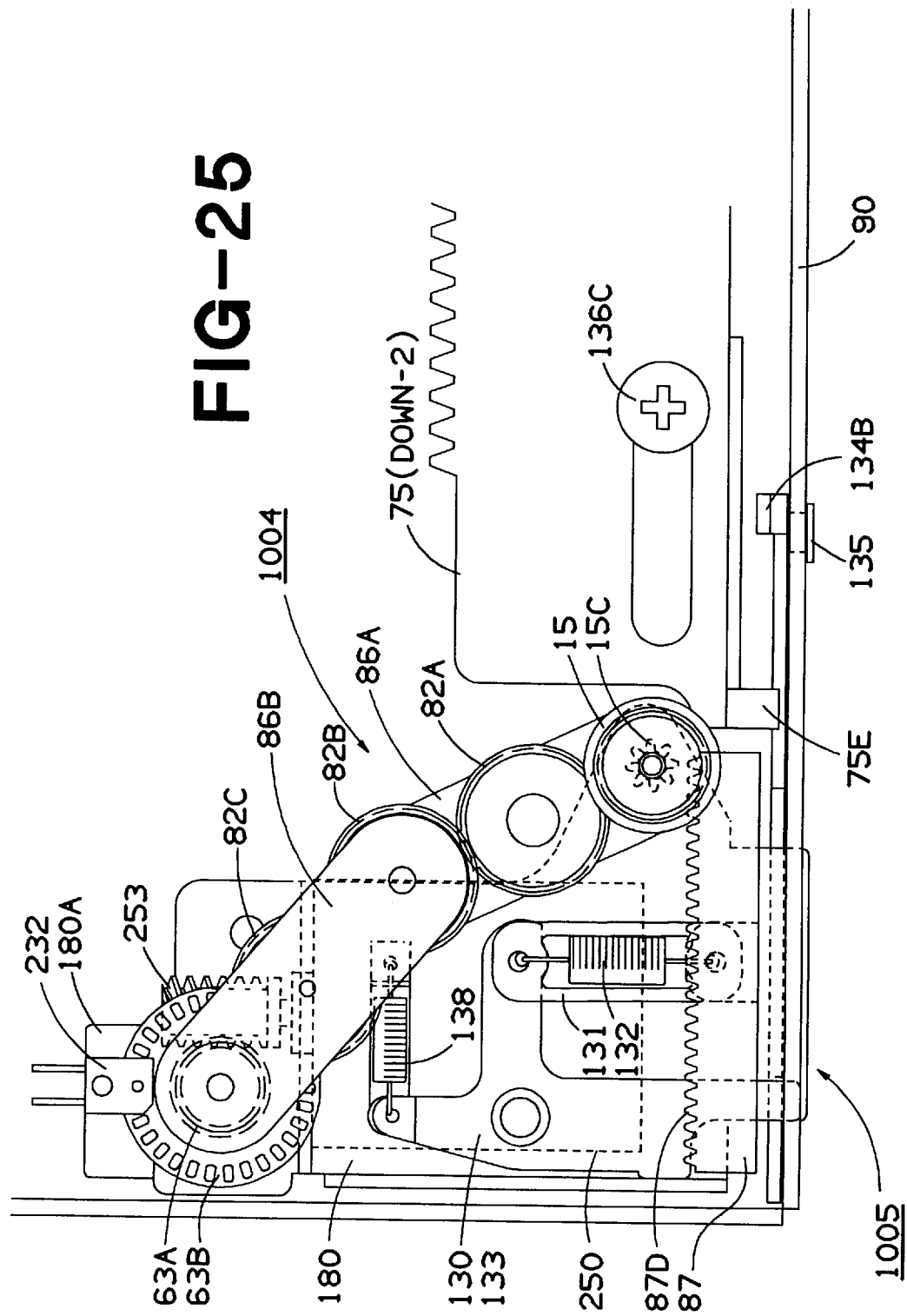
FIG. 25 is a top-view of the loading plate opening/closing mechanism with a sliding plate mechanism in a first position.

Referring momentarily to FIGS. 13, 17, and 25 when a disk is played back, loading plates 81L and 81R are separated by a distance greater than the diameter of the disk, thereby releasing the disk so that the disk can be rotated freely. A rack engager 1005, which moves loading plates 81L and 81R apart, is also driven by motor 250.

Referring again to FIG. 7, a rack release plate 134 is attached to main chassis 90 by pins 135, inserted in a guide grooves 90H in main chassis 90, so that rack release plate 134 can slide left and right relative to main chassis 90. A bend 134B in rack release plate 134 is positioned to engage a bend 75E in a sliding plate 75. A T-shaped rack release lever 130 rotates on a shaft 133 extending from the upper surface of a motor bracket 180. A spring 138, strung between rack release lever 130 and motor bracket 180, urges rack release lever 130 in a clockwise direction, as viewed from above. An arm 130B of rack release lever 130 passes through an opening 87C in a rack member 87, inserting into a groove 134A of rack release plate 134, so that rack release lever 130 rotates counterclockwise responsively to a rightward movement of rack release plate 134.

Figure 29:
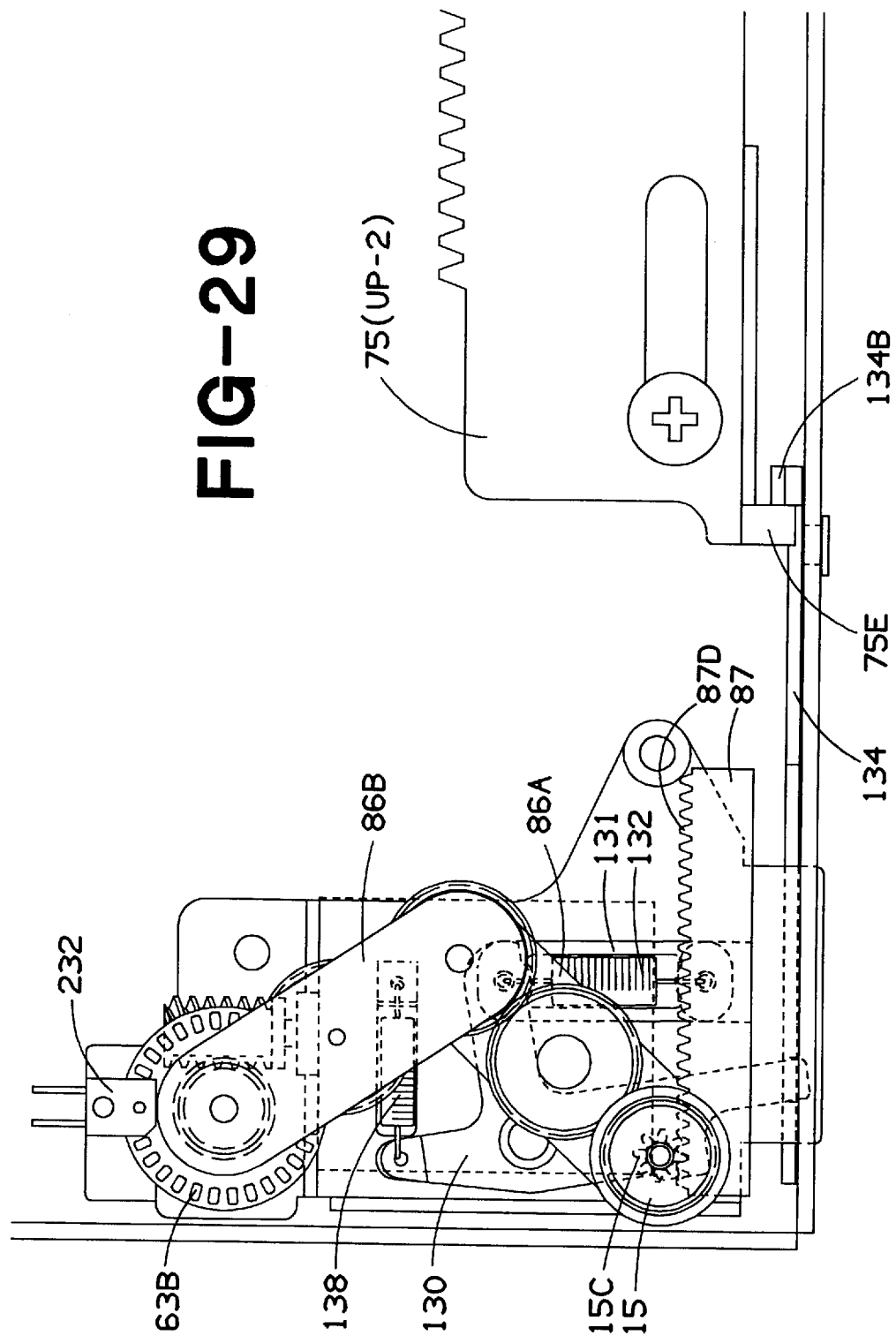
FIG. 29 is a top-view of the loading plate opening/closing mechanism with a sliding plate mechanism in a fifth position which engages the rack member and which a pinion has traveled a distance on the rack member to open the loading plate opening/closing mechanism.

Referring now also to FIG. 29, projections 87A on the lower end of rack member 87, are inserted into holes (hidden in the drawing) in main chassis 90. Rack member 87 has an integral rack 87D with a longitudinal axis that runs laterally. The insertion of projections 87A into the holes forms a pivotable connection between rack member 87 and main chassis 90 permitting rack member 87 to pivot in an arc whose tangents are perpendicular to the axis of rack 87D. Thus, rack member 87 pivots toward and away from the front of the disk player. Integral rack 87D engages with gear 15C located between gears 15A and 15B timing pulley 15. A bend 87B of rack member 87 is connected to arm 130A of rack release lever 130 by a plate 131 and a spring 132. When rack release lever 130 rotates in a counterclockwise direction, rack member 87 rotates toward the rear of the disk player causing rack 87D to mesh with gear 15C.

Figure 26:
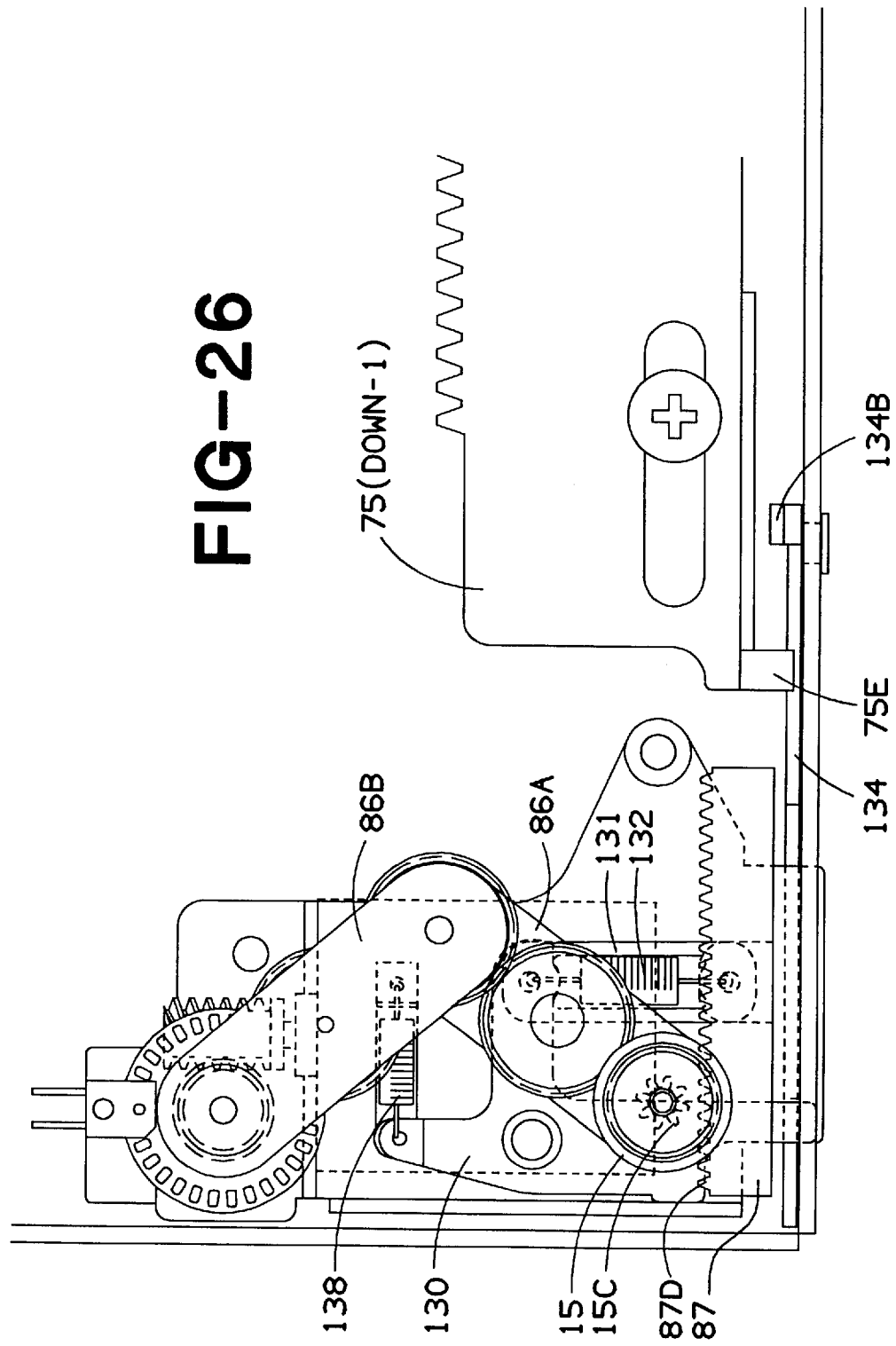
FIG. 26 is a top-view of the loading plate opening/closing mechanism with a sliding plate mechanism in a second position.
Figure 27:
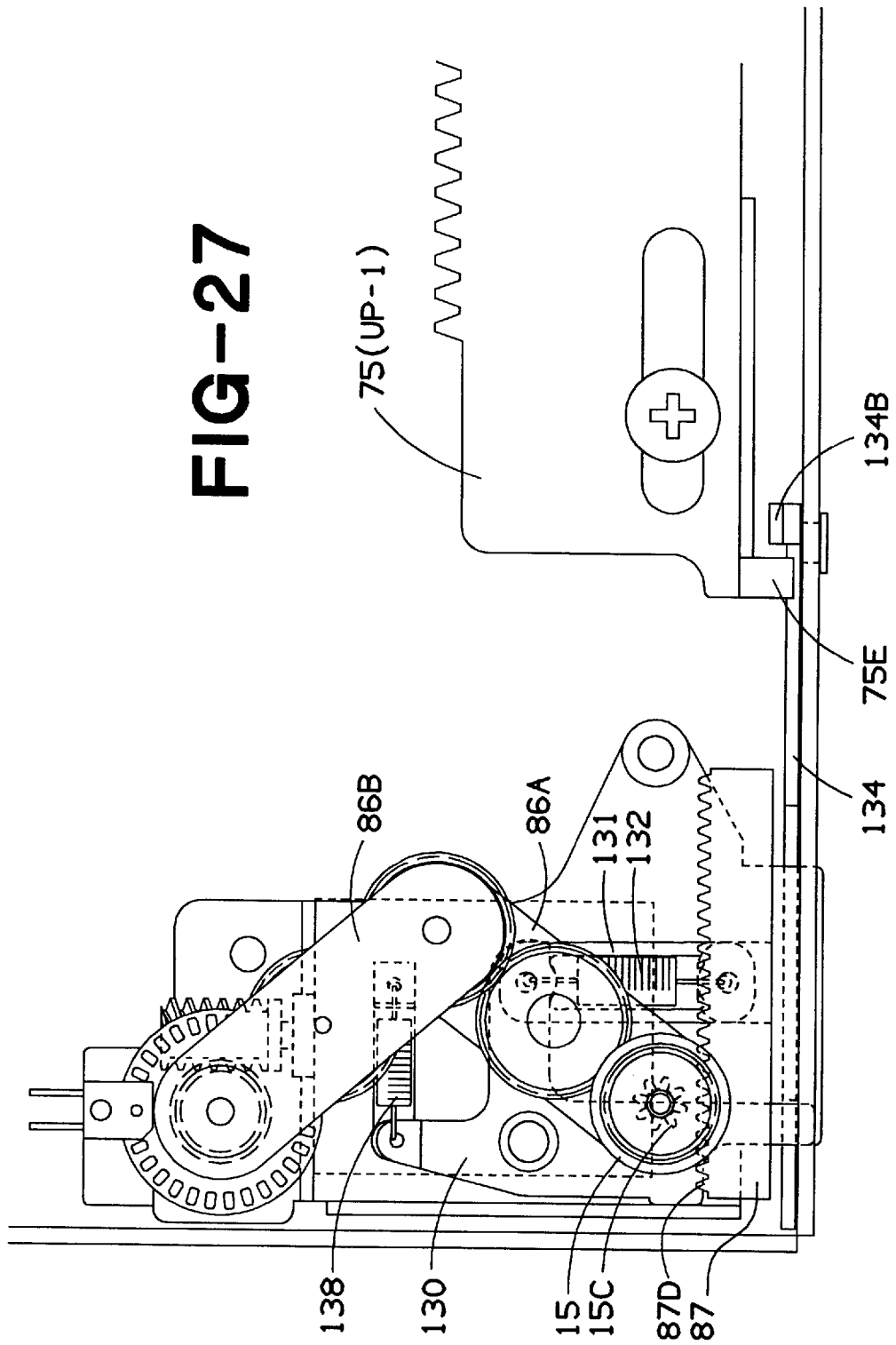
FIG. 27 is a top-view of the loading plate opening/closing mechanism with a sliding plate mechanism in a third position.
Figure 28:
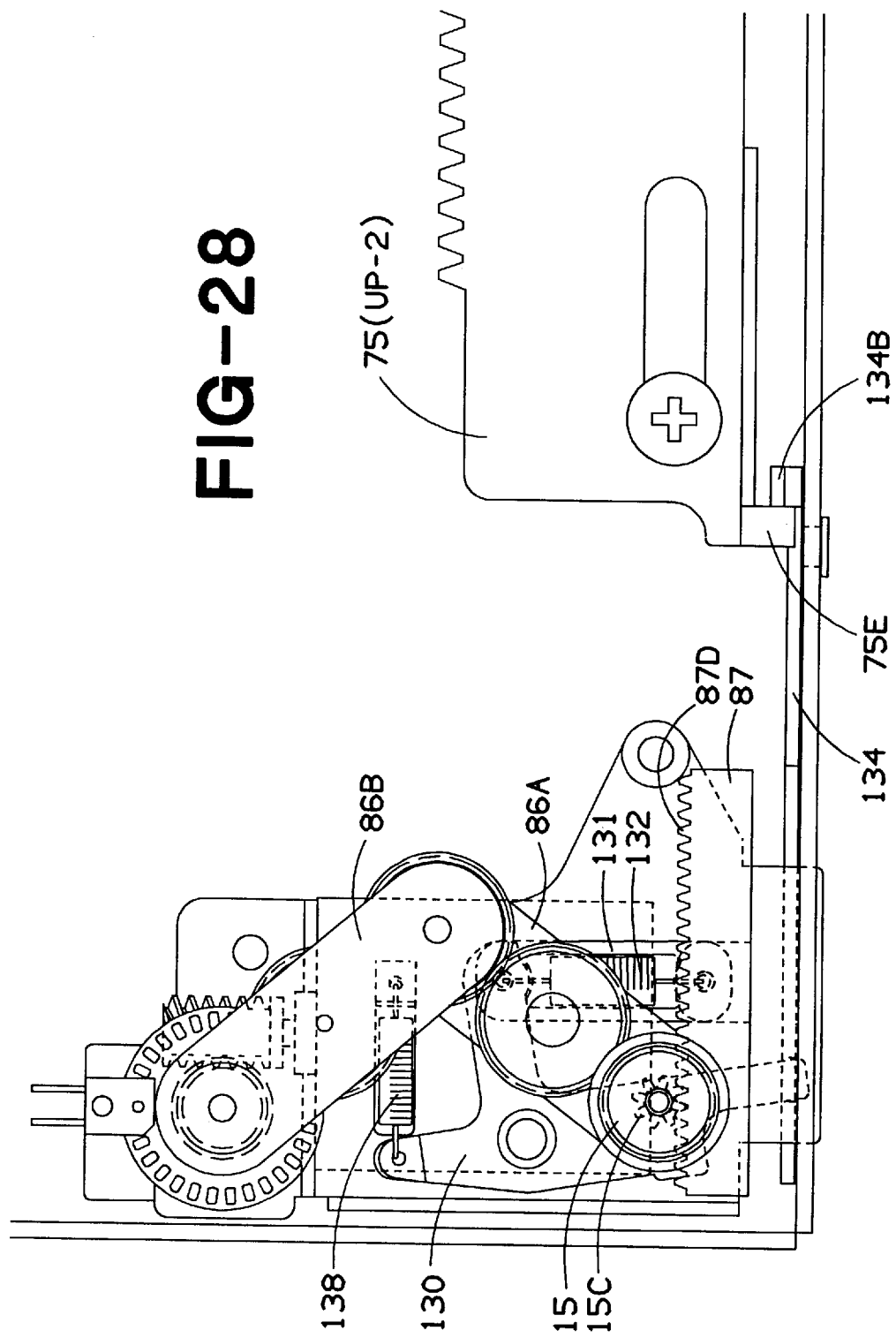
FIG. 28 is a top-view of the loading plate opening/closing mechanism with a sliding plate mechanism in a fourth position which engages a rack member.

Referring now to FIGS. 7, 25–29, and 66, rack engager 1005 controls rack member 87 so that it engages with gear 15C (ON) or disengages (OFF) in response to the position of sliding plate 75. While sliding plate 75 is moving between a position DOWN-2 and a position UP-1, bend 75E of sliding plate 75 is positioned at a distance from bend 134B of rack release plate 134. Therefore, in this range of positions, the force of spring 138 rotates rack release lever 130 to position rack release plate 134 toward the left end with pins 135, 135 resting at the left-most ends of their respective guide grooves 90H, 90H. In this range of positions of sliding plate 75, rack member 87 is held away from gear 15C by plate 131 as shown in FIGS. 25–27 under the urging of spring 138. When sliding plate 75 moves from position UP-1 to position UP-2, bend 75E engages with bend 134B, and rack release plate 134 is moved to the right of the disk player. Therefore, rack release plate 134 rotates rack release lever 130 counterclockwise against the urging of spring 138 causing plate 131 and spring 132, to pull rack member 87 to a position where rack 87D meshes with gear 15C. Thus as sliding plate 75 approaches position UP-2 form position UP-1 as timing pulley 15 is rotated, gear 15C rotates so that it follows along rack 87D as shown in FIG. 29. This causes loading plates 81L and 81R to move laterally between positions in which a disk is held between timing belt 14 and friction belt 12 to open positions POS. 4, in which the disk is released (Compare FIGS. 13 and 17).

Figure 9:
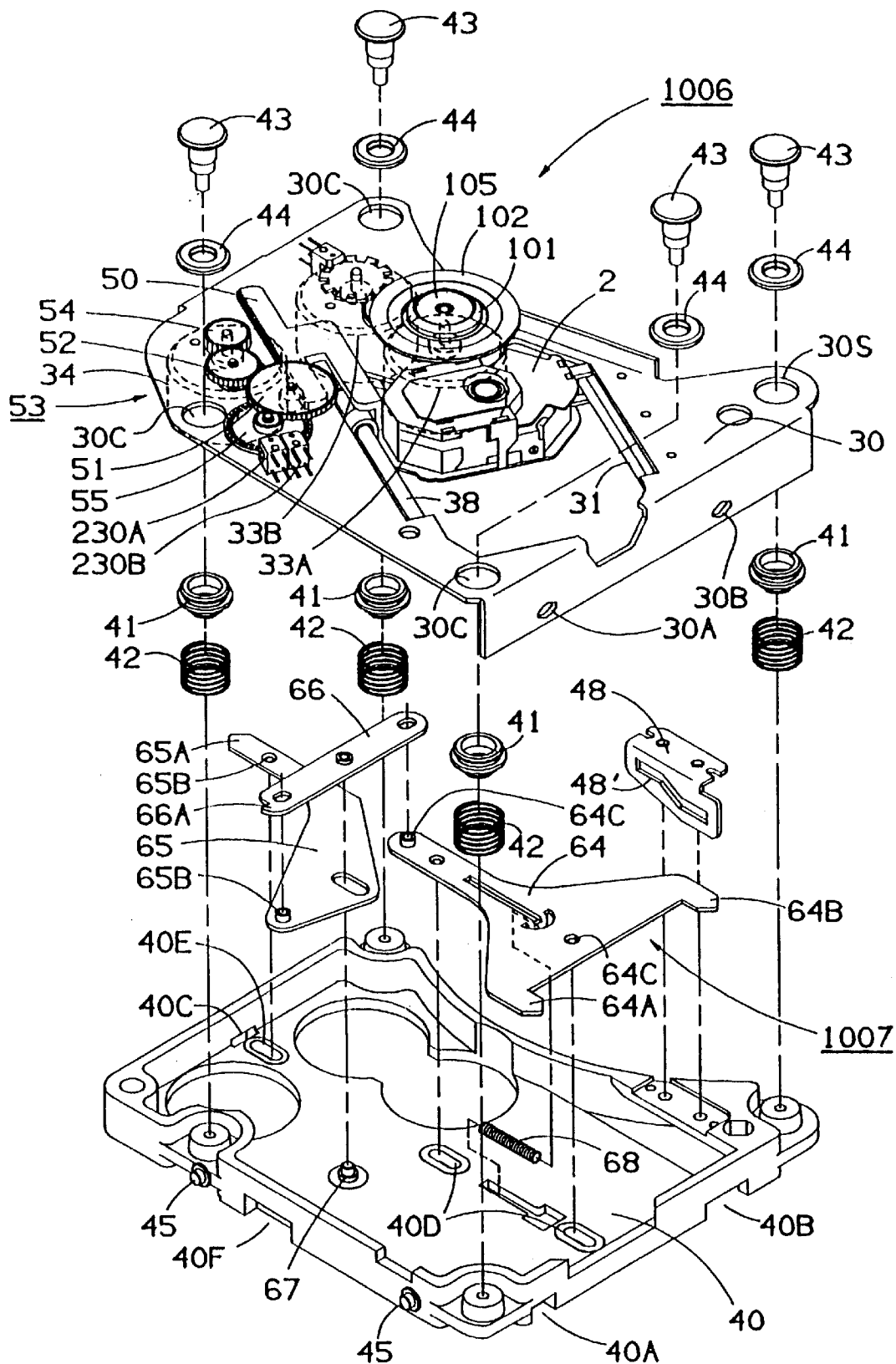
FIG. 9 is an exploded view of an optical mechanism and clamper lock mechanism.
Figure 49:
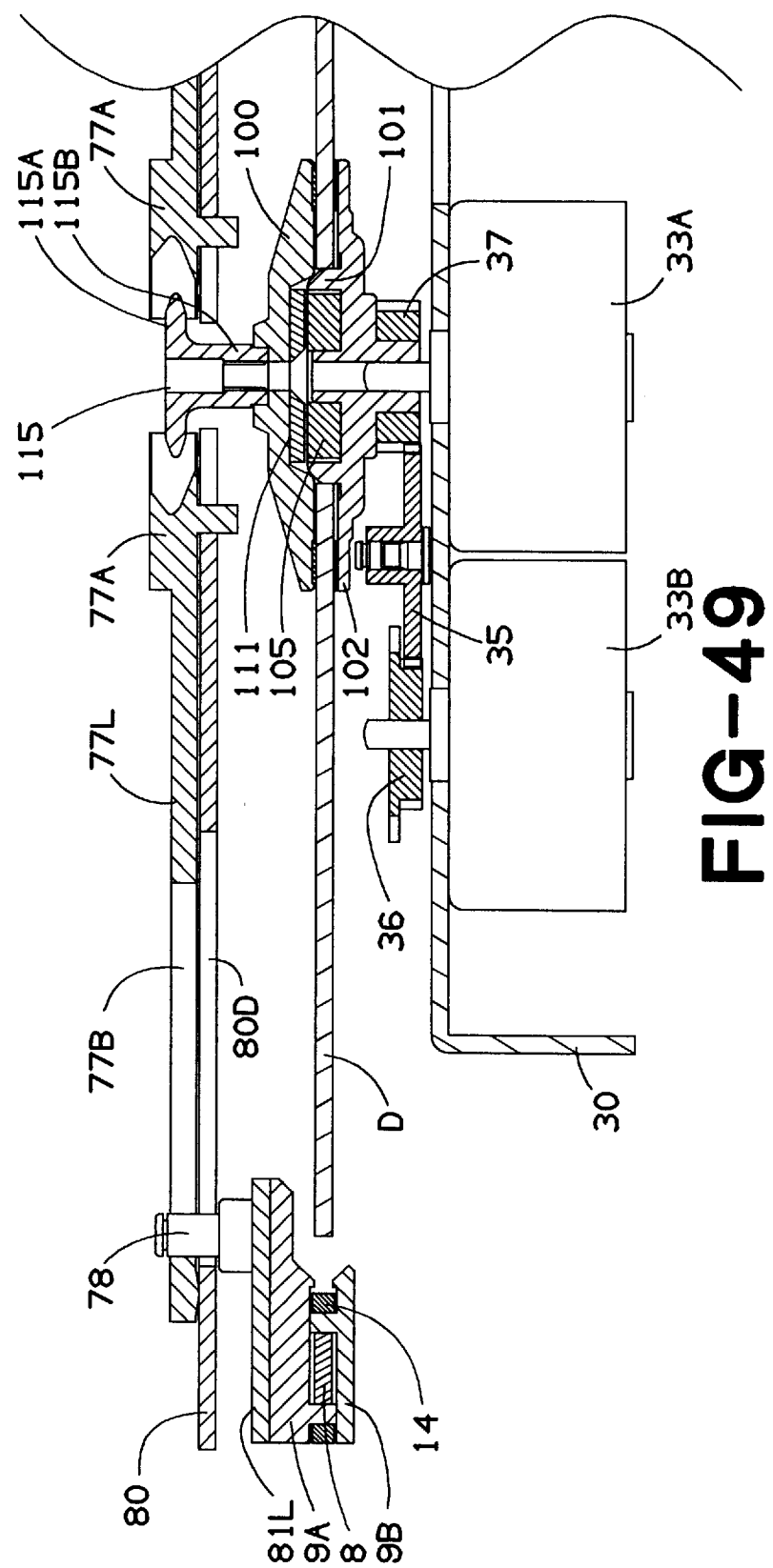
FIG. 49 is an end-wise section of the clamper support mechanism in the configuration of FIG. 48.

Referring to FIGS. 9 and 49, an optical mechanism 1006 includes a chassis 30, a turntable 102, an optical pickup 2, and an optical pickup transfer mechanism 53. Disk D is mounted on turntable 102 and rotated as disk D is played back. Turntable 102 has a gear 37 attached to its lower surface. Turntable 102 and gear 37 are fixedly attached to the rotating shaft of a main motor 33A which drives them. Gear 37 meshes with gear 35 which, in turn, meshes with gear 36 of auxiliary motor 33B. Gear 35 rotates on a shaft attached to chassis 30. Turntable 102 is thus rotated by both main motor 33A and auxiliary motor 33B.

Main motor 33A and auxiliary motor 33B are both employed to drive turntable 102 during playback and to drive optical pickup 2 and turntable 102 during accessing and start-up operations described further below. Two motors are used because their operational combination provides certain benefits. During disk playback, motor 33A and auxiliary motor 33B are supplied with drive voltage at a ratio of approximately 7:3 so that auxiliary motor 33B acts as a load on main motor 33A. The load of auxiliary motor 33B eliminates backlash between meshed gears 35–37, minimizing vibration of turntable 102. Advantageously, because auxiliary motor 33B is partially driven by main motor 33A, a back-emf generated auxiliary motor 33B reduces the total current flow to the two motors. Therefore, the load of auxiliary motor 33B is, to a first-order approximation, non-dissipative.

During accessing and start-up, a high torque and speed are desired to minimize delay in reaching selected and steady operation. Therefore, during start-up and accessing, main motor 33A and auxiliary motor 33B are supplied with equal drive voltages thereby driving disk D with twice the drive torque of playback operation, causing turntable 102 to reach playback speed quickly. Thus, optical pickup 2 can begin reading disk D quickly, and the access time can be shortened. Since main motor 33A and auxiliary motor 33B are powered equally, vibration due to backlash between connected gears 35–37 is transmitted to turntable 102. However, this vibration presents no problem since the vibration is only undesirable during playback, not during acceleration or deceleration of disk D. Background information relating to the motor drive circuit can be found in Japanese Patent Application Serial Number 6-340510 (filed Dec. 28, 1994).

A centering cone 101, projecting from the top surface of turntable 102, precisely centers disk D with respect to turntable 102. A magnet 105, inside centering cone 101, attracts a clamper 1009 (not shown in FIG. 9 and described below). Guide rods 31, 38, mounted in chassis 30, guide optical pickup 2 along a linear scanning path that forms an angle of 25 degrees in the clockwise direction with the front side of main chassis 90. The scanning path of optical pickup 2 is a radial line of disk D when disk D is mounted on turntable 102. A scanning motor 34 and optical pickup transfer mechanism 53, that includes deceleration gears 51, 52, 54, and a rack 50, enable a scanning movement of optical pickup 2. Optical sensors 230A, 230B detect the rotation of a shutter wheel 55, driven by a gear 51. This allows the distance of scanning movement to be detected.

Lower clampers 41, fitted into attachment holes 30S on chassis 30, vibrationally isolate chassis 30 with optical mechanism 1006, from a base 40. A respective spring 42, between each lower clamper 41 and base 40, supports the weight of chassis 30. Fasteners 43 insert through upper clampers 44 on the upper surface of clamper 41 passing through lower clampers 41 to connect to base 40.

A clamper lock mechanism 1007, selectively locks optical mechanism 1006 on chassis 30 to a base 40 from which optical mechanism 1006 is otherwise vibrationally isolated. Damper lock mechanism 1007 includes a Y-shaped lock plate 64 with pins 64C projecting from its lower surface. Pins 64C fit into guide grooves 40D on base 40, permitting lock plate 64 to move over a limited range and direction defined by guide grooves 40D. A J-shaped lock plate 65 also has a pin 65B, projecting from its lower surface, that fits into a guide groove 40E on base 40, permitting lock plate 65 to move along a limited path defined by guide groove 40E. Engagement tips 64A and 64B of lock plate 64 pass through holes 40A and 40B, located on a right side of base 40, and insert into holes 30A and 30B, respectively, located on a right side of chassis 30. Engagement tip 65A of lock plate 65 passes through a hole 40C located on a left side of base 40, and inserts into hole 30C (as visible in FIG. 9), which is similar to holes 30A and 30B, located on a left side of chassis 30. Lock plates 64 and 65 are interconnected by connecting plate 66, which rotates on a shaft 67 projecting upwardly from base 40. A compression spring 68 is inserted between base 40 and lock plate 64, urging lock plate 64 toward the right side of base 40. Thus, lock plates 64 and 65 move in opposite directions against, and with, the force of compression spring 68. A notch 66A on an end of connecting plate 66 passes though an opening 40F in base 40. A sliding plate 75 (described later) engages notch 66A to control the angular position of connecting plate 66.

As visible in FIG. 9, holes 30A–30C are have curved upper and lower edges. Also apparent from FIG. 9 is that engagement tips 64A, 64B and 65A are pointed with a portion at the base of each point that is larger than holes 30A–30C. If, when engagement tips 64A, 64B, and 65A of lock plate 64 and lock plate 65 pass through holes 40A, 40B, and 40C and insert into holes 30A, 30B, and 30C engagement tips 64A, 64B, and 65A are positioned slightly out of alignment with holes 30A–30C, the shape of holes 30A–30C will tend to force engagement tips 64A, 64B, 65A to the center. In addition, by arranging for an upper horizontal edge of each hole 40A, 40B, 40C to be vertically aligned with respect to a respective one of engagement tips 64A, 64B, and 65A and a respective one of holes 30A, 30B, and 30C such that the flat of the base of each of engagement tips 64A, 64B, and 65A is pressed against the horizontal edge of the respective one of each hole 40A, 40B, and 40C base 40 is also firmly aligned with respect to chassis 30. Not only does this arrangement secure a positive vertical position of the tips with respect to chassis 30, because of the curved shape of the edge of the corresponding one of holes 30A–30C, each tip is also horizontally aligned within the corresponding one of holes 30A–30C. The horizontal alignment of engagement tips 64A, 64B, and 65A serves to horizontally align chassis 30 and base 40 because the horizontal width of holes 40A, 40B, 40C is nearly the same as the width of the base of the respective one of engagement tips 64A, 64B, and 65A which insures they are precisely aligned in the holes 40A, 40B, 40C.

Referring now to FIGS. 30–33 and 66, clamper lock mechanism 1007 is locked and unlocked in response to the position of sliding plate 75. An edge 75B" of sliding plate 75 is at a substantial distance from a notch 66A of connecting plate 66 when sliding plate 75 is between position DOWN-2 and position UP-1. Thus, while sliding plate 75 is between position DOWN-2 and UP-1, lock plates 64 and 65 are urged toward the right side of housing 1000 by the force of compression spring 68 forcing engagement tips 64A, 64B, and 65A into holes 30A–30C of chassis 30. This causes optical mechanism 1006, on chassis 30, to be locked to base 40. When sliding plate 75 is moved from position UP-1 to position UP-2, edge 75B" engages notch 66A turning connecting plate 66 counterclockwise against the force of compression spring 68. Lock plate 64 is thereby moved toward the left side of housing 1000, and lock plate 65 toward the right side of housing 1000, causing engagement tips 64A, 64B, and 65A to disengage from holes 40A–40C of base 40 and holes 30A–30C of chassis 30, respectively. Thus freed, in position UP-2, optical mechanism 1006 is elastically supported by lower clampers 41 and upper clampers 44.

Figure 10:
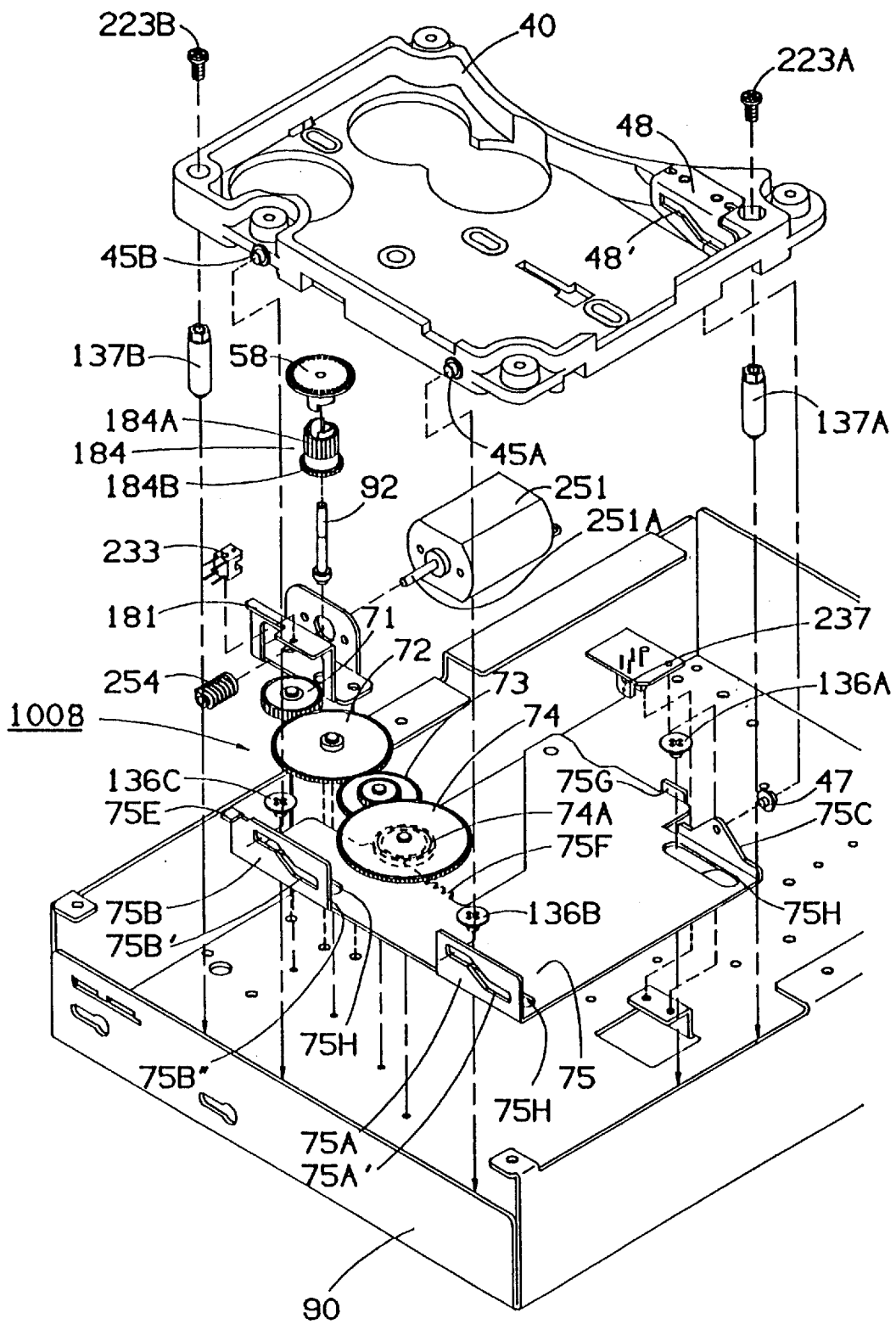
FIG. 10 is an exploded view of an optical mechanism vertical transfer mechanism of the optical mechanism of FIG. 9.
Figure 45:
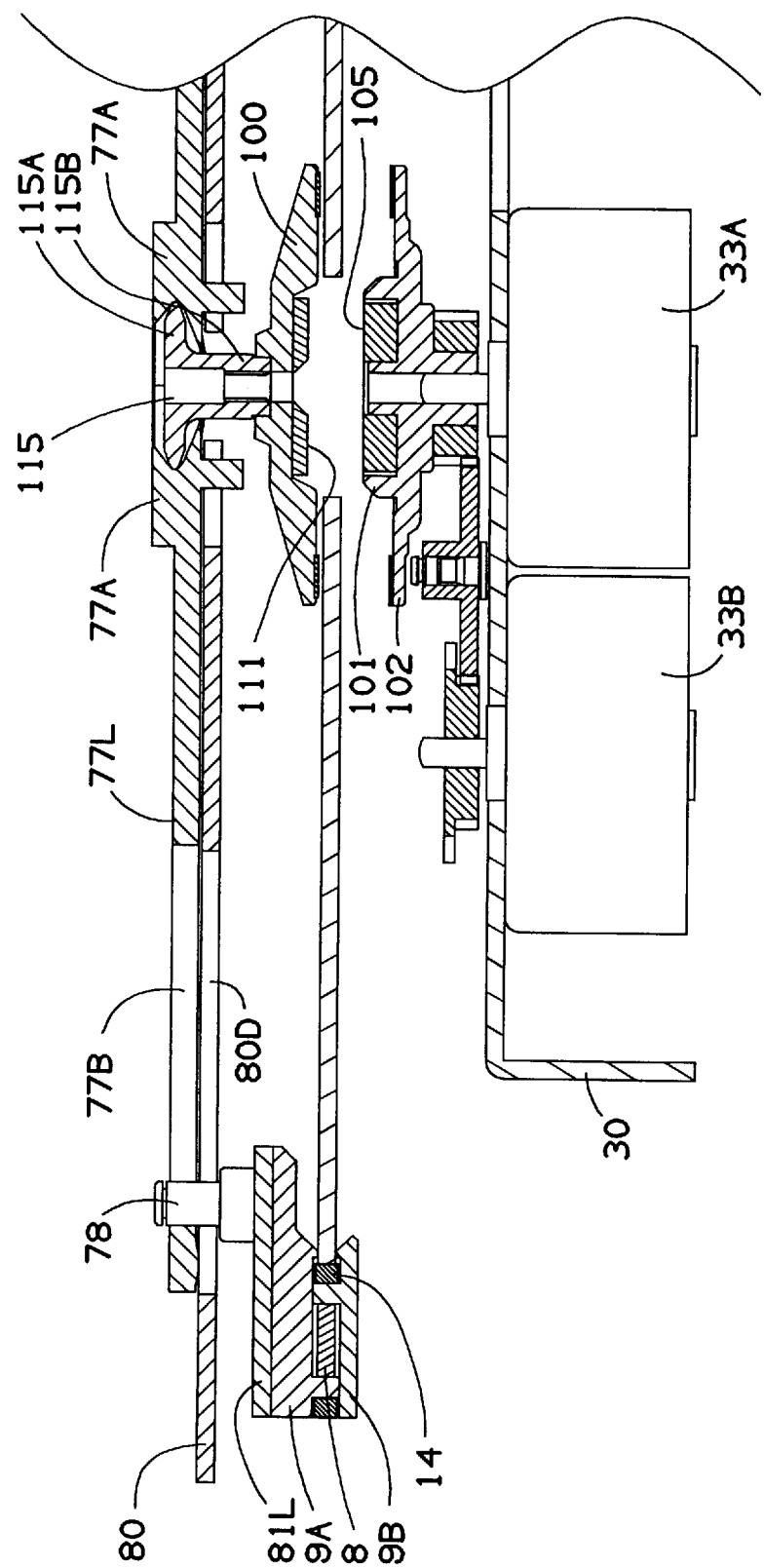
FIG. 45 is an end-wise section of the clamper support mechanism where the loading plates are the position shown in FIG. 44.
Figure 46:
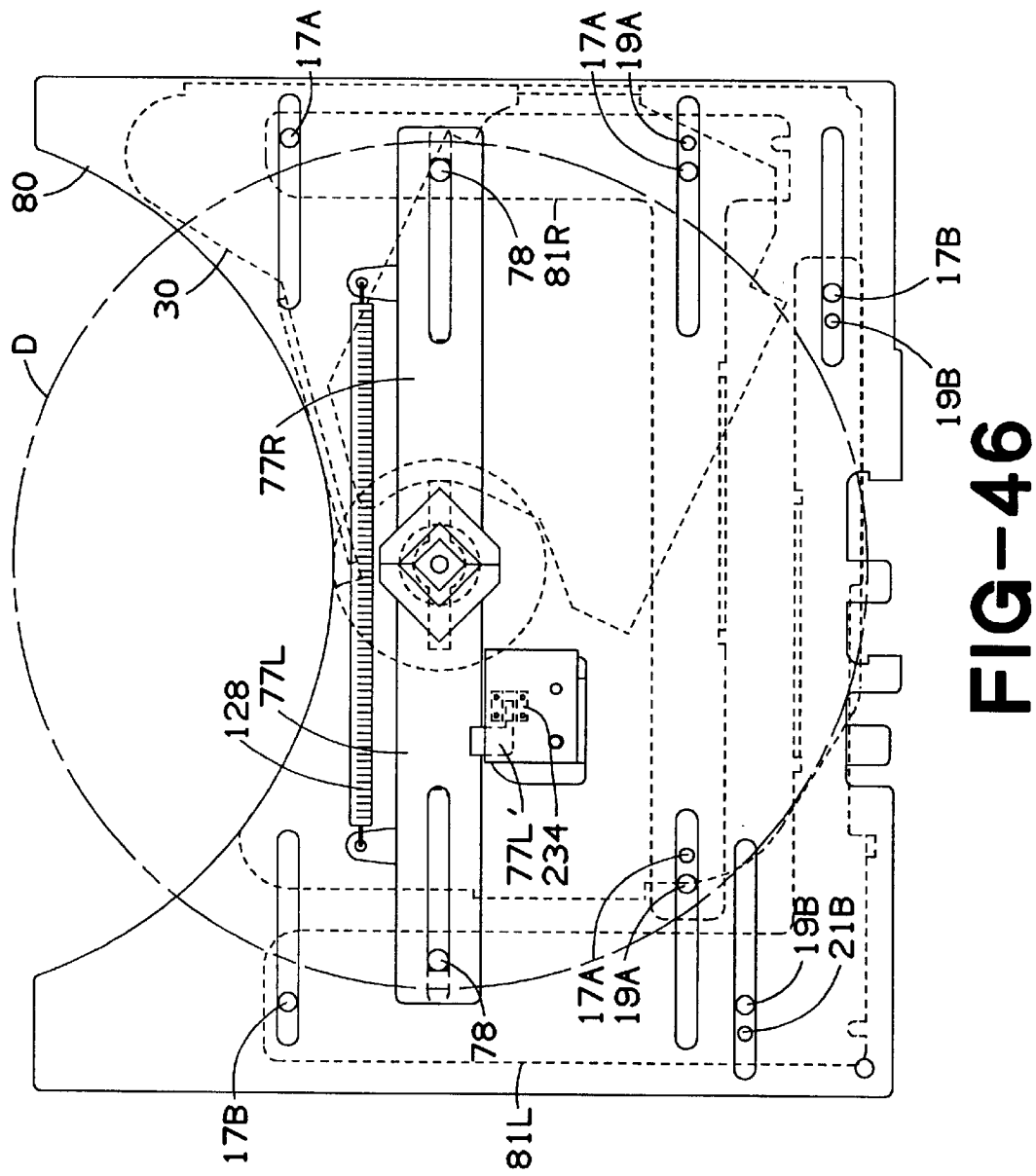
FIG. 46 is a top-view of the clamper support mechanism immediately after the optical mechanism and turntable have been raised to clamp the disk.
Figure 47:
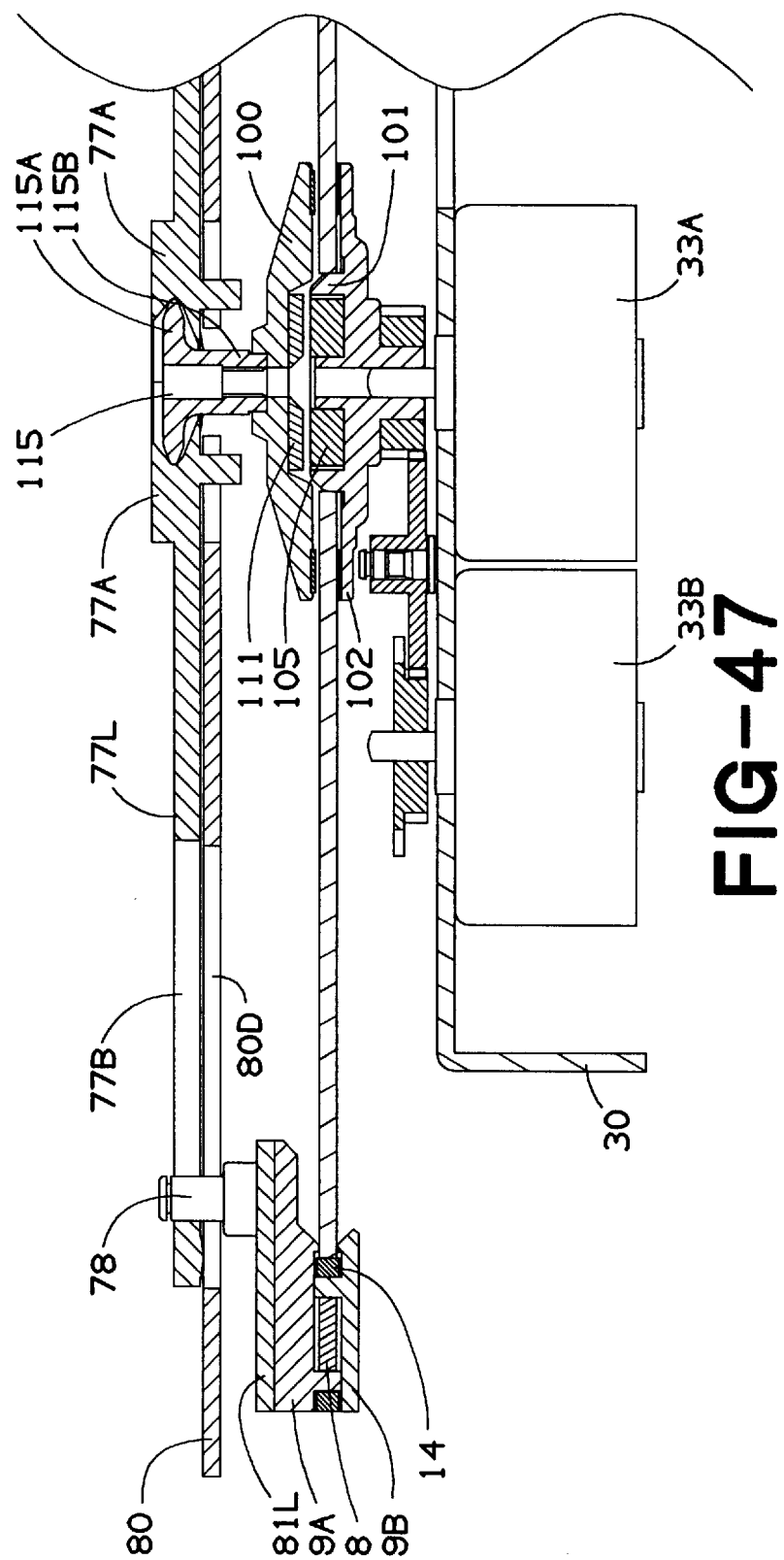
FIG. 47 is an end-wise section of the clamper support mechanism where optical mechanism and turntable are in the configuration of FIG. 46.
Figure 48:
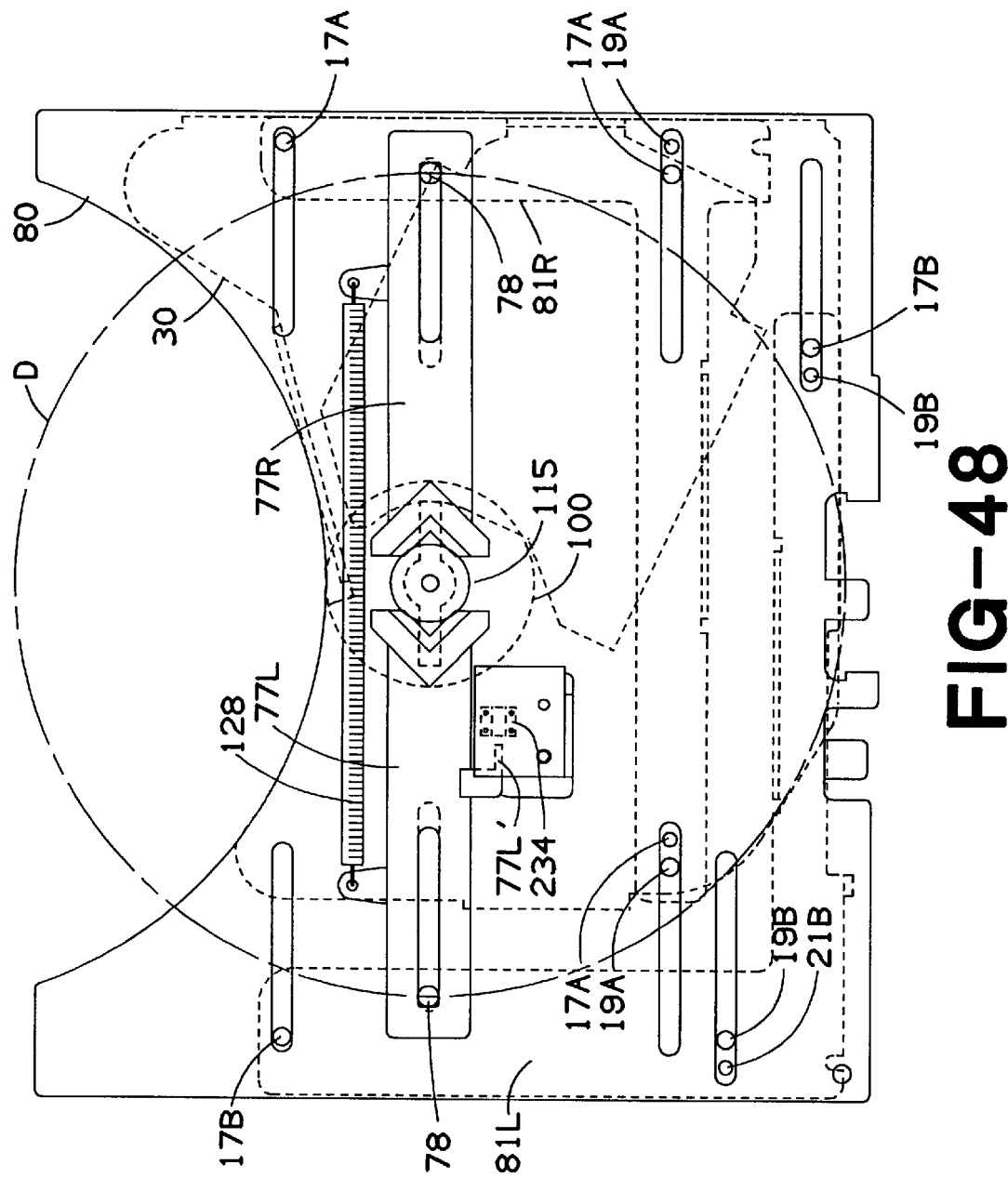
FIG. 48 is a top-view of the clamper support mechanism after the clamper has been released.

Referring to FIGS. 10, 45, and 47, a vertical transport mechanism 1008, raises and lowers base 40, with the attached optical mechanism 1006, between an up position (FIG. 47) and a down position (FIG. 45). In the up position, disk D is played back. In the down position, optical mechanism 1006 is shifted down and away from disk D to clear the way for transfer of disk D.

Vertical transport mechanism 1008 raises and lowers base 40, which is supported at its forward side on guide pins 45A and 45B and at its rear end on ramp channel 48'. Ramp channel 48' is cut out of a stainless steel guide plate attached to base 40 at the rear end thereof. Guide pins 45A and 45B rest in ramp channels 75A' and 75B' in bends 75A and 75B, respectively, of sliding plate 75. Ramp channel 48' rests on pin 47, inserted in an opening in a vertical extension 75C in sliding plate 75. Base 40, with elastically supported optical mechanism 1006, rides up and down on guide shafts 137A, 137B, which are attached to main chassis 90 and passing through openings in base 40. Sliding plate 75 is translated left and right relative to main chassis 90 causing guide pins 45A and 45B to ride up and down in ramp channels 75A' and 75B', respectively, and simultaneously causing ramp channel 48' to ride upwardly on pin 47.

Shafts 136A–136C, screwed into main chassis 90, guide the left and right movement of sliding plate 75. Shafts 136A–136C pass through channels 75H in sliding plate 75. Shafts 136A–136C have wide heads to hold sliding plate 75 adjacent to main chassis 90. A worm gear 254 pressed onto a rotating shaft 251A of a motor 251 meshes with a gear 184A of a gear member 184, which rotates on shaft 92 projecting upwardly from main chassis 90. Another gear 184B of gear member 184 meshes with a gear 71, which in turn meshes with a gear 72. Gear 72 in turn meshes with a large diameter gear of gear element 73. A small diameter gear of gear element 73 meshes with a large diameter gear of gear element 74. A small diameter gear 74A of gear element 74 in turn meshes with an integral rack 75F in sliding plate 75. Gears 71 and 72, and gear elements 73 and 74, all rotate on respective integral shafts that fit into respective holes in the bottom of main chassis 90. Therefore, rotation of motor 251 translates sliding plate 75 left and right.

A shutter wheel 58, attached to a top of gear member 184, periodically interrupts a light beam of an optical sensor 233, supported on a bracket 181, as gear member 184 rotates, to generate a series of signals (sliding plate motion pulse signal, $\overline{P.PULSE}$, described below). This series of signals is used by a controller to determine the position of sliding plate 75.

Figure 34:
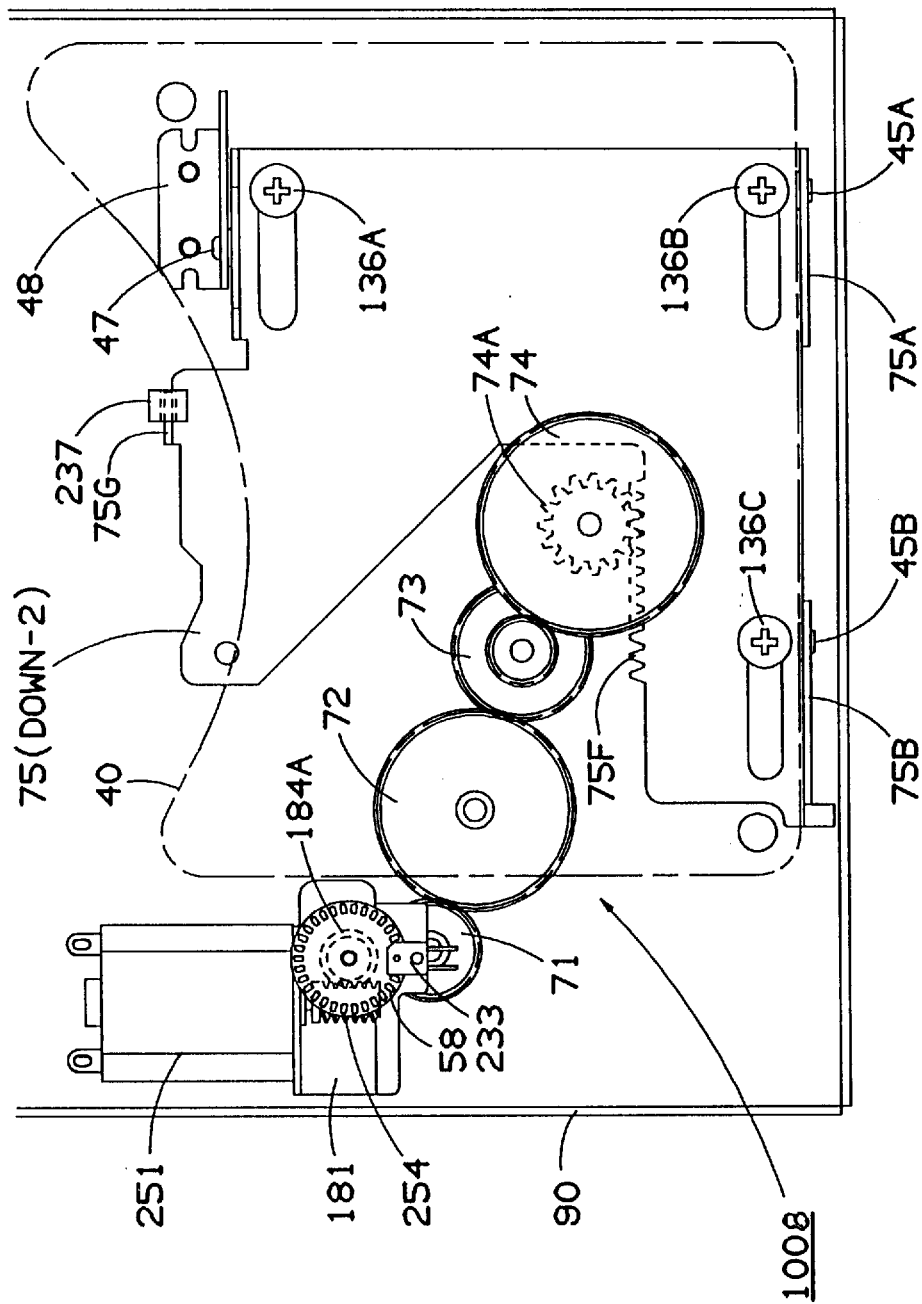
FIG. 34 is a top-view of optical mechanism vertical transfer mechanism where the sliding plate mechanism is in the first state in which the optical mechanism is lowered.
Figure 35:
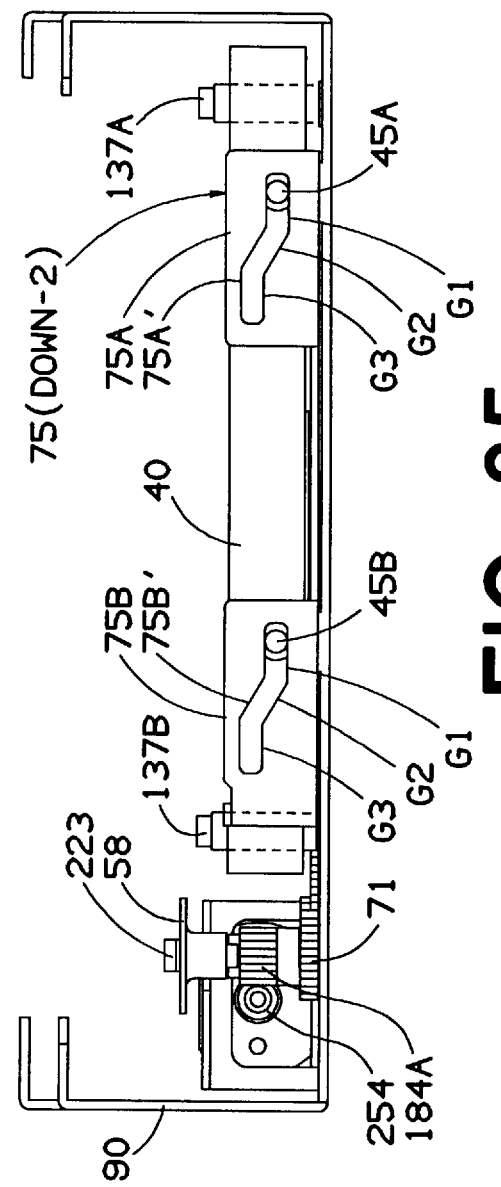
FIG. 35 is an end-view of optical mechanism vertical transfer mechanism where the sliding plate mechanism is in the first state in which the optical mechanism is lowered.
Figure 36:
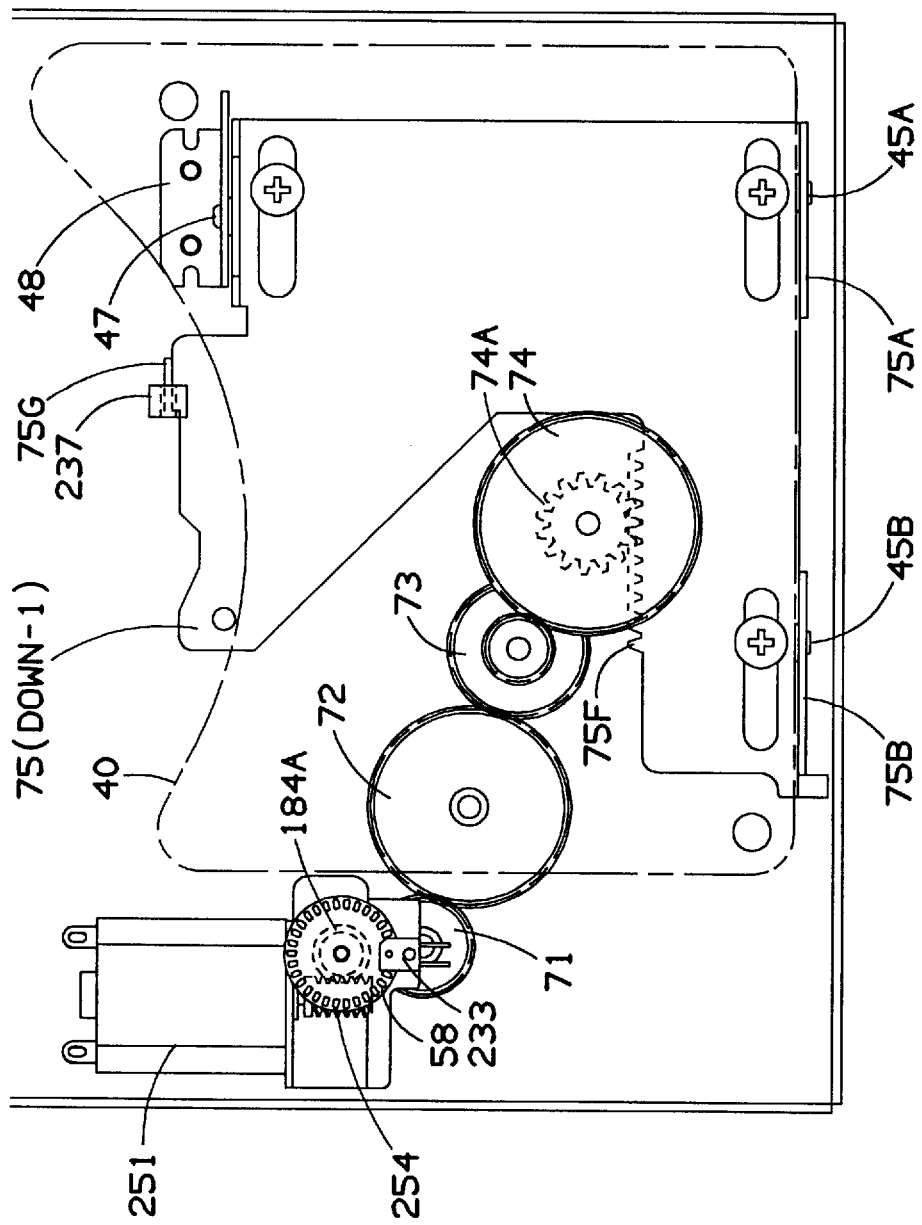
FIG. 36 is a top-view of optical mechanism vertical transfer mechanism where the sliding plate mechanism is in the second state in which the optical mechanism is lowered.
Figure 37:
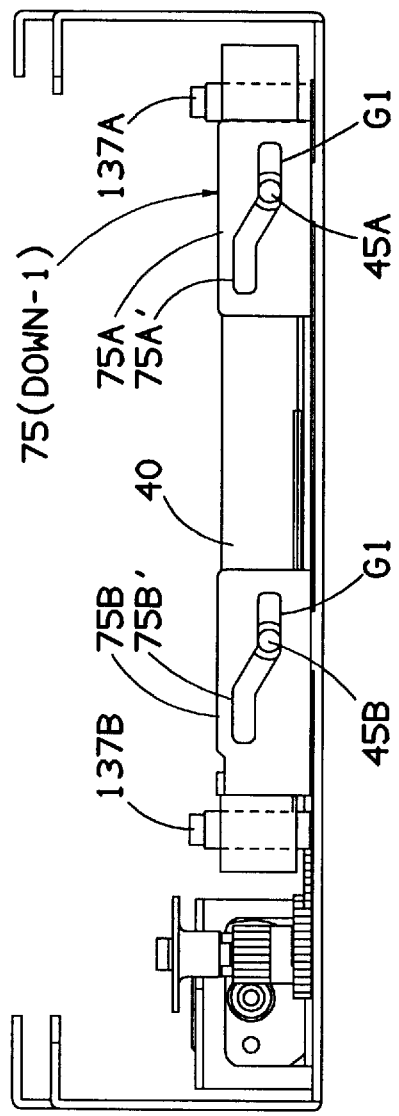
FIG. 37 is a end-view of optical mechanism vertical transfer mechanism where the sliding plate mechanism is in the second state in which the optical mechanism is lowered.
Figure 38:
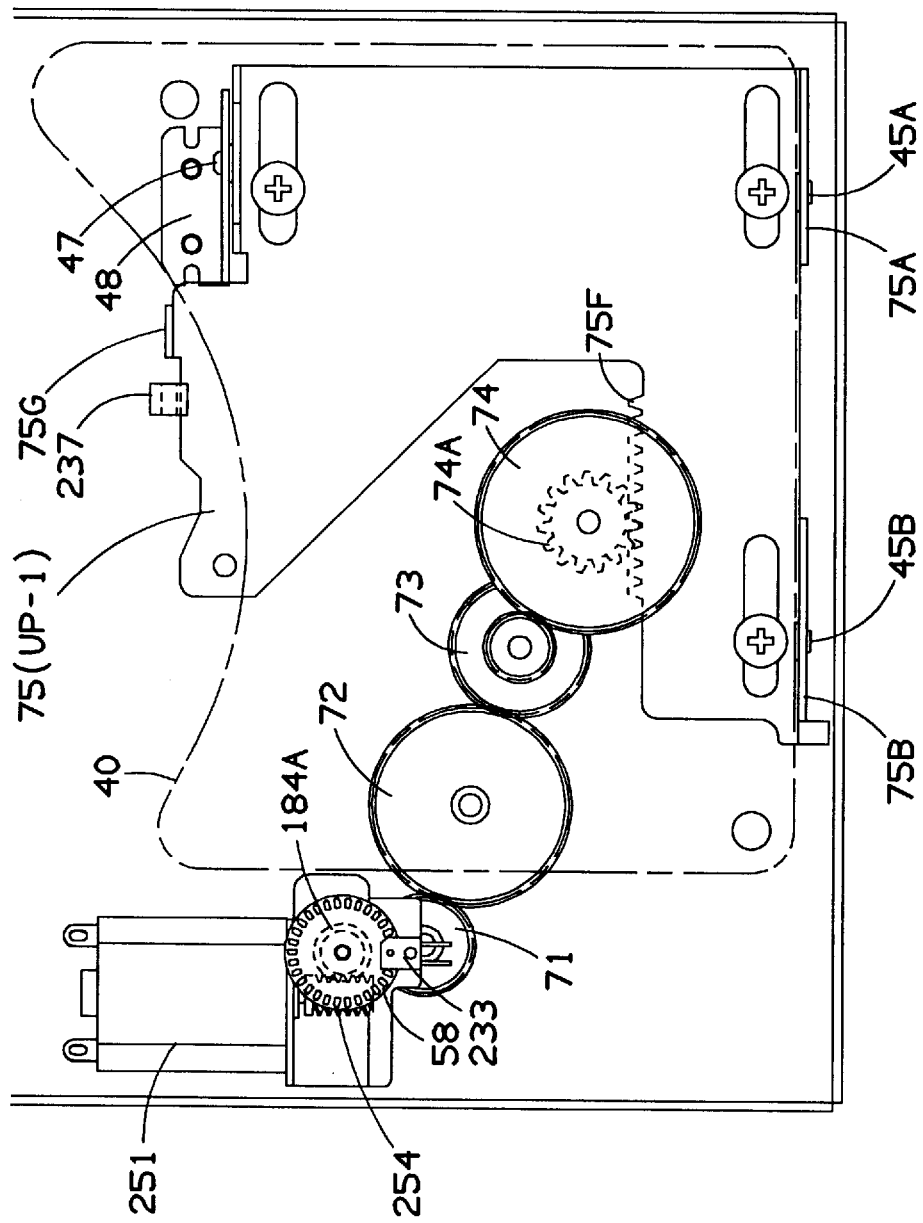
FIG. 38 is a top-view of optical mechanism vertical transfer mechanism where the sliding plate mechanism is in the third state in which the optical mechanism is raised.
Figure 39:
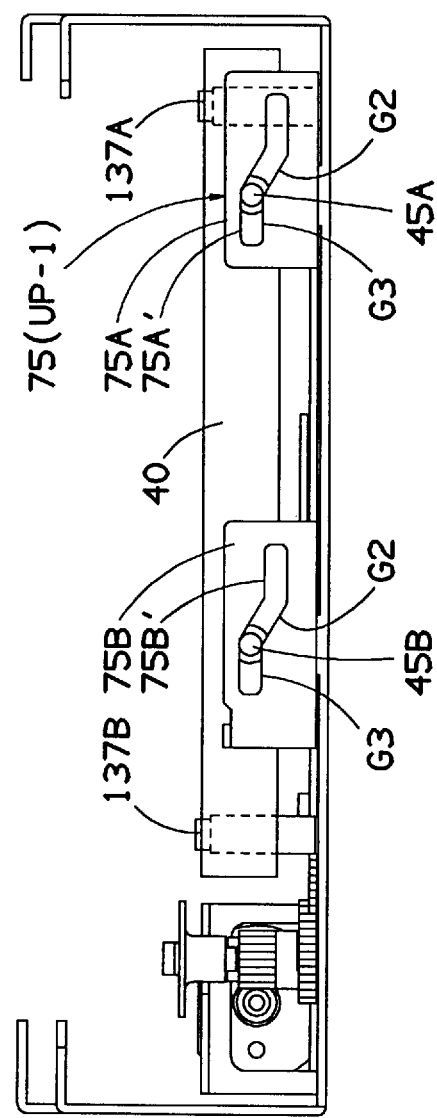
FIG. 39 is a top-view of optical mechanism vertical transfer mechanism where the sliding plate mechanism is in the third state in which the optical mechanism is raised.
Figure 40:
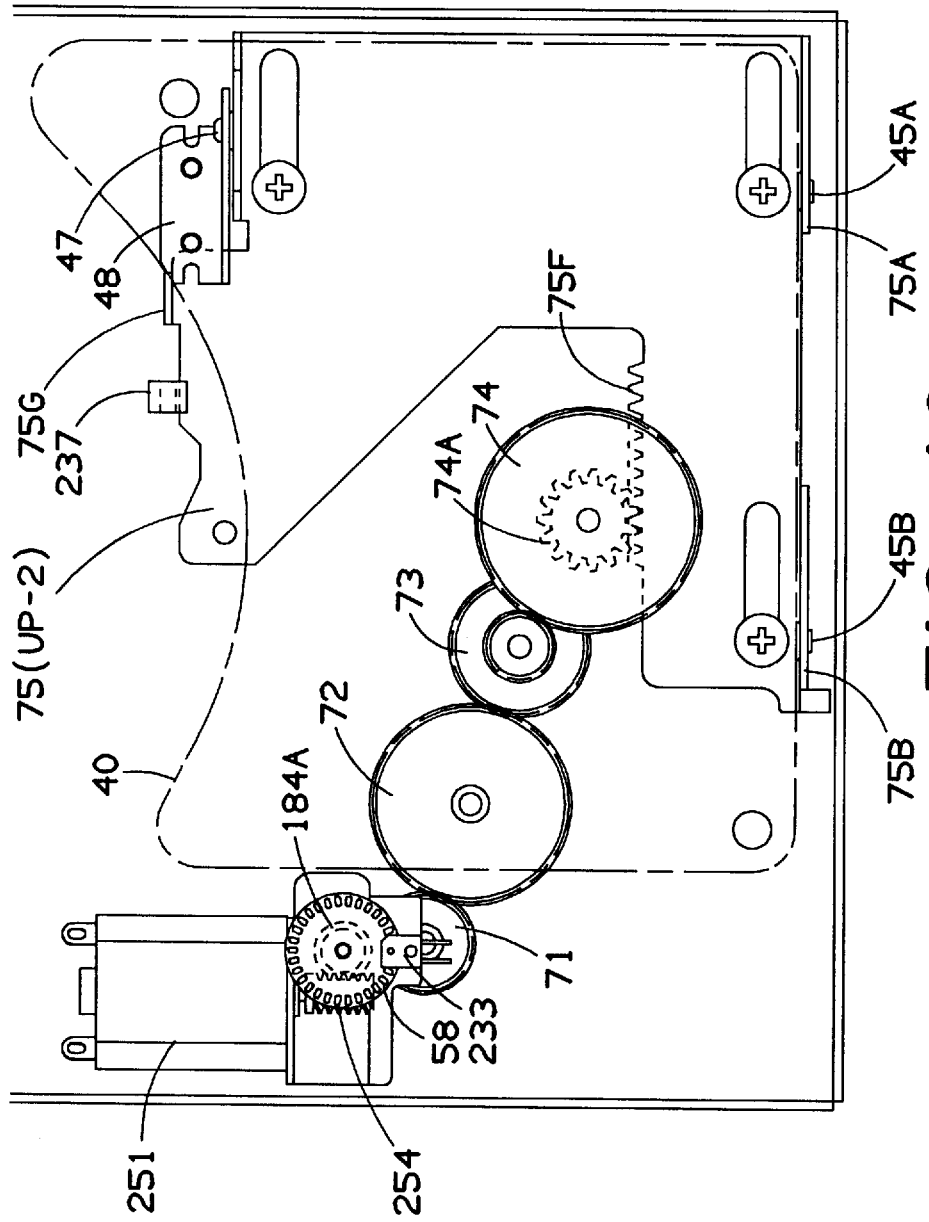
FIG. 40 is a top-view of optical mechanism vertical transfer mechanism where the sliding plate mechanism is in the fourth state in which the optical mechanism is raised.
Figure 41:
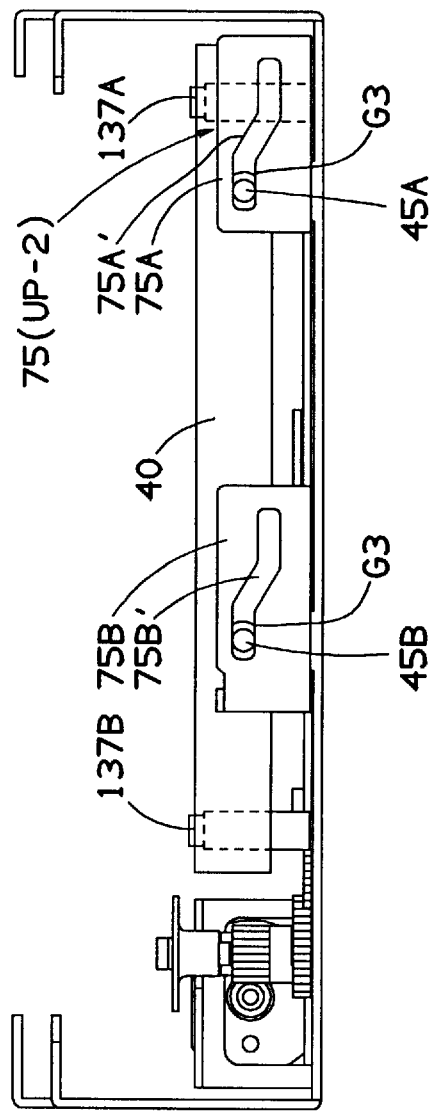
FIG. 41 is a top-view of optical mechanism vertical transfer mechanism where the sliding plate mechanism is in the fourth state in which the optical mechanism is raised.
Figure 66:
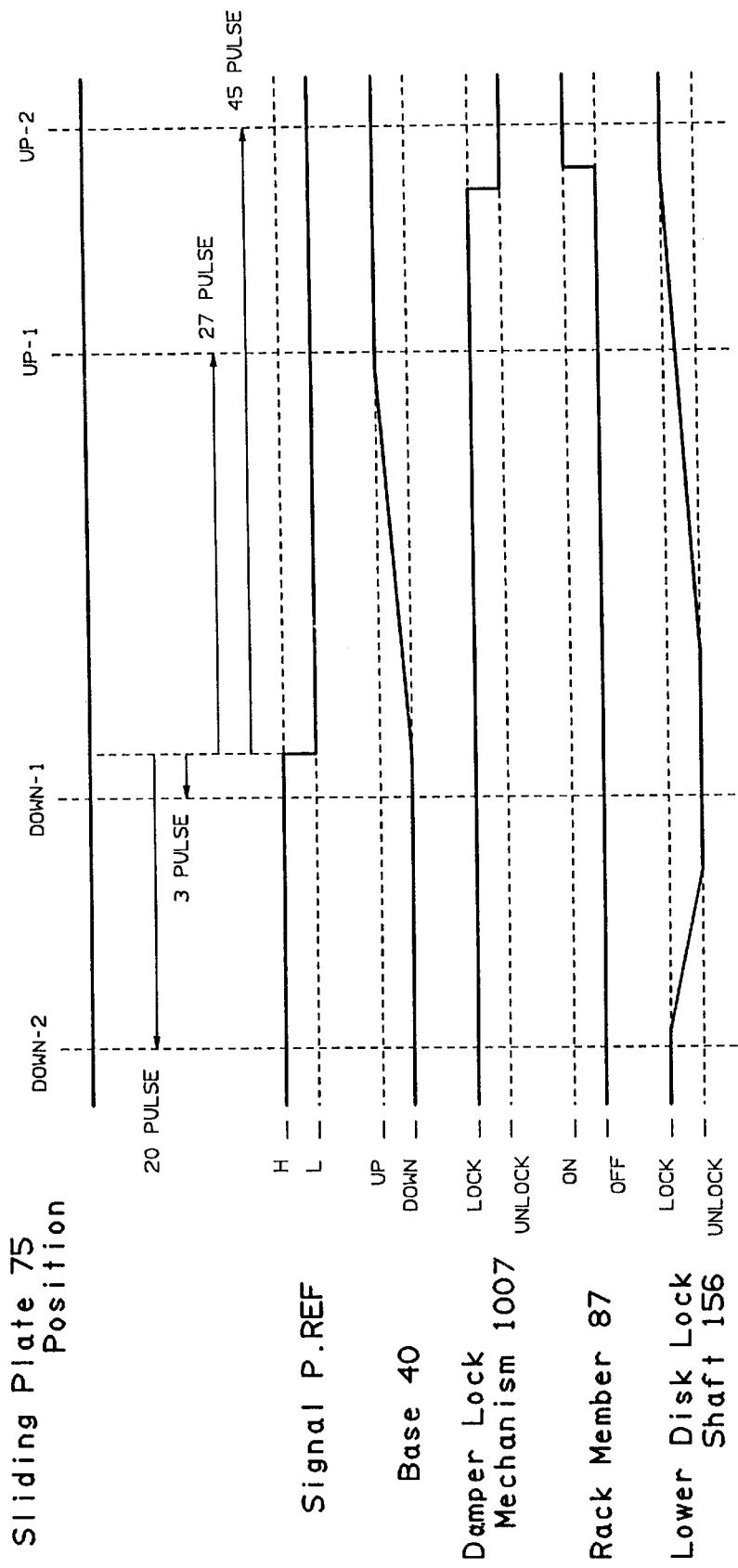
FIG. 66 is a timing chart indicating the relative states of the clamper lock mechanism the rack and pinion mechanism used to open the loading plates, the disk lock mechanism, the position of the optical mechanism, the position of the sliding plate and the state of a signal used to register the sliding plate position.

Referring now also to FIG. 66, horizontal portions G1 of ramp channels 75A' and 75B' guide pins 45A and 45B of base 40, without lifting them, as sliding plate 75 moves between a position DOWN-2 (shown in FIGS. 34 and 35) and a position DOWN-1 (shown in FIGS. 36 and 37). Thus, base 40, with optical mechanism 1006, remains in the down position (optical mechanism 1006 is shown in the down position in FIG. 45), below disk D in the playback position. When sliding plate 75 moves between position DOWN-1 and position UP-1 (the latter shown in FIGS. 38 and 39), guide pins 45A and 45B are lifted by sloping portions G2 of ramp channels 75A' and 75B', thereby lifting optical mechanism 1006. When sliding plate 75 moves between position UP-1 and position UP-2 (the latter shown in FIGS. 40 and 41), guides pins 45A and 45B remain in horizontal portions G3 and optical mechanism remains in the up position (optical mechanism 1006 is shown in the up position in FIG. 47) for disk playback. In the up position, optical mechanism 1006 is at the level of a lower surface of disk D, d in the playback position and mounted on the upper surface of turntable 102. Therefore, there is no need to displace disk D, d, as in a tray-type disk player, to play disk D, d back. As can be seen from inspection, guide groove 48' and pin 47 cooperate in such a way that the rear end of base 40 is lifted in concert with the forward end, just as described above.

One pulse of signal $\overline{\text{P. PULSE}}$ indicates approximately 0.231 mm of movement of sliding plate 75. A shutter piece 75G, on a bend on sliding plate 75, interrupts a light beam generated and sensed by optical sensor 237 on main chassis 90. Thus, optical sensor 237 detects a reference position of sliding plate 75 at the point where shutter piece 75G just ceases to interrupt the light beam as sliding plate 75 moves to the right of position DOWN-1 or just interrupts as sliding plate 75 moves left of position UP-1. This reference signal, generated by optical sensor 237, is signal $\overline{\text{P. REF}}$. Signal $\overline{\text{P. REF}}$ goes low (L) when shutter piece 75G ceases to interrupt the light beam generated by optical sensor 237 and goes high when the beam is interrupted.

The positions of sliding plate 75 are determined by counting the number of pulses of signal $\overline{\text{P. PULSE}}$ after the signal $\overline{\text{P. REF}}$ goes low (L). Position DOWN-1 is detected by moving sliding plate 75 leftwardly after signal $\overline{\text{P. REF}}$ goes high (H), and halting after counting three pulses from signal $\overline{\text{P. PULSE}}$. Sliding plate 75 is positioned at position DOWN-2 by halting after counting 20 pulses. Sliding plate 75 is positioned at position UP-1 by moving sliding plate 75 to the right until signal $\overline{\text{P. REF}}$ goes low (L) and stopping after counting 27 pulses of signal $\overline{\text{P. PULSE}}$. Sliding plate 75 is positioned at position UP-2 by halting a rightward movement after counting 45 pulses.

Referring to FIGS. 2 and 49, a clamper 1009 clamps disk D on turntable 102. Clamper 1009 includes a clamper base 100 with a bottom surface to which a ferromagnetic plate 111, is attached. A clamp support 115 has a flange 115A top and a shaft 115B which passes through an opening 80G in loading chassis 80. Flange 115A tapers at its perimeter. Shaft 115B is insertably fixed to clamper base 100. A clamping sheet of compressed urethane is adhesively bonded to the outer perimeter of the bottom surface of clamper base 100 to protect disk surfaces from damage. Turntable 102 has a magnet 105 which is positioned to attract ferromagnetic plate 111.

Figure 43:
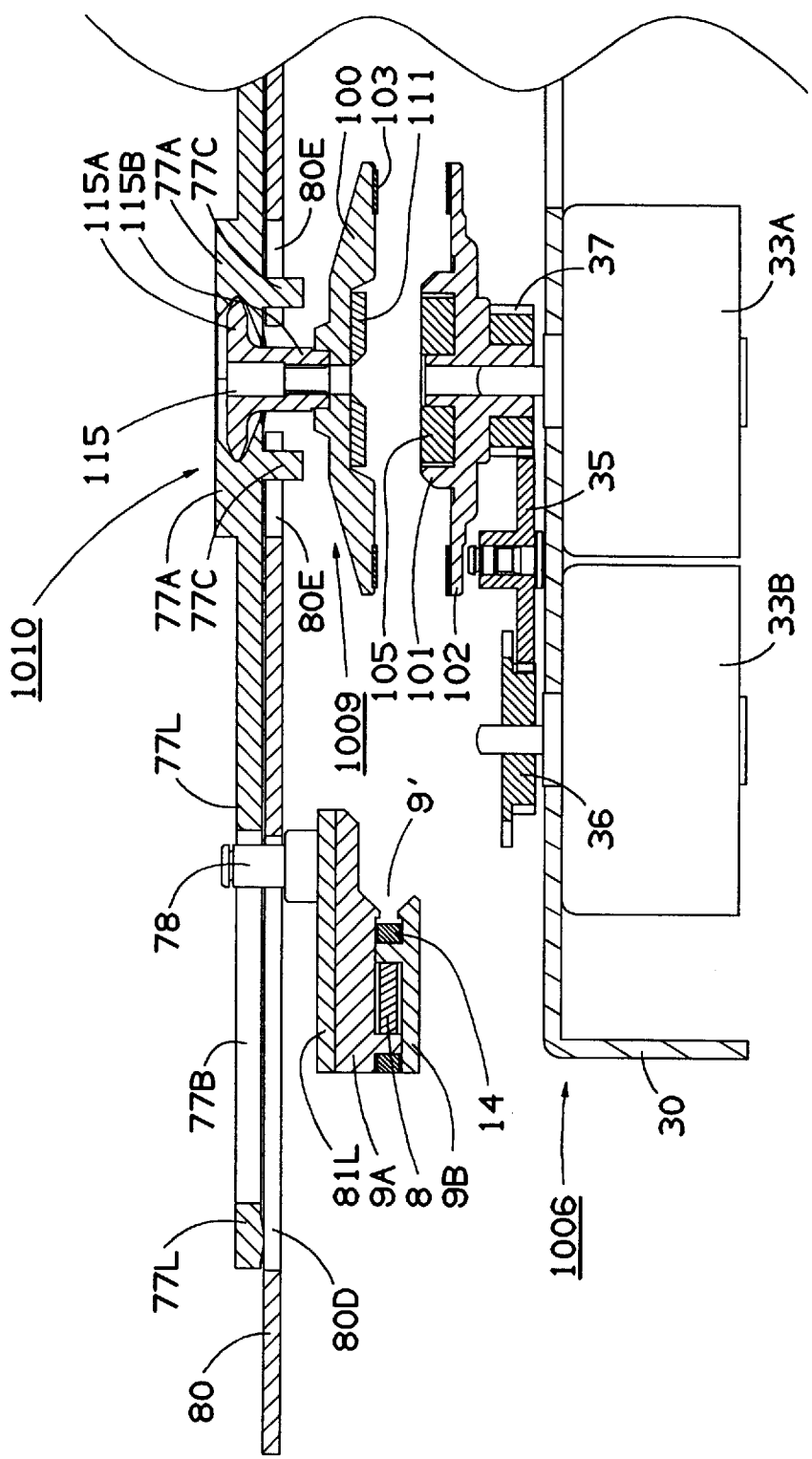
FIG. 43 is an end-wise section of the clamper support mechanism where the loading plates are the position shown in FIG. 42.
Figure 44:
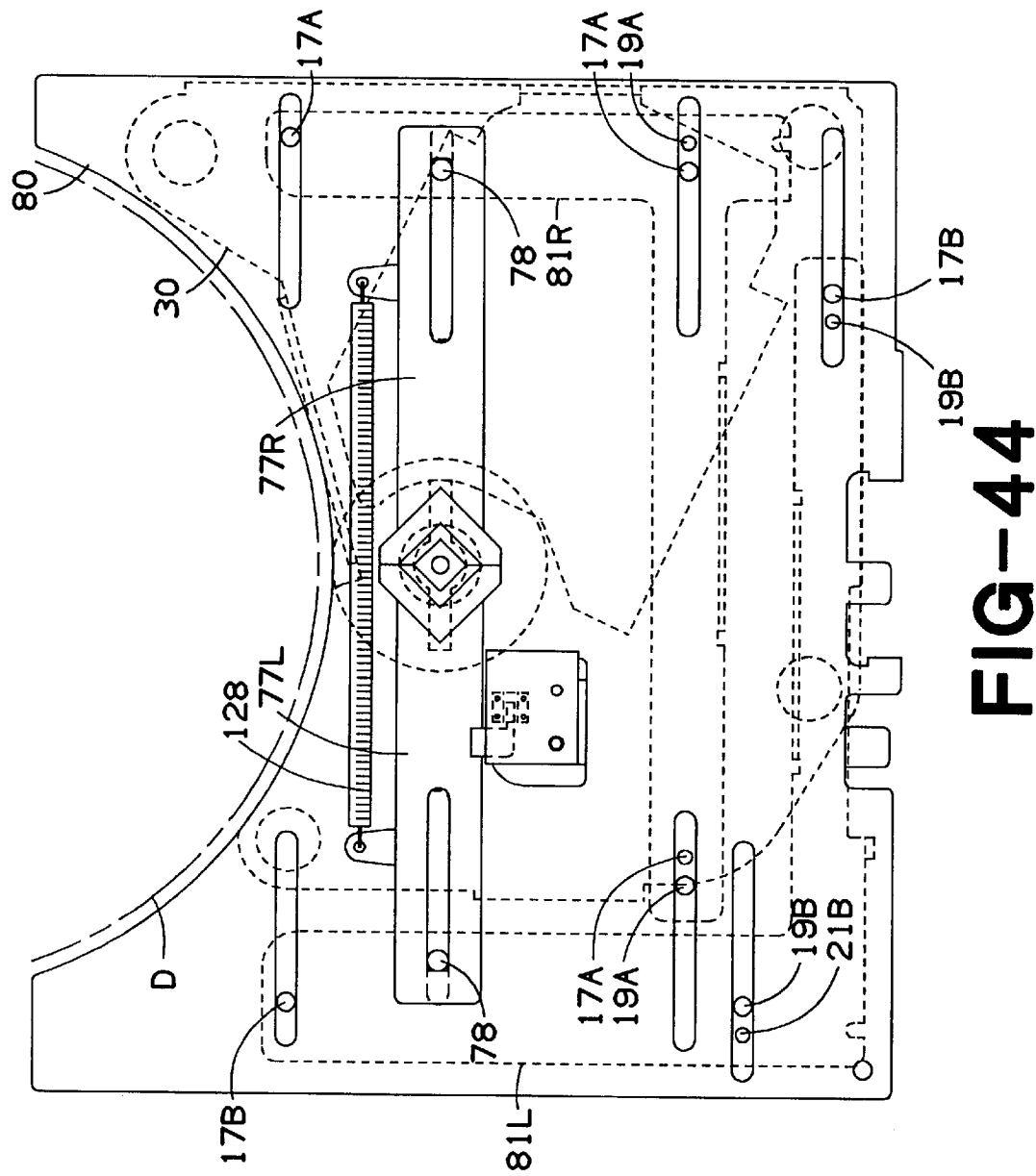
FIG. 44 is a top-view of the clamper support mechanism where the loading plates are in a position in which a large-diameter disk is supported.

Referring also to FIGS. 43 and 47, a clamper support mechanism 1010 holds clamper 1009 slightly (0.3 mm) above disk D when disk D is in the playback position. Respective pins 78, 78, projecting upwardly from the upper surface of loading plates 81L and 81R, pass through guide groove 80D of loading chassis 80 and insert into guide grooves 77B and 77B of clamper holder 77L, 77R. Respective projections 77C, 77C, projecting downwardly from clamper holders 77L, 77R, pass through, and are guided by, respective guide grooves 80E, 80E of loading chassis 80. Thus, clamper holders 77L, 77R are free to move left and right with respect to loading chassis 80. Clamper holders 77L, 77R have respective supports 77A, 77A on respective ends which face each other. Supports 77A, 77A are shaped to clamp and support flange 115A of clamper 1009 when supports 77A, 77A are brought together. Support 77A has a V-shaped cross section. A spring 128 urges clamper holders 77L and 77R together to snugly embrace flange 115A. Flange 115A fits precisely in supports 77A, 77A in a definite position when supports 77A, 77A are brought together. Thus, supports 77A, 77A hold flange 115A at a precise vertical position keeping clamper 1009 at 0.3 mm above disk D.

Referring to FIGS. 42–45, clamper support mechanism 1010 supports clamper 1009 above disk D responsively to movement of loading plates 81L and 81R as follows. When loading plates 81L and 81R are moved between a disk receiving position (POS. 1, shown in FIGS. 42 and 43) and large-diameter disk support position (POS.3 shown in FIGS. 44 and 45), pins 78, 78, on loading plates 81L and 81R, travel in guide grooves 77B, 77B of clamper holders 77L, 77R without affecting clamper holders 77L and 77R. The force of spring 128 brings clamper holders 77L, 77R together causing supports 77A, 77A to hold clamper 1009 0.3 mm above disk D in the playback position.

Referring now also to FIGS. 46–49, optical mechanism 1006 is raised to the up position. Next, loading plates 81L and 81R are separated (an open position, POS.4 shown in FIGS. 48 and 49). In the open position, respective pins 78, 78 on loading plates 81L and 81R press against respective ends of guide grooves 77B, 77B spreading clamper holders 77L and 77R apart against the force of spring 128. This causes supports 77A, 77A to release flange 115A. Clamper 1009 is then attracted to magnet 105 of turntable 102 clamping disk D between turntable 102 and clamper 1009. Loading plates 81L and 81R are brought to the open position (POS.4) even after disk D has been moved to the stock position so that the stocker can be moved up and down. When this happens, since no disk D is present on turntable 102 in the up position, clamper 1009 is attracted to magnet 105, and rests on centering cone 101 of turntable 102, as shown in FIG. 50.

Figure 50:
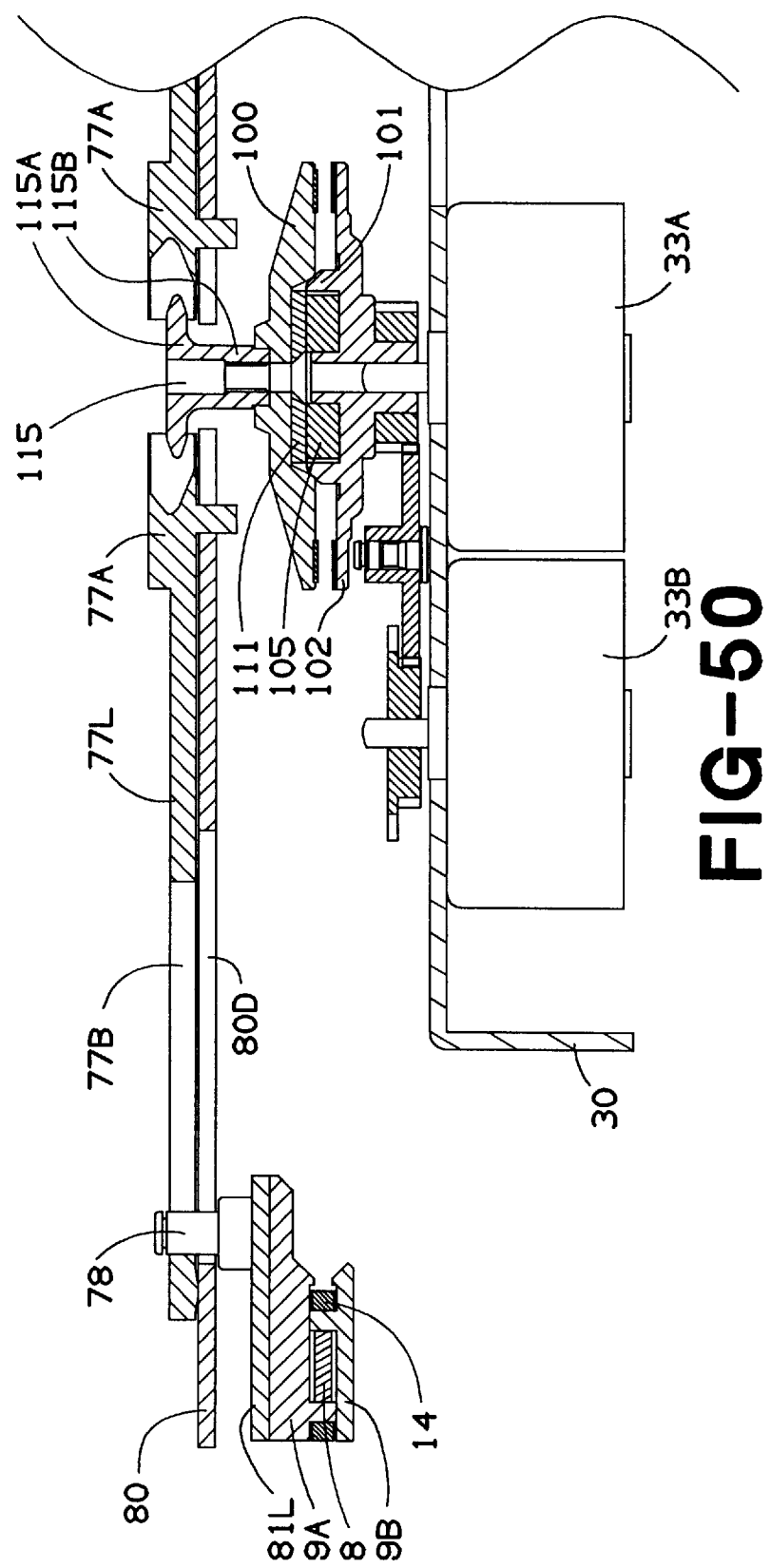
FIG. 50 is an end-wise section showing the clamper support mechanism after releasing the clamper while no disk is present between the clamper and the turntable.

Referring to FIGS. 2 and 50, a shutter piece 77L' on clamper holder 77L indicates clamp errors the outer perimeter position of loading plates 81L and 81R. An optical sensor 234, on loading chassis 80, detects the position of shutter piece 77L'. Optical sensor 234 generates a loading plate outermost position detection signal ($\overline{\text{OUT}}$) which is at a high level H when supports 77A, 77A are tightly held together around flange 115A and at a low level (L) when supports 77A, 77A are moved apart.

Figure 51:
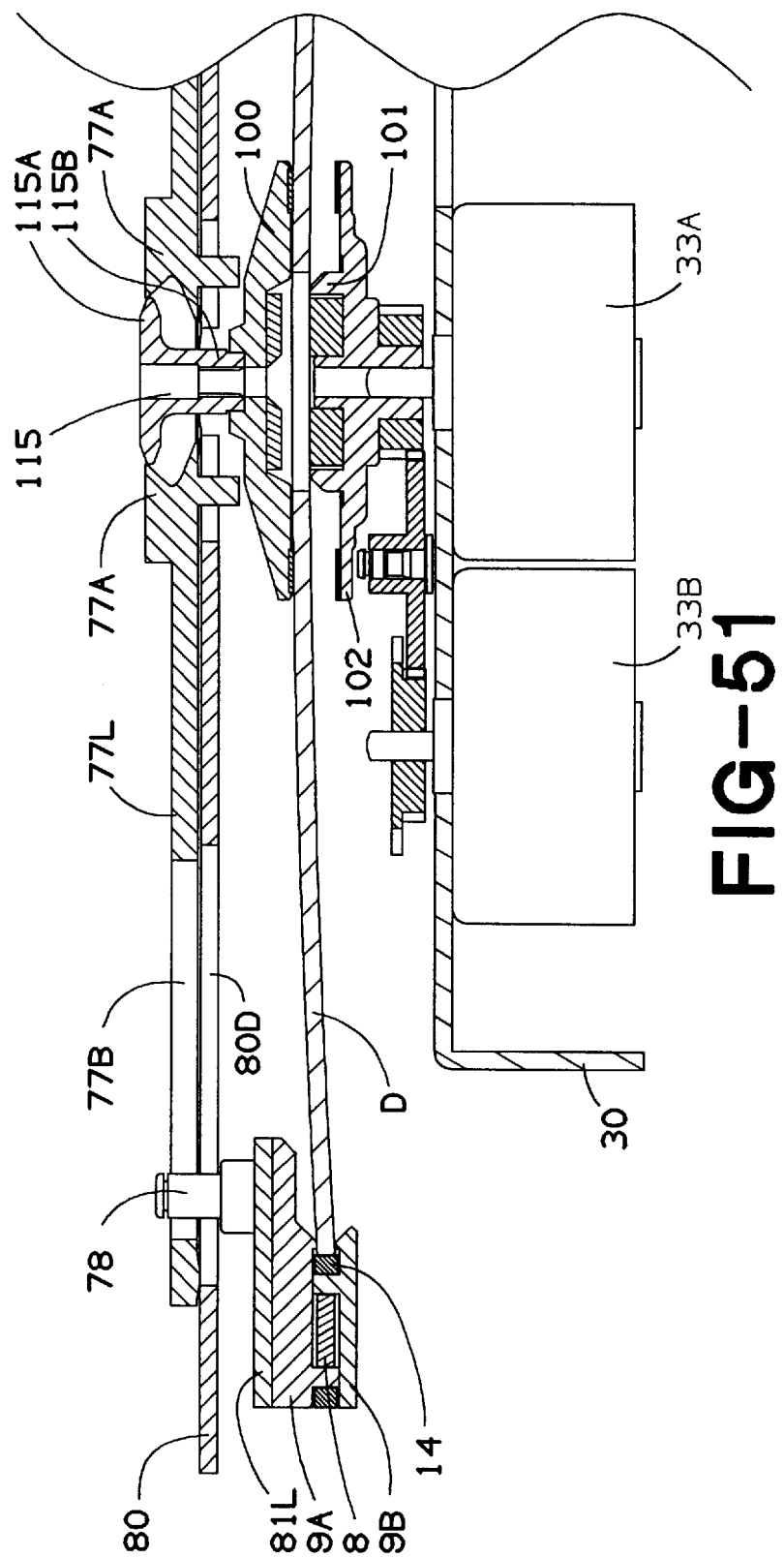
FIG. 51 is an end-wise section of the clamper support mechanism after an attempted disk clamping of a misaligned disk

Referring now to FIG. 51, supports 77A, 77A have wedge-shaped cross sections. If flange 115A is forced upwardly or downwardly, supports 77A, 77A can be spread apart. This may happen if, when optical mechanism 1006 is moved to the up position, disk D is misaligned with respect to turntable 102. Turntable 102 will force disk D upwardly against clamper 1009 causing supports 77A, 77A to spread apart. This will cause the $\overline{\text{OUT}}$ signal to go low indicating an error condition. Note that, in the up position of optical mechanism 1006, the upper surface of turntable 102 and the lower surface of disk D precisely coincide. Therefore, normally, the movement of turntable 102 to the up position should not raise disk D at all. Note also that as clamper 1009 is attracted toward turntable 102 due to the magnetic force of magnet 105, and since there is only 0.3 mm of clearance above disk D, clamper holders 77L, 77R are not forced substantially apart even if clamper 1009 is lowered to the surface of disk D. Therefore, unless loading plates 81L and 81R have been brought to the open position POS.4, the output from optical sensor 234 should remain in the high (H) state even when optical mechanism 1006 has moved to the up position. Thus, the output from optical sensor 234 (signal $\overline{\text{OUT}}$) is also used to detect clamping errors between clamper 1009 and turntable 102.

Referring now to FIG. 65, signal $\overline{\text{OUT}}$ goes low (L) when loading plates 81L and 81R separate beyond the point where a large-diameter disk can be supported between timing belt 14 and friction belt 12 at position POS.3. This serves as a reference point for the determination of other positions of loading plates 81L and 81R. Moving laterally from this reference position, where signal $\overline{\text{OUT}}$ goes low, and counting 11 pulses of signal $\overline{\text{L. PULSE}}$, position POS.4 is identified. Positions POS.1–POS.3 are represented, respectively, by 13, 76, 83 pulses of signal $\overline{\text{L. PULSE}}$ as loading plates 81L and 81R travel medially from position POS.4.

Figure 11:
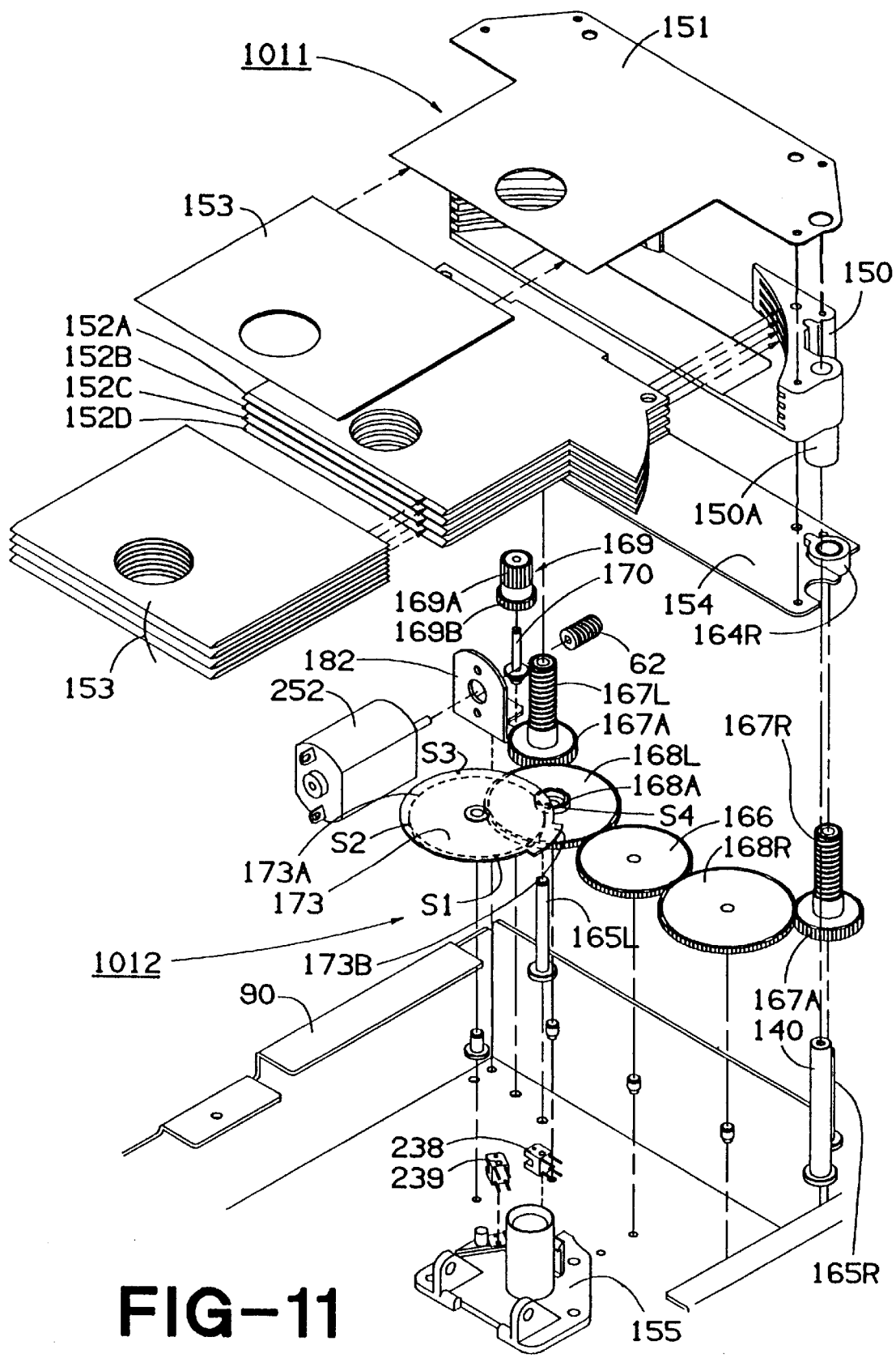
FIG. 11 is an exploded view of a stocker and stocker vertical transfer mechanism.

Referring to FIG. 11, a stocker 1011 is generally defined by a top plate 151, a base plate 154, and a stocker body 150.

Stocker plates 152A–152D are insertably affixed in respective slits of stocker body 150. Sheets 153, of the non-woven cloth, the same used as a case lining to protect floppy disks, are adhesively bonded to top and bottom surfaces of stocker plates 152A–152D and top plate 151. Sheets 153 are folded and wrapped around forward ends of stocker plates 152A–152D and top plate 151. Stocker 1011 removably supports a total of four disks (not shown in the drawing) at a pitch of 3 mm between top plate 151 and stocker plate 152D. A first stored disk is inserted between top plate 151 and stocker plate 152A. A second stored disk is stored between stocker plates 152A and 152B. A third stored disk is stored between stocker plates 152B and 152C. A fourth stored disk is stored between stocker plates 152C and 152D. Sheets 153 provide cushioning and low frictional drag, and thereby serve to protect disks D, d during insertion into the spaces between stocker plates 152A–D. The spacing between adjacent ones of stocker plates 152A–152D is substantially the same size as the thickness of disk D, d. In addition, each of stocker plates 152A–D has a width, perpendicular to the path of insertion disk d follows moving into and out of stocker 1011, that is smaller than the diameter of disk d. This insures that timing belt 14 and friction belt 12 can engage opposite edges of disk d at all times moving into and out of the stocker 1011.

A shaft 140, projecting upwardly from main chassis 90, is inserted in a bearing 150A to guide stocker 1011 along a vertical path of movement. Nuts 164L, 164R (nut 164L is hidden in the drawing) engage screws 167L, 167R that rotate on shafts 165L, 165R, respectively, projecting upwardly from main chassis 90. Thus, rotation of screws 167L, 167R moves stocker 1011 vertically. A stocker vertical transfer mechanism 1012, located below stocker 1011, drives screws 167R, 167L. A motor 252, supported by bracket 182 on main chassis 90, has a rotating shaft with a press-fitted worm gear 62. A gear member 169, rotatably supported by shaft 170, has a gear 169A, on an upper portion thereof, that meshes with worm gear 62. A gear 169B on a lower portion of gear member 169 meshes with a gear 167A attached to screw 167L. Gear 167A meshes with a gear 168L. Gear 168L meshes with a gear 166 which in turn meshes with a gear 168R. Gear 168R meshes with a gear 167A attached to screw 167R. Clockwise rotation of screws 167R and 167L lowers stocker 1011, and counterclockwise rotation of screws 167R and 167L raises stocker 1011.

A shutter member 173 rotates on a shaft projecting upwardly from main chassis 90. Shutter member 173 has a gear 173A, on its lower surface, that meshes with a gear 168A coaxially connected to gear 169L. Rotation of shutter member 173 is detected by optical sensors 238 and 239 and used to determine the vertical movement and position of stocker 1011. A shutter piece 173B projects from an edge of shutter member 173 and slits S1–S4 in shutter member 173 divide shutter member 173 at 90 degree intervals. Shutter piece 173B and slits S1–S4 are detected by optical sensors 238 and 239, respectively, on a disk lock base 155.

Optical sensor 238 generates a stocker reference position signal ($\overline{S.REF}$), when shutter piece 173B interrupts a light beam generated and detected by optical sensor 238. Signal $\overline{S.REF}$ goes high when stocker 1011 is brought to a position above disk holding position POS(1). POS(1) of stocker 1011 corresponds to an alignment of the disk-holding space between top plate 151 and stocker plate 152A with a disk transfer position.

Optical sensor 239 generates a stocker position signal ($\overline{S.POS}$). Each time stocker 1011 passes one of positions POS(1)–POS(4), the signal goes low (L). Thus, position POS(1) is detected by moving the stocker downward until signal $\overline{S.POS}$ goes low (L) after signal $\overline{S.REF}$ goes high (H). The remaining positions POS(2), POS(3), and POS(4) are detected moving stocker 1011 further and counting second, third, or fourth changes in signal $\overline{S.POS}$, respectively.

Figure 12:
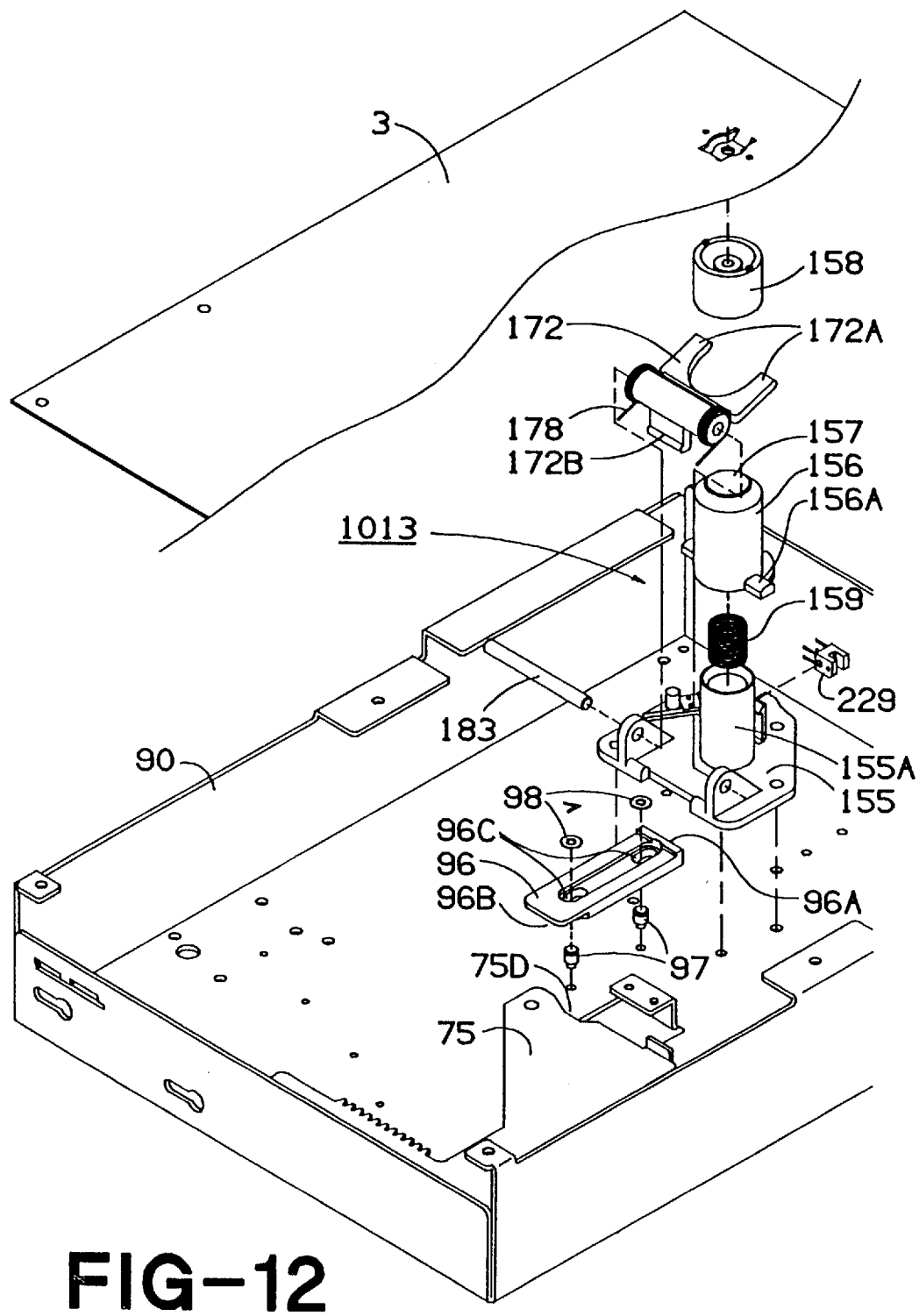
FIG. 12 is an exploded view of a disk lock mechanism.
Figure 53:
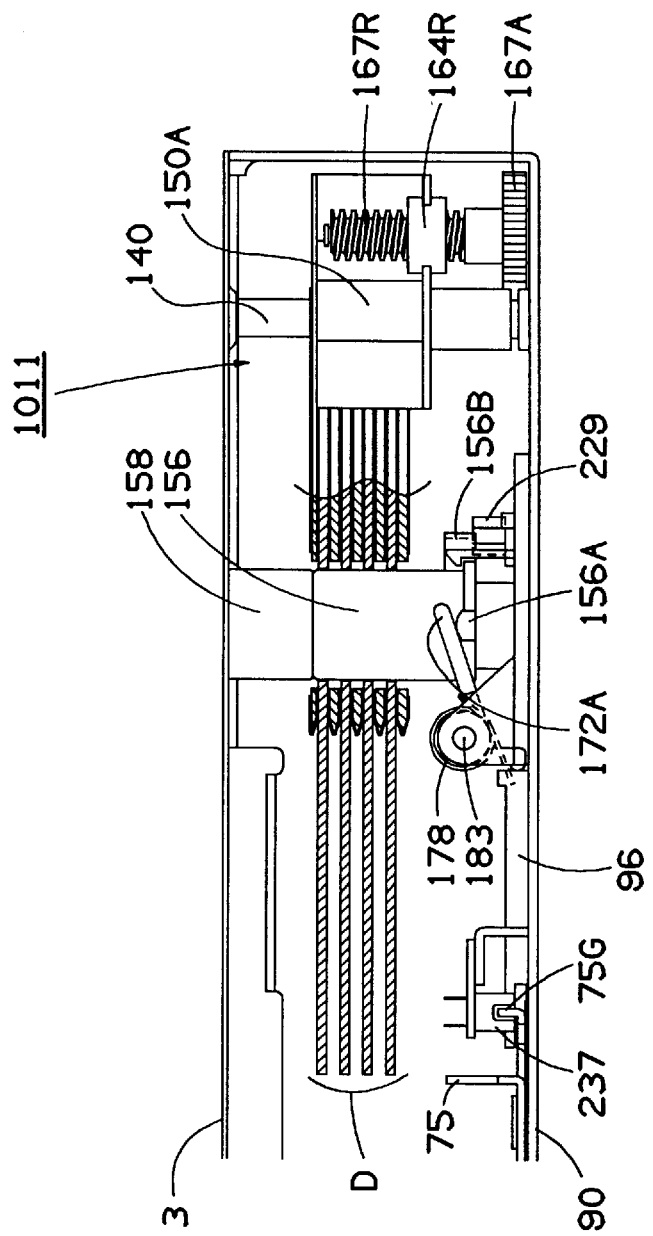
FIG. 53 is a side section showing the disk lock mechanism with the sliding plate mechanism and the disk lock mechanisms in the position of FIG. 52.
Figure 54:
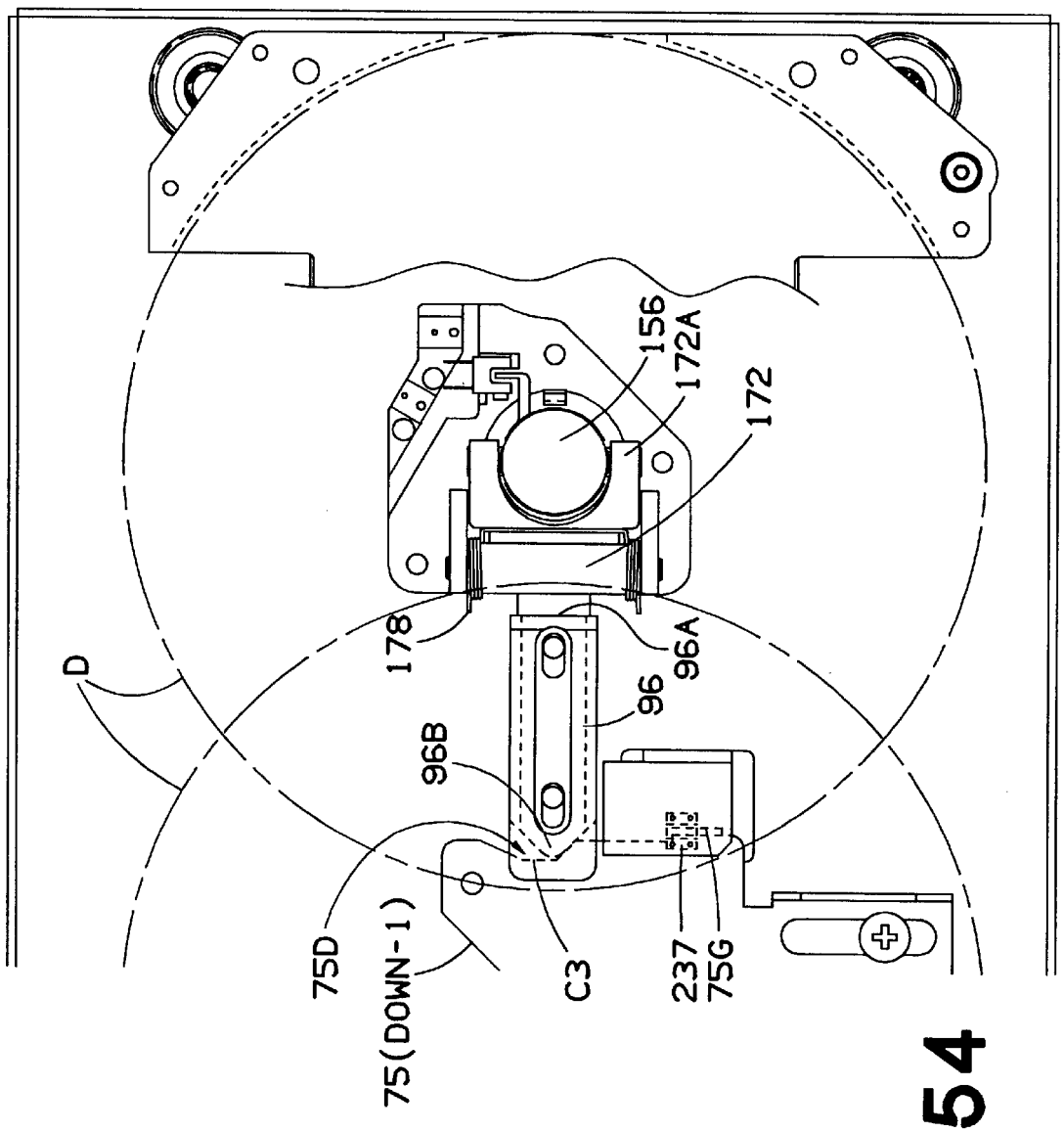
FIG. 54 is a top view of the disk lock mechanism with the sliding plate mechanism in the second position in which a disk is unlocked.
Figure 55:
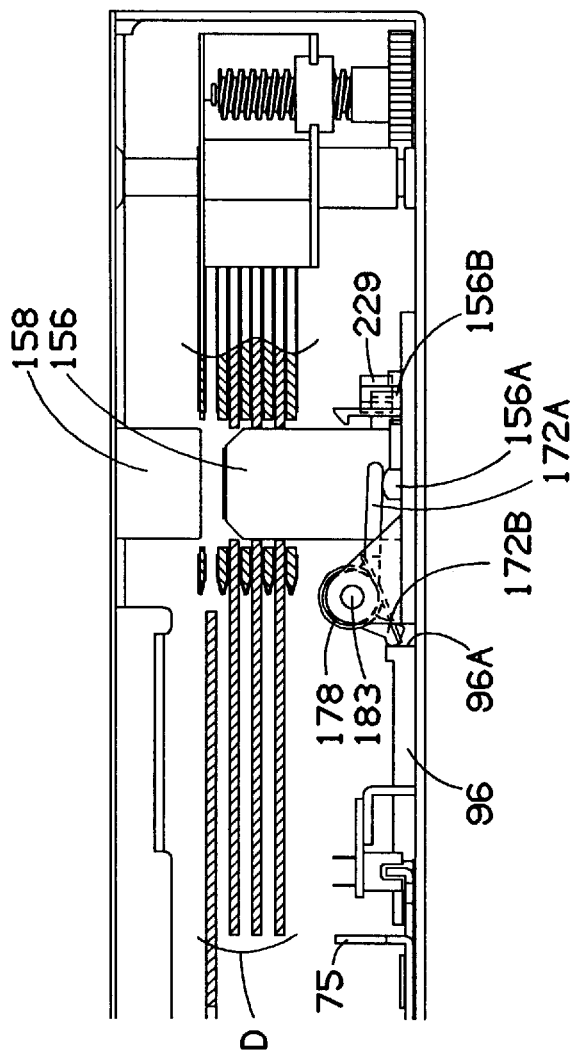
FIG. 55 is a side section showing the disk lock mechanism with the sliding plate mechanism and disk lock mechanisms in the positions of FIG. 54.
Figure 56:
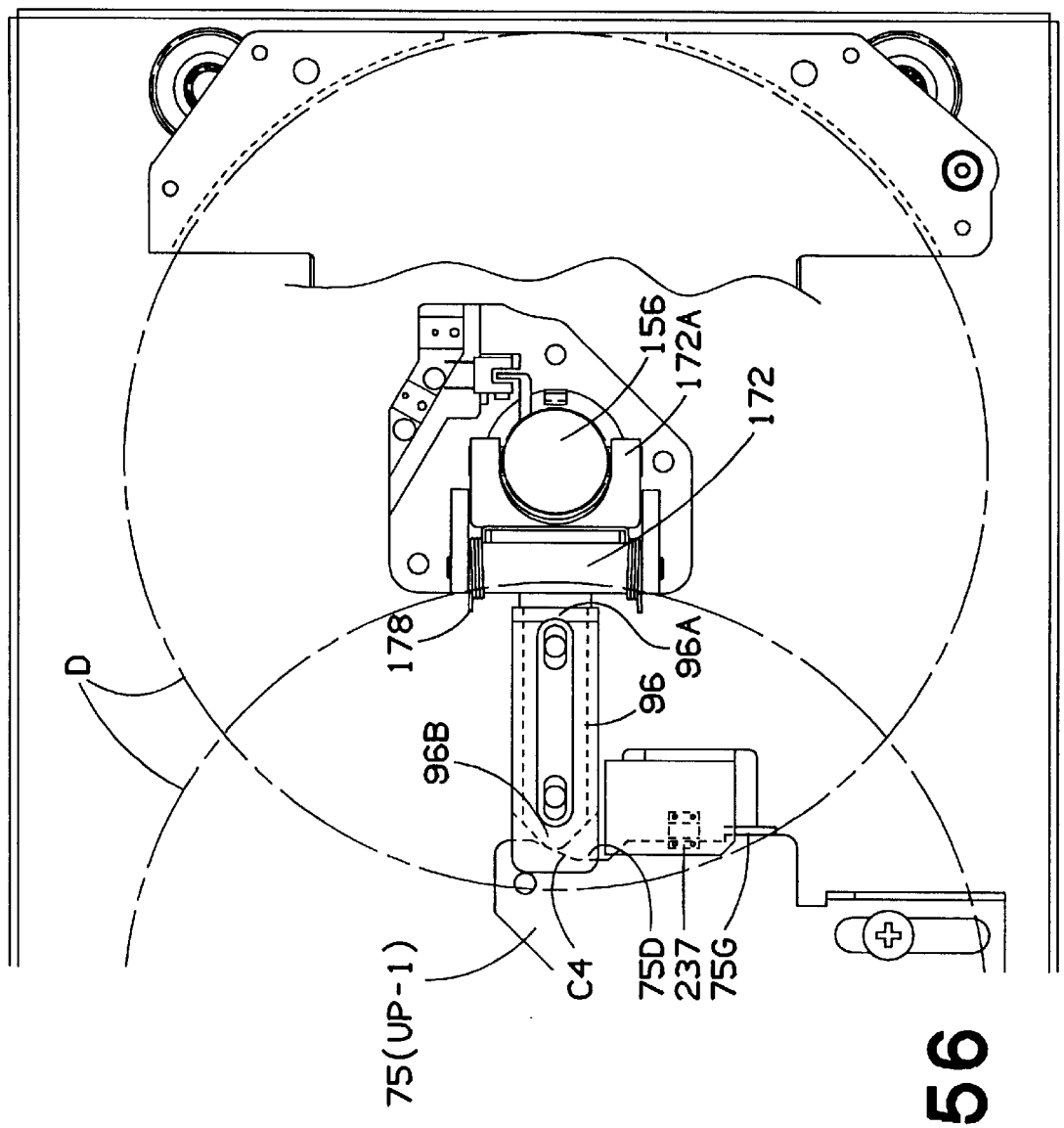
FIG. 56 is a top view of the disk lock mechanism with the sliding plate mechanism in the third position in which the lock is partly closed.
Figure 57:
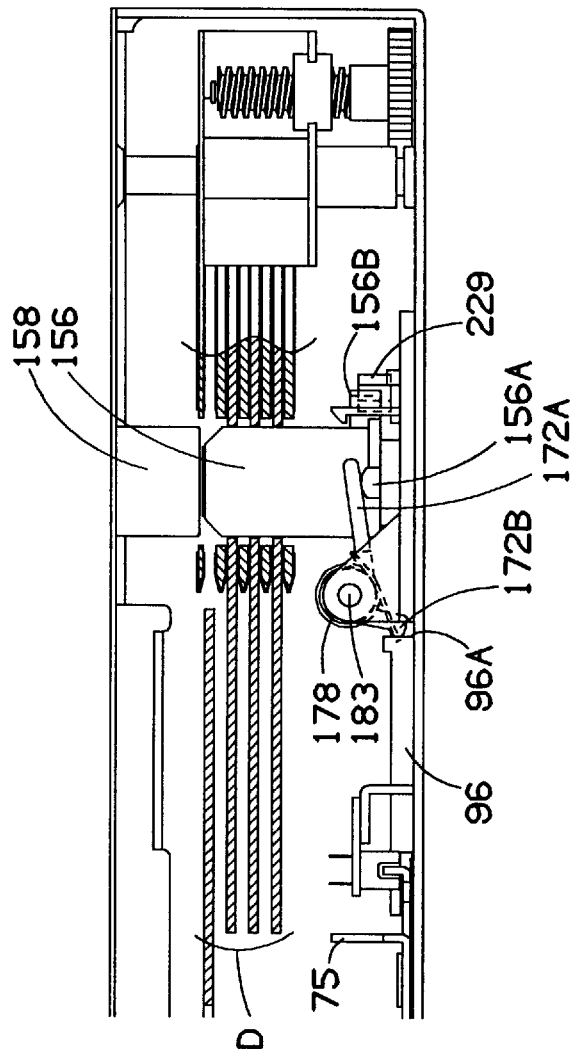
FIG. 57 is a side section showing the disk lock mechanism with the sliding plate mechanism and disk lock mechanisms in the positions of FIG. 56.

Referring to FIGS. 12, 53, and 55, a disk lock mechanism 1013, prevents disks, held in stocker 1011, from moving out of stocker 1011. An upper disk lock shaft 158 projects downwardly from a lower surface of top cover 3. Upper disk lock shaft 158 passes through spindle holes of disks stored in stocker 1011. A lower end of upper disk lock shaft 158 extends to a position slightly (0.8 mm) above an upper surface of a disk D being transported into stocker 1011 as shown in FIG. 55. Upper disk lock shaft 158 prevents movement of the disks above the disk D being transported. FIGS. 53 and 55 show the stocker in position POS(1), so upper disk lock shaft 158 does not pass through any of the disk spindle holes within stocker 1011. A lower disk lock shaft 156 projecting upward from main chassis 90 is coaxially aligned with upper disk lock shaft 158.

Lower disk lock shaft 156 rides on a shaft 155A of disk lock base 155 permitting lower disk lock shaft 156 to move vertically. Lower disk lock shaft 156 moves between a lock position and an unlock position. In the lock position, a tapered upper end of lower disk lock shaft 156 fits into upper disk lock shaft 158 (see FIG. 53). In the unlock position, lower disk lock shaft 156 is lowered away from upper disk lock shaft 158, creating a gap between upper and lower disk lock shafts 158 and 156 through which a disk can pass (see FIG. 55). A spring 159 inside lock shaft 156 applies an upward force on lower disk lock shaft 156. A sheet 157, of compressed urethane, is attached to the upper surface of lower disk lock shaft 156 to help avoid possible disk damage.

To raise and lower lower disk lock shaft 156, disk lock mechanism 1013 includes a lock release arm 172 rotatably supported by a shaft 183 of disk lock base 155. Lock release arm 172 has a pressing portion 172A that engages upper surfaces of projections 156A at a base of lower disk lock shaft 156. Spring 178 applies a clockwise rotating force to lock release arm 172 sufficient to overcome the force of spring 159 thereby forcing lower disk lock shaft 156 to its lowermost position. A relay plate 96 moves toward the front and rear guided by integral guide grooves 96C, 96C that engage pins 97 on main chassis 90. A rear-facing surface 96A of relay plate 96 pushes against an engagement portion 172B of lock release arm 172 to rotate lock release arm 172 counterclockwise against the force of spring 178. An engagement portion 96B on a lower surface of relay plate 96 engages with a cam surface 75D, having surfaces C1–C5, on an edge of sliding plate 75 (visible in FIGS. 52, 54, 56, and 58).

Referring now to FIGS. 12 and 52–59, lower disk lock shaft 156 is positioned responsively to the position of sliding plate 75. When sliding plate 75 is in a position DOWN-2, engagement portion 96B of relay plate 96 is engaged with surface C1 of cam surface 75D. In position DOWN-2, as shown in FIG. 53, lock release arm 172 is rotated to a position in which it exerts no downward force on lower disk lock shaft 156. Thus, in position DOWN-2, lower disk lock shaft 156 is seated in upper disk lock shaft 158, the lock position, held there by the force of spring 159.

When sliding plate 75 moves toward the right side of housing 1000 (toward the up position of optical mechanism 1006), engagement portion 96B of relay plate 96 follows sloped surface C2 of cam surface 75D, moving relay plate 96 toward the front of main chassis 90. As engagement portion 96B follows sloped surface C2, lock release arm 172 rotates clockwise under the urging of spring 178, forcing lower disk lock shaft 156 gradually downward. When sliding plate 75 reaches a position DOWN-1, shown in FIG. 54, engagement portion 96B of relay plate 96 rests on surface C3. Lock release arm 172 halts at the angle shown in FIG. 55, and lower disk lock shaft 156 is held at the unlock position, permitting disk transfer.

Figure 58:
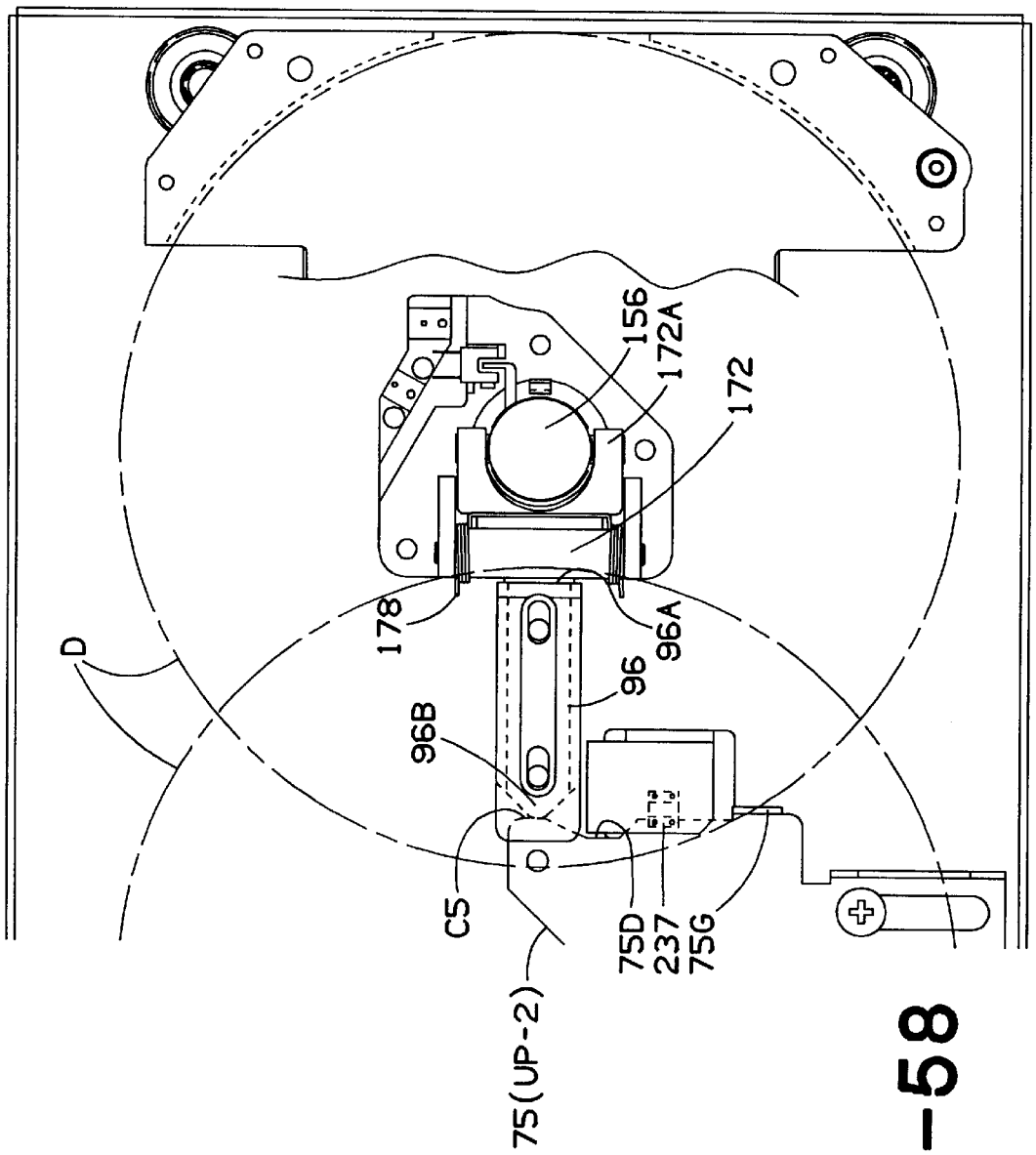
FIG. 58 is a top view of the disk lock mechanism with the sliding plate mechanism in the fourth position in which a disks are locked.

As sliding plate 75 is translated further to the right side of housing 1000, engagement portion 96B of relay plate 96 is pushed rearward by inclined surface C4. Lock release arm 172 rotates counterclockwise, and lower disk lock shaft 156 begins moving upwardly under the urging of spring 159. When sliding plate 75 reaches a position UP-1, shown in FIG. 56, engagement portion 96B is held by the approximately central area of sloped surface C4, in which lower disk lock shaft 156 moves upward to the position indicated in FIG. 57. When sliding plate 75 reaches a position UP-2, engagement portion 96B engages with surface C5, which is aligned with surface C1. At this point, as shown in FIG. 58, lower disk lock shaft 156 has reached the lock position again, where it fits into upper disk lock shaft 158.

A shutter 156B, projecting from lower disk lock shaft 156, indicates when lower disk lock shaft 156 reaches the lock position. Shutter 156B interrupts a light beam generated and detected by an optical sensor 229, attached to disk lock base 155 when lower disk lock shaft 156 is at the unlock position. Optical sensor 229 generates a disk lock signal ($\overline{\text{D. LOCK}}$), which is high when lower disk lock shaft 156 in the unlock position. When sliding plate 75 is at position UP-2 or position DOWN-2, lower disk lock shaft 156 is at the lock position, as described above. However, if disk D is not positioned with its center hole aligned with lower disk lock shaft 156, lower disk lock shaft 156 is blocked by disk D, preventing it from reaching the lock position. If disk locking is not properly achieved, vibrations can cause disks to shift out of place within stocker 1011, possibly causing damage to the disks by lower and upper disk lock shafts 156 and 158 which move vertically within stocker 1011. Signal $\overline{\text{D. LOCK}}$ is used to detect such disk-locking errors.

Referring to FIGS. 60–64, a disk insertion error preventing mechanism 1014 prevents errors during insertion of disk D. A shutter 120 rotates on a shaft 129 rotatably supported at either end by bends 80F, 80F projecting from loading chassis 80. Flaps 120A, 120A, projecting radially from an axis of rotation of shutter 120, block insertion aperture 1A on front panel 1. A pinion gear 120B, subtends a 180 degree arc about the axis of rotation of shutter 120. Material, such as felt or compressed urethane, is adhesively bonded to the surface of flaps 120A, 120A to prevent abrasion of the top surface of disk D, since the top surface of disk D engages flaps 120A during loading and ejecting operations.

A shutter arm 121 rotates on a shaft 122 projecting perpendicularly from the lower surface of loading chassis 80. A spring 125 urges shutter arm 121 in a counterclockwise direction, as viewed from the top. A rack 121A on the bottom of shutter arm 121 meshes with pinion gear 120B. Thus, shutter 120 opens and closes responsively to the rotation of shutter arm 121. A pin 123, fixed on the upper surface of the loading plate 81L, engages with side surface 121B of shutter arm 121 responsively to movement of plate 81L.

Figure 60:
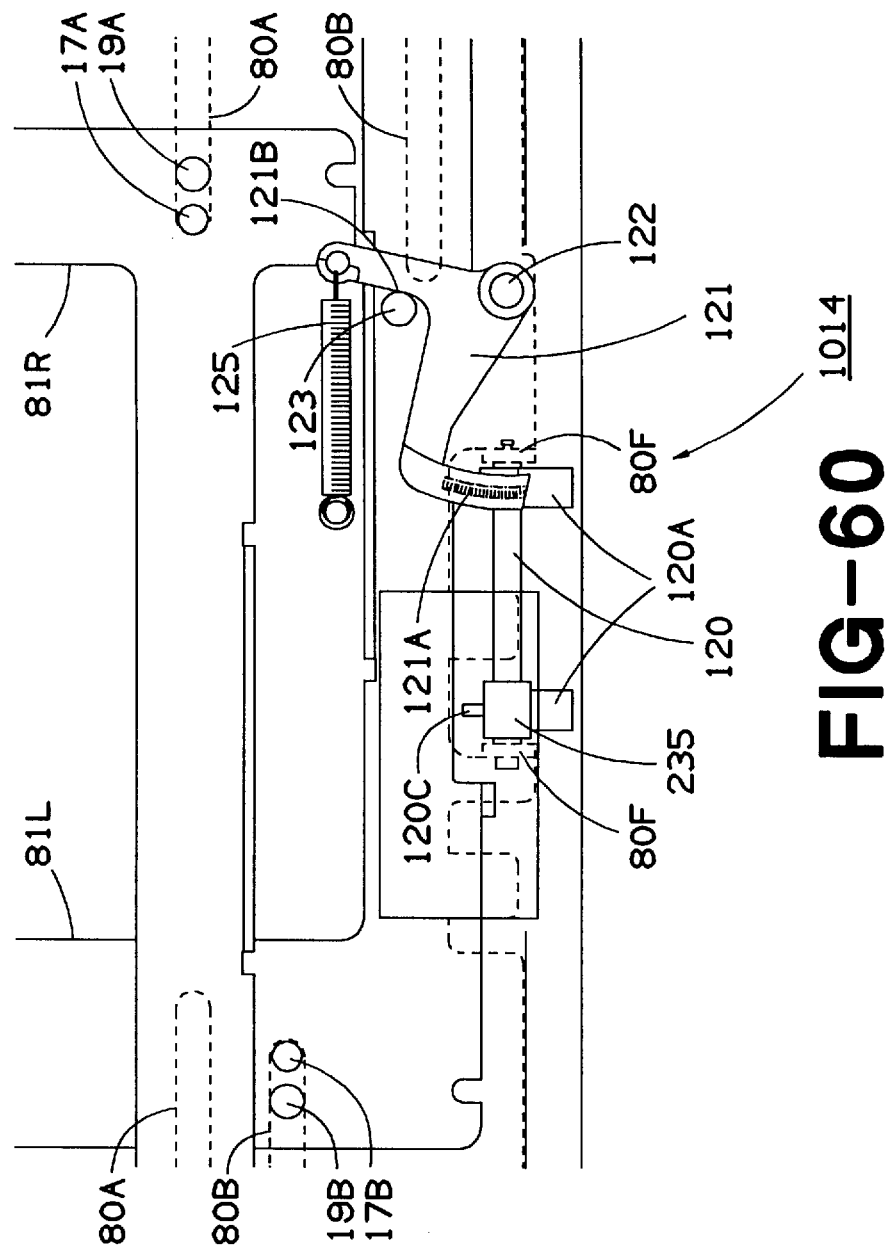
FIG. 60 is a top-view of a disk insertion error prevention mechanism prepared to allow insertion of a disk.

Referring now also to FIG. 65, the angle of shutter 120 changes responsively to the position of loading plate 81L. Referring to FIG. 60, when loading plates 81L and 81R are positioned at disk receiving position POS. 1, pin 123 of loading plate 81L rotates shutter arm 121 clockwise against the urging of spring 125. The rotation of shutter arm 121 causes shutter 120 to rotate toward the outside of the device, moving it to the open position. This allows a disk to be inserted into insertion aperture 1A.

Figure 64:
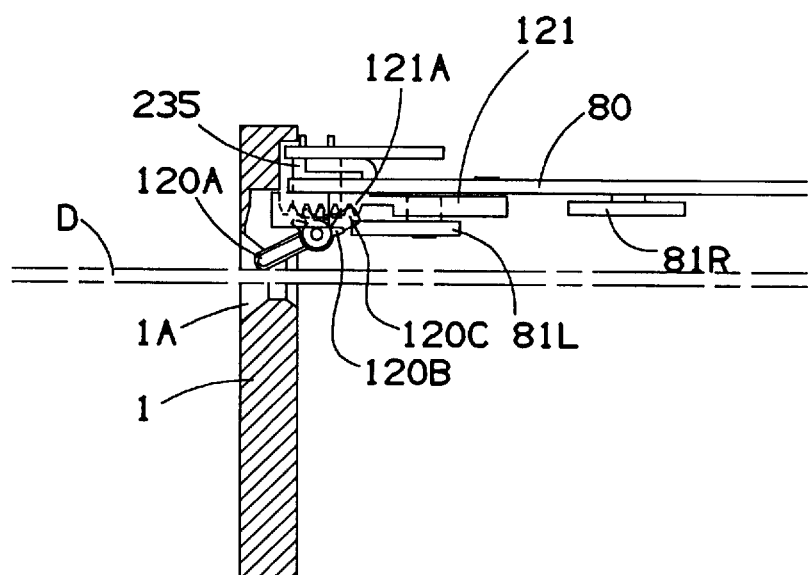
FIG. 64 is a partial end section of the disk insertion error prevention mechanism during transport of a disk past the flap closure.

The insertion of disk D causes loading plates 81L and 81R to separate. As loading plate 81L moves to the left side of housing 1000, pin 123 moves away from shutter arm 121 permitting spring 125 to rotate shutter arm 121 counterclockwise. As shutter arm 121 rotates, flaps 120A move downwardly until they rest on the top surface of disk D, as shown in FIG. 64. Pin 123 continues to move away from side surface 121B of shutter arm 121. Once disk D is driven by disk transfer mechanism 1001 completely inside the disk player, flap 120A is released to a close position in which shutter arm 121 is rotated counterclockwise to a position where its side surface 121B engages with bend 80F of loading chassis 80. When shutter 120 is in the close position, disk insertion through insertion aperture 1A is prevented. Shutter 120 cannot rotate past the close position in which flaps 120A point downwardly because an arm supporting rack 121A is supported by bend 80F, preventing further rotation of shutter 120. Thus, insertion of another disk is blocked.

A shutter piece 120C, on the upper part of shutter 120, interrupts a light beam generated by an optical sensor 235, on loading chassis 80, to detect the closure of shutter 120. The closure of shutter 120 is indicated by shutter close signal (S.CLOSE) generated by optical sensor 235. Signal S.CLOSE goes high when shutter 120 closes.

Figure 16:
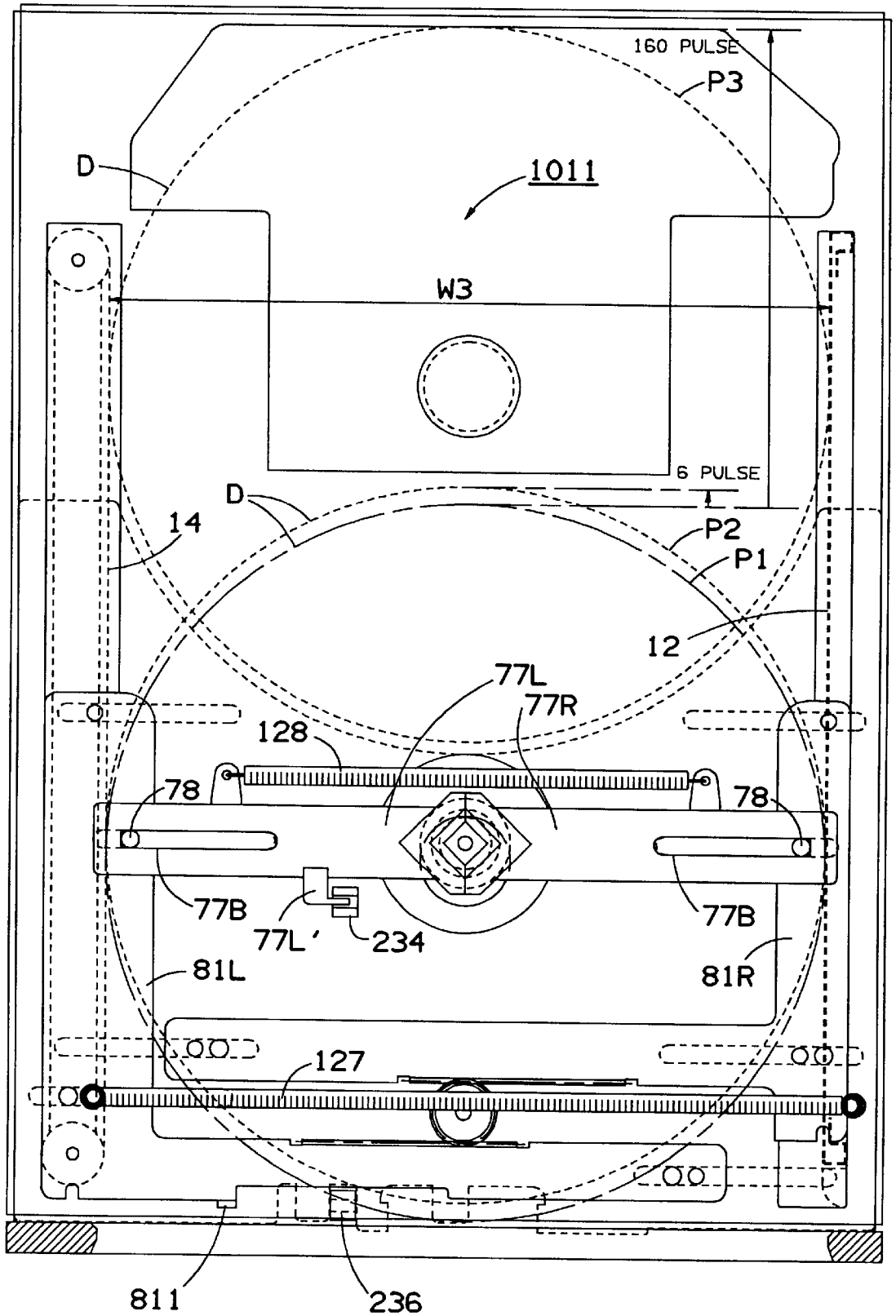
FIG. 16 is a top-view of the disk transfer mechanism of FIG. 2 in which a large-diameter disk is firmly held in an intermediate position, in which it is supported by the disk transfer mechanism, and in a playback position.
Figure 21:
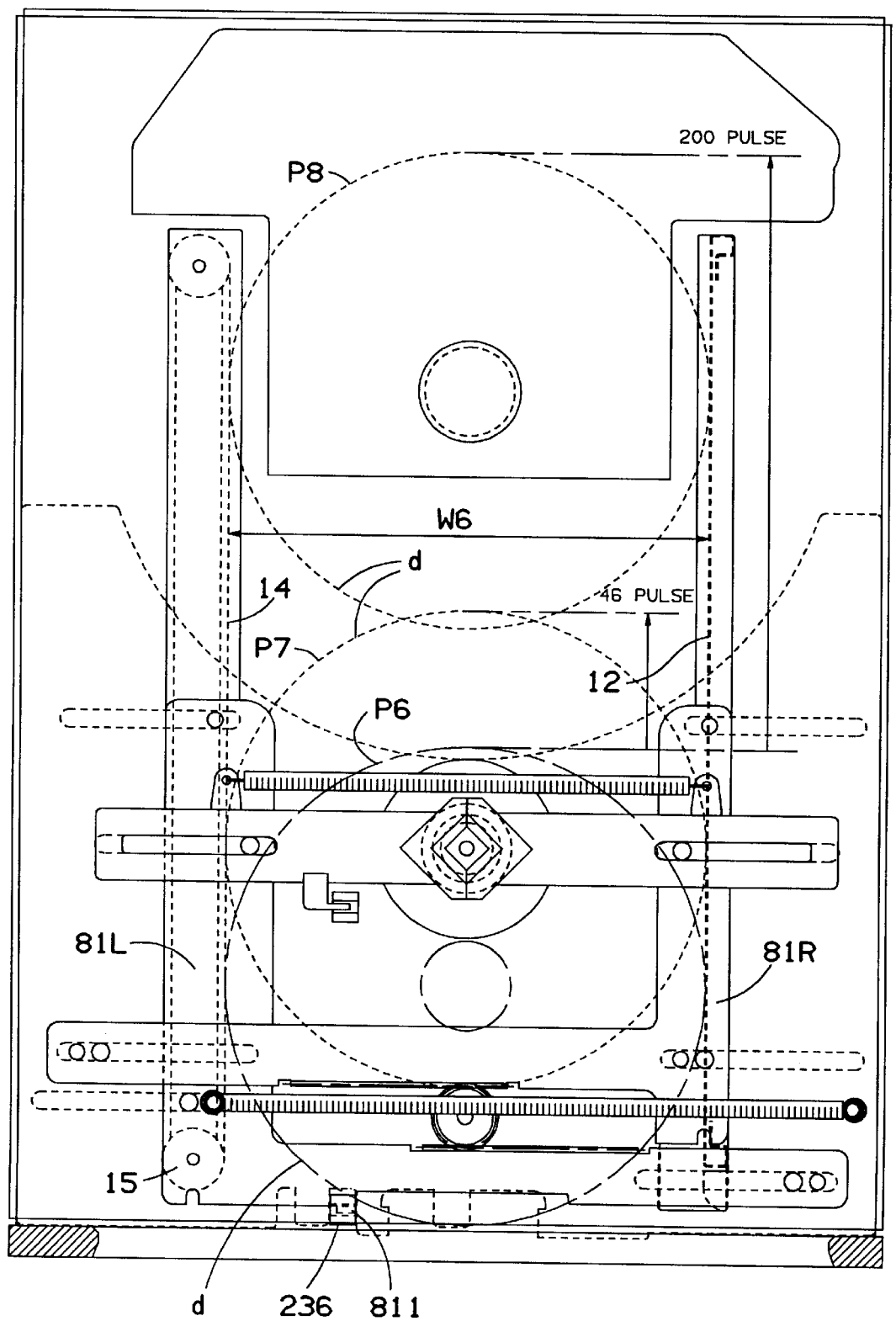
FIG. 21 is a top-view of the disk transfer mechanism of FIG. 2 in which a small-diameter disk is firmly held in a intermediate position, in which it is supported by the disk transfer mechanism, and in a playback position.

Referring now also to FIGS. 7, 16, and 21 the change in signal S.CLOSE to high (H) serves as a reference position for disk transport within the disk player. The disk transfer position is determined by counting the number of pulses from the output (signal $\overline{\text{L. PULSE}}$) of optical sensor 232 described above. When a large diameter disk D is inserted and transported to position P1, flap 120A falls away from the upper surface of disk D, closing shutter 120. This causes signal S.CLOSE to go high. Play position P2 and stock position P3 are determined for a large diameter disk D by counting pulses from signal $\overline{\text{L. PULSE}}$. For play position P2, six pulses are counted. For stock position P3, 160 pulses are counted. For a small-diameter disk d, play position P2 is indicated by 46 pulses of signal $\overline{\text{L. PULSE}}$ and stock position P3 by 200 pulses of the same signal.

Figure 67:
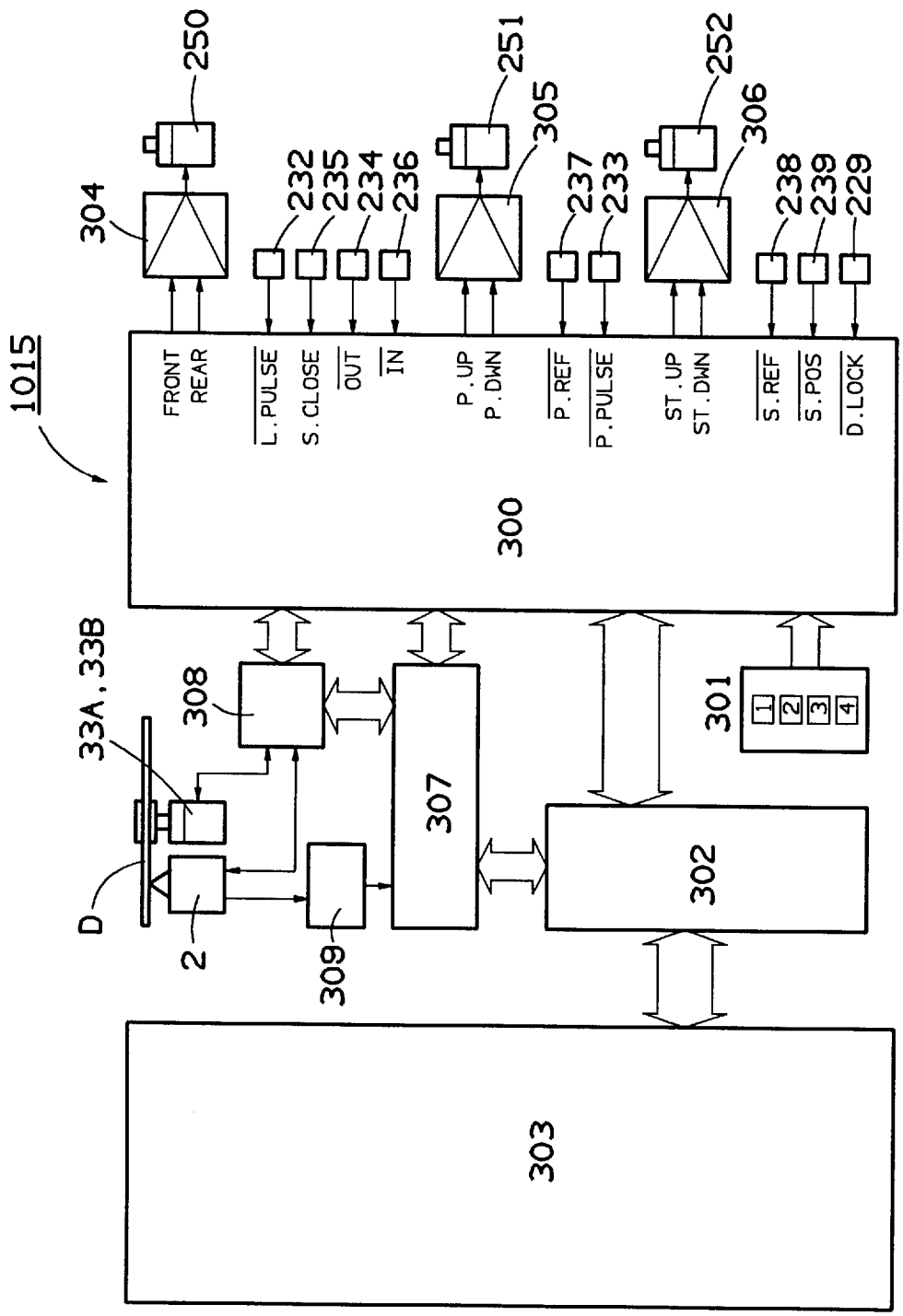
FIG. 67 is a block diagram of a control circuit for the disk player.

Referring to FIG. 67, a drive control circuit 1015 includes a system controller 300 (preferably a microprocessor) having a ROM, a RAM, and an interface circuit. Controller 300 receives user input from a mode keypad 301, with E/L key 1–E/L key 4, which a user presses to command controller 300 to eject and load disks stored in positions 1–4 of stocker 1011, respectively. Controller 300 is also connected to a computer 303 via an interface circuit 302. Controller 300 implements mechanism operations corresponding to mode key entries and commands from computer 303 according programming described in the flowcharts of FIGS. 68–81.

Optical sensors 232, 235, 234, and 236 apply signals $\overline{\text{L. PULSE}}$, $\overline{\text{S. CLOSE}}$, $\overline{\text{OUT}}$, and $\overline{\text{IN}}$, respectively, to controller 300. Controller 300 generates and applies signals FRONT and REAR to motor drive circuit 304, to control cause drive motor to move the disk toward the front and rear, respectively, and to cause drive motor 250 to open and close loading plates 81L and 81R, respectively. Motor drive circuit 304 applies a drive voltage to drive motor 250. When signal FRONT goes high (H), a drive voltage is applied by motor drive circuit 304 to rotate timing pulley 15 counterclockwise. When signal REAR goes high (H), a drive voltage is applied to by motor drive circuit 304 to rotate timing pulley 15 in the counterclockwise direction. When both signals go high (H), the output from motor drive circuit 304 is short-circuited to electromagnetically brake motor 250. When both signals are low (L), the output of the motor drive circuit is an open lead state to allow the motor 250 to freewheel.

Optical sensors 237 and 233 apply signals P. REF and P. PULSE, respectively, to controller 300. In response to signals P. REF and P. PULSE, controller 300 generates and applies signals P.UP and P.DWN to motor drive circuit 305, to control the position of sliding plate 75. Motor drive circuit 305 outputs a predetermined drive voltage to motor 251 of optical mechanism vertical transport mechanism 1008 of FIG. 10. When signal P.UP goes high (H), a drive voltage is output to move sliding panel 75 toward the right side of housing 1000. When signal P.DWN goes high (H), a drive voltage is output to move sliding panel 75 toward the left side of housing 1000. When both signals P.UP and P.DWN go high (H), motor drive circuit 305 is short-circuited electromagnetically brake motor 251. When both signals are low (L), the outputs are put in an open lead state to allow motor 251 to freewheel.

Optical sensors 238, 239, and 229 apply signals S. REF, S. POS, and D. LOCK, respectively, to controller 300. In response to these signals, controller 300 generates and applies signals ST.UP and ST.DOWN to motor drive circuit 306, which drives motor 252 of stocker vertical transfer mechanism 1012. When signal ST.UP goes high (H), a drive voltage is output to move stocker 1011 upward. When signal ST.DOWN goes high (H), a drive voltage is output to move the stocker downward. When both signals are high (H), the output from motor drive circuit 306 is short-circuited, electromagnetically braking motor 252. When both signals are low (L), the motor leads are opened to permit motor 252 to freewheel. When a power supply is off, controller 300 is connected to a backup power supply (not shown in the drawing) so that flags in memory indicating stocker position, presence of disks and disk sizes are saved.

The read signal generated by optical pickup 2 is applied to a signal processing circuit 307 via an RF amp 309. After EFM demodulation, de-interleaving, error correction and other usual operations are performed, the signal is sent to computer 303, which is connected externally, via an interface circuit 302. Based on a servo error signal, obtained from optical pickup 2, servo circuit 308 controls a focus servo, tracking servo, and feed servo of optical pickup 2. This control causes a light beam, generated by optical pickup 2, to follow data tracks on disk D. Signal processing circuit 307 and servo circuit 308 are connected to controller 300, and control operations are performed based on the operating mode.

Referring to FIGS. 68–81, the letter, n, denotes the stocker position (i.e. n=1, 2, 3, or 4). Four flags, D.FLAG(n) (D.FLAG(1)–D.FLAG(4)), one for each stocker position, indicate the presence of disks in respective ones of the holding positions POS(1)–POS(4) of the stocker. Four other flags, S.FLAG(n) (S.FLAG(1)–S.FLAG(4)), indicate the sizes of the disk stored in the respective ones of the holding positions POS(1)–POS(4). A value of 1 of one of flags D.FLAG(n) means a disk occupies the respective holding position POS(n). A value of 1 of one of flags S.FLAG(n) means a disk in POS(n) is a small-diameter disk. For example, if D.FLAG(1) and S.FLAG(1) are both set to 1, then a small-diameter disk is stored in holding position POS(1) of the stocker, the topmost level. M.FLAG indicates the operating mode of the device.

Figure 18:
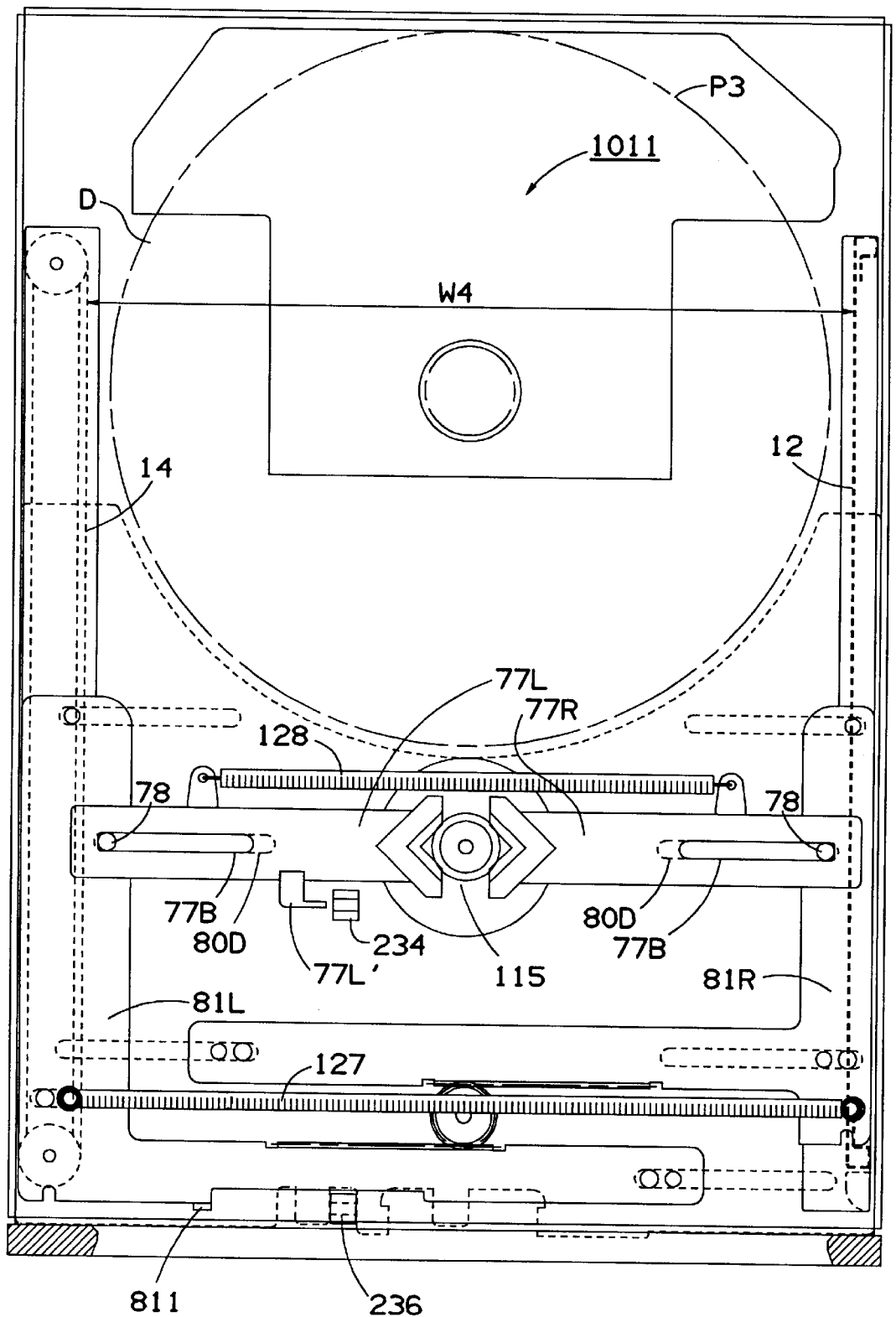
FIG. 18 is a top-view of the disk transfer mechanism of FIG. 2 showing a large-diameter disk in a store position.
Figure 22:
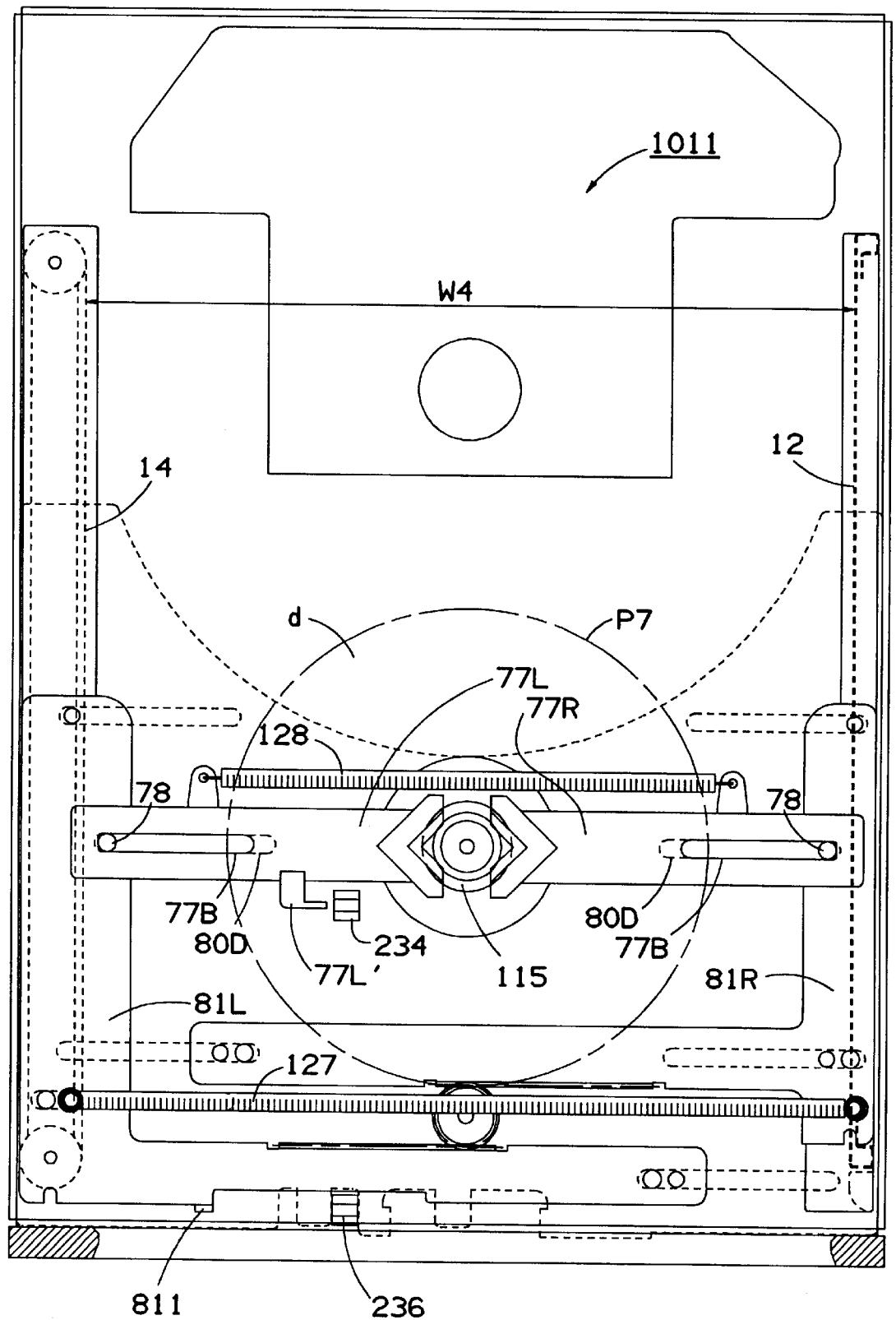
FIG. 22 is a top-view of the disk transfer mechanism of FIG. 2 showing a small-diameter disk released in the playback position in preparation for playing the disk back.
Figure 23:
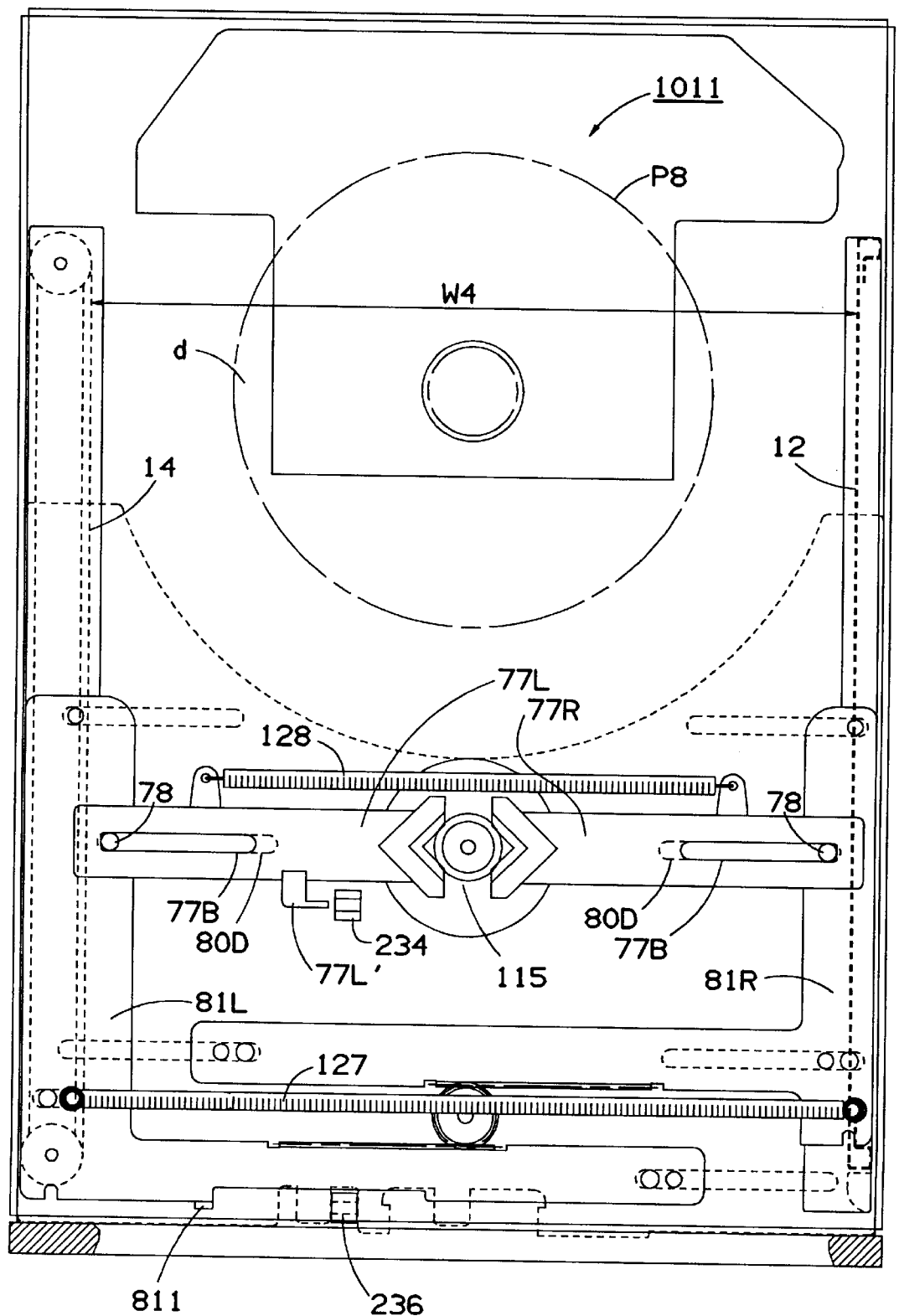
FIG. 23 is a top-view of the disk transfer mechanism of FIG. 2 showing a small-diameter disk in a store position.
Figure 24:
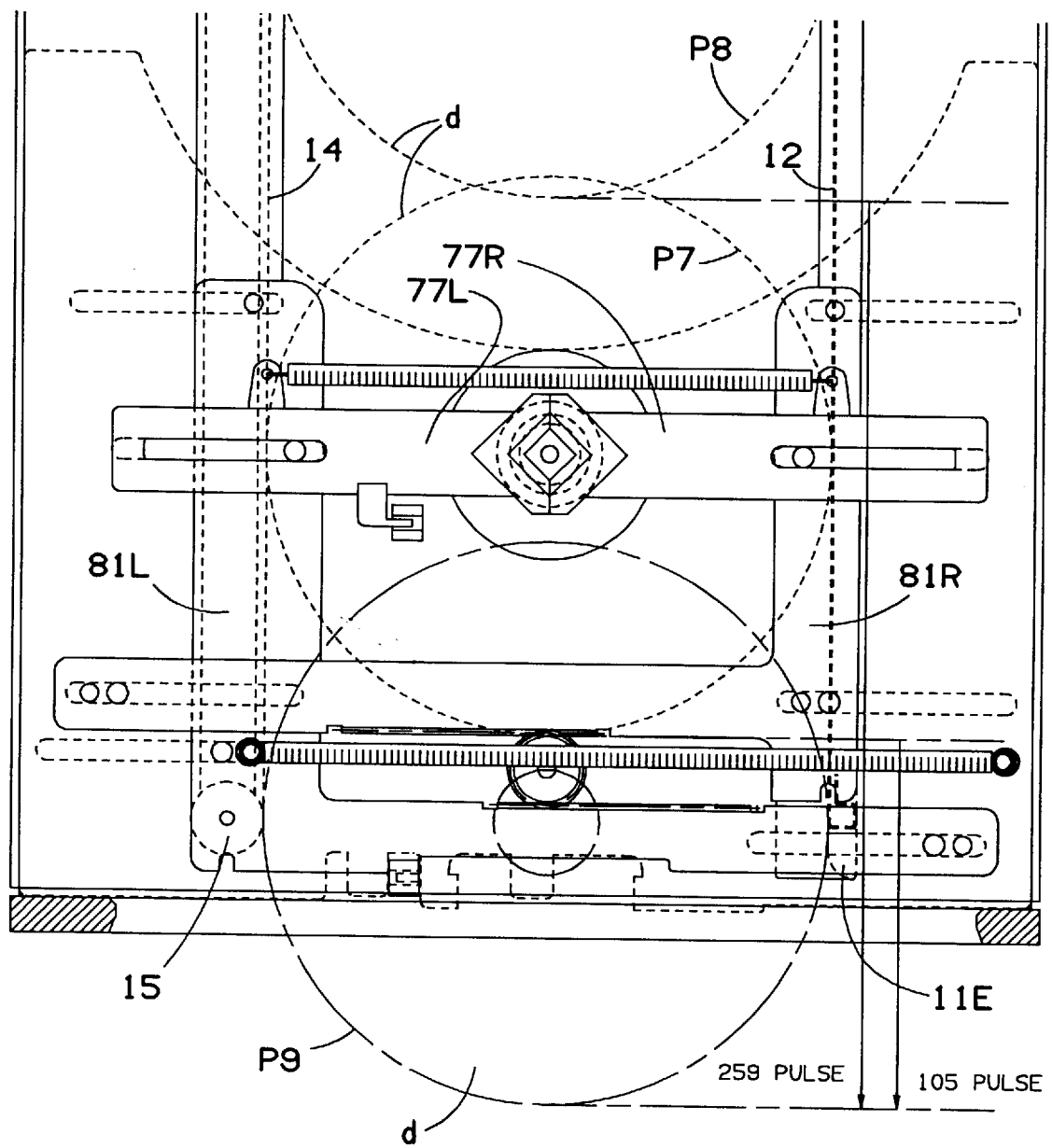
FIG. 24 is a top-view of the disk transfer mechanism of FIG. 2 showing a sequence of disk outlines indicating positions occupied by a small-diameter disk being moved from the store position to and eject position.

A flag M.FLAG is set to READY when in the disk player is in the disk receiving state shown in FIG. 13. When a disk D (or d) is brought to the eject position, as shown in FIGS. 19 and 24, M.FLAG is set to EJECT. When disk D, d is clamped and loading plates 81L and 81R are brought to the open position, as shown in FIGS. 17 and 22, M.FLAG is set to STAND-BY. When the disk is brought to stock position and loading plates 81L and 81R are brought to open position, as shown in FIGS. 18 and 23, M.FLAG is set to STOCK. In the stand-by state, M.FLAG is set to PLAY when disk playback is commenced.

The disk player can be in any of a number of different operating modes to which the control program is responsive. These modes are indicated by corresponding settings of M.FLAG. The following table summarizes these modes. The modes shown for each mechanism are not necessarily comprehensive but are those used to characterize the operating modes signalled by M.FLAG.

Figure 30:
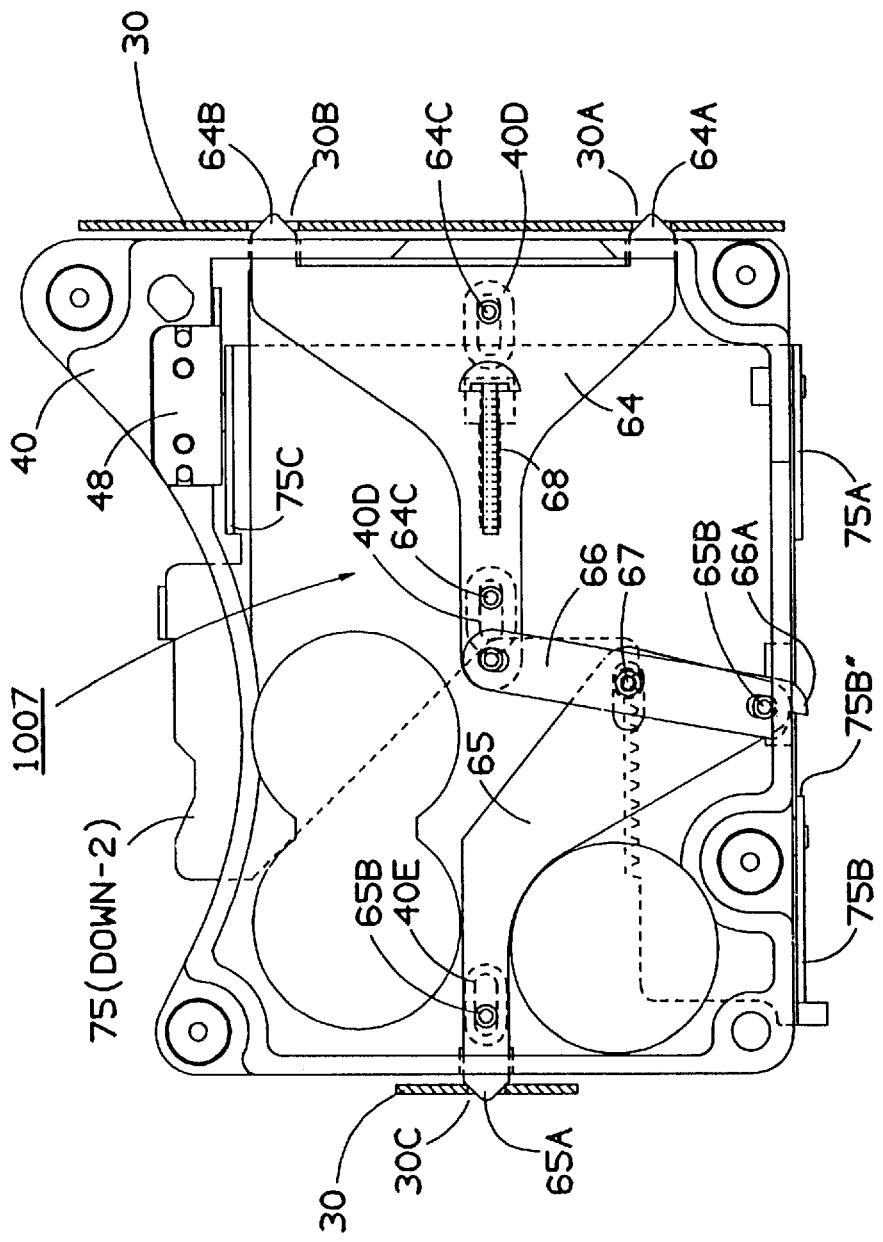
FIG. 30 is a top-view of the clamper lock mechanism in which the sliding plate mechanism is in a first position in which the clamper lock mechanism remains in a locked position.
Figure 31:
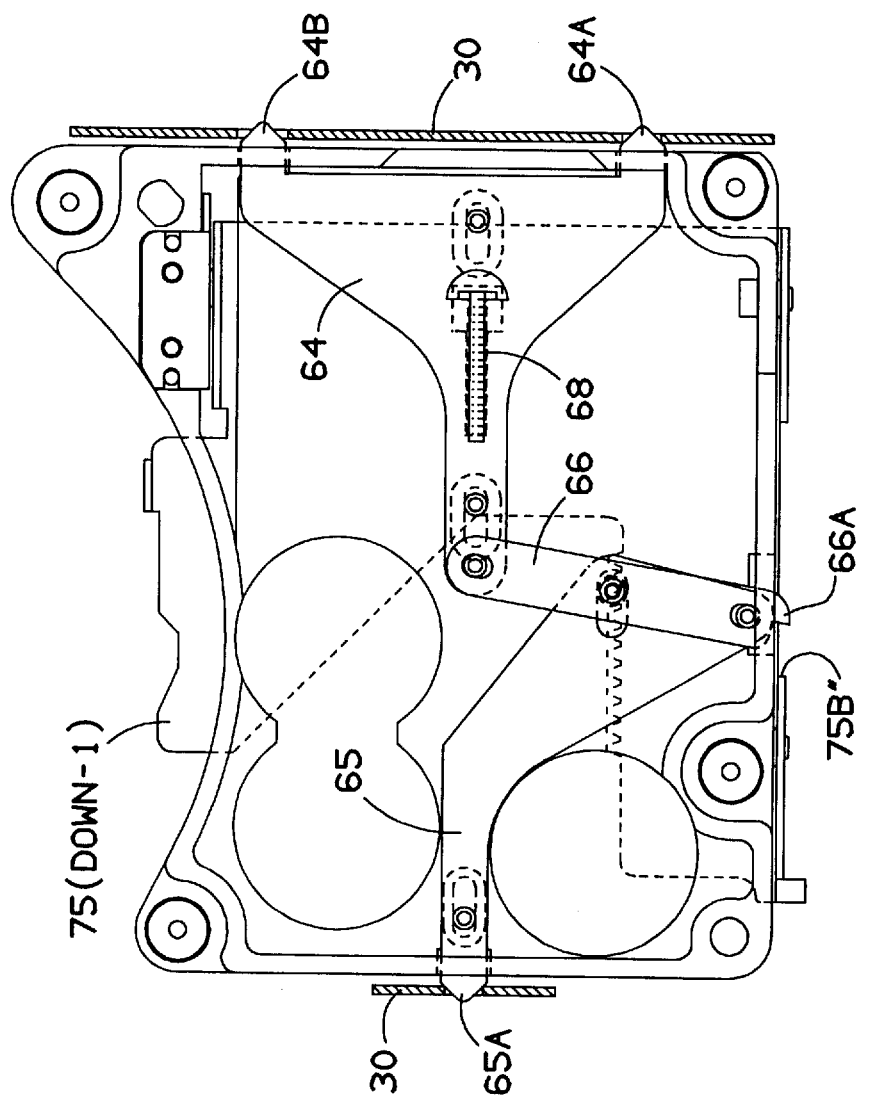
FIG. 31 is a top-view of the clamper lock mechanism in which the sliding plate mechanism is in a second position in which the clamper lock mechanism remains in a locked position.
Figure 32:
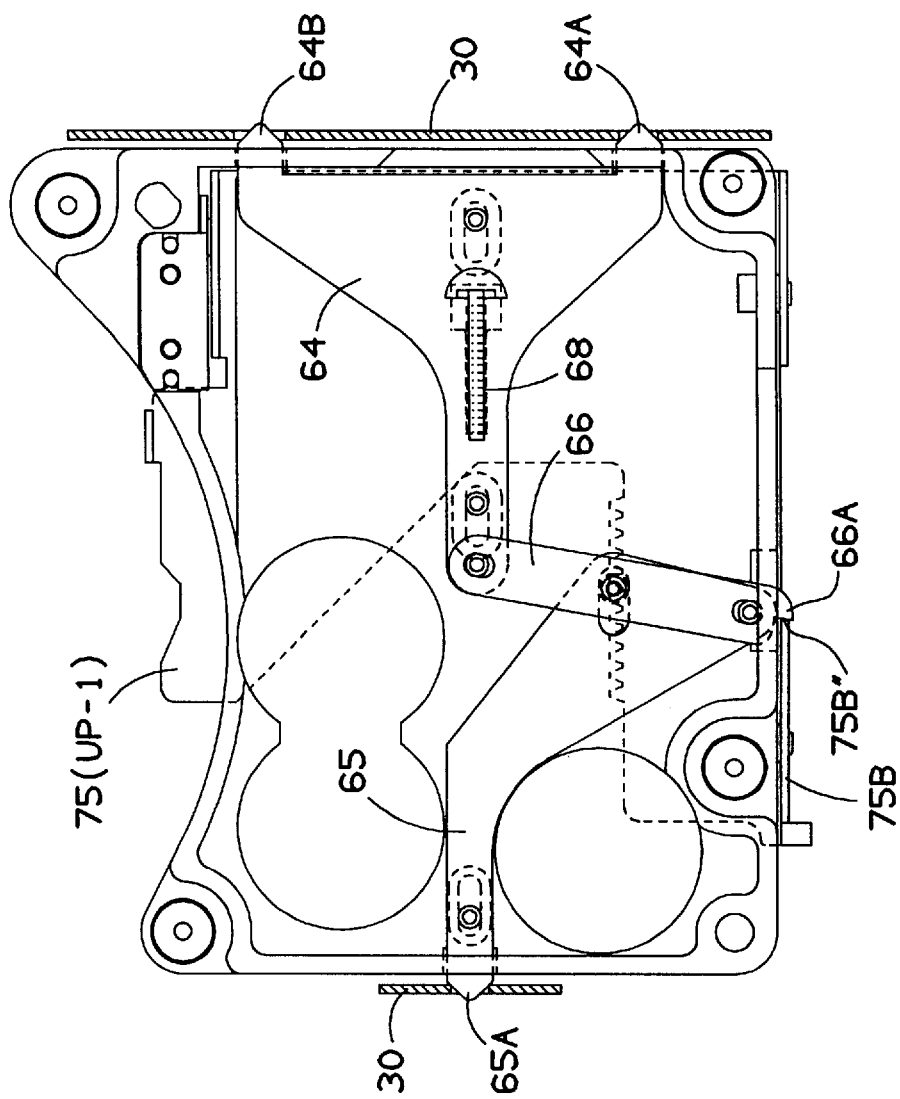
FIG. 32 is a top-view of the clamper lock mechanism in which the sliding plate mechanism is in a third position in which the clamper lock mechanism remains in a locked position.
Figure 33:
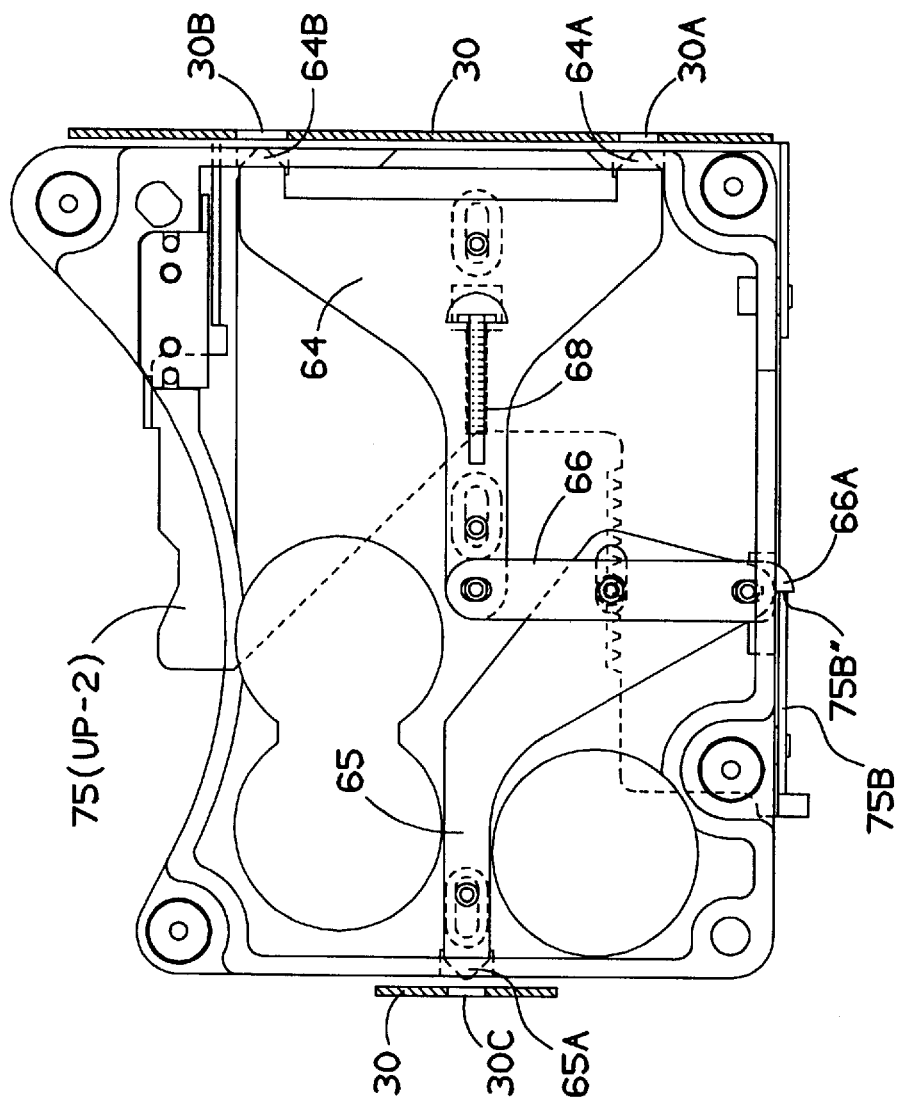
FIG. 33 is a top-view of the clamper lock mechanism in which the sliding plate mechanism is in a fourth position in which the clamper lock mechanism is moved to an unlocked position.
Figure 42:
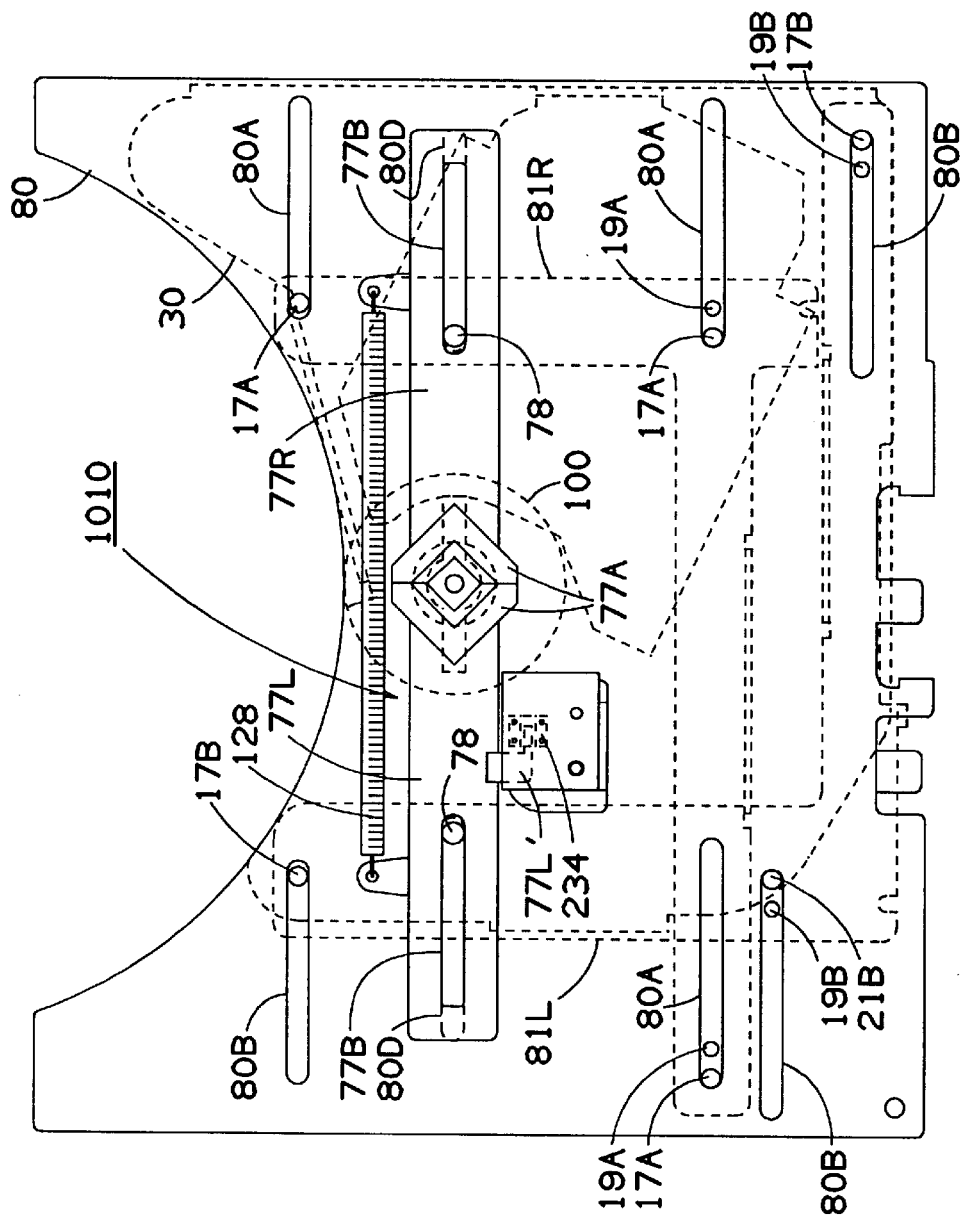
FIG. 42 is a top-view of the clamper support mechanism where the loading plates are in a position for receiving a disk.
Figure 52:
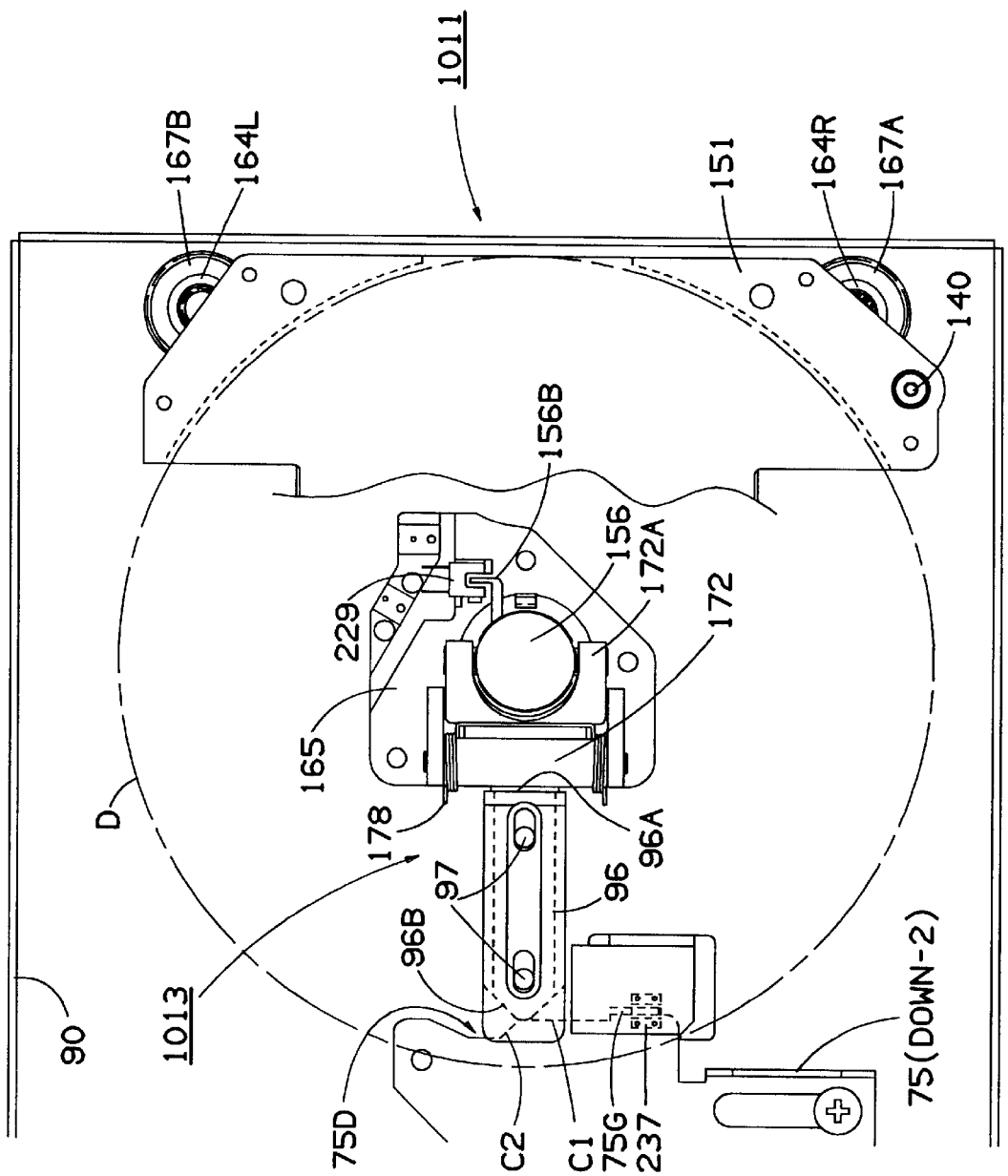
FIG. 52 is a top view of the disk lock mechanism with the sliding plate mechanism in the first position in which the disks are locked.
Figure 61:
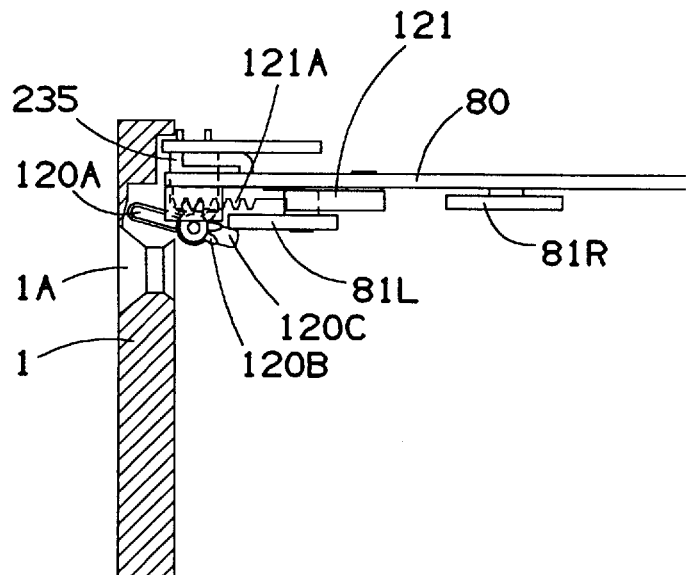
FIG. 61 is a partial section showing the disk insertion error prevention mechanism positioned as in FIG. 60.
Figure 63:
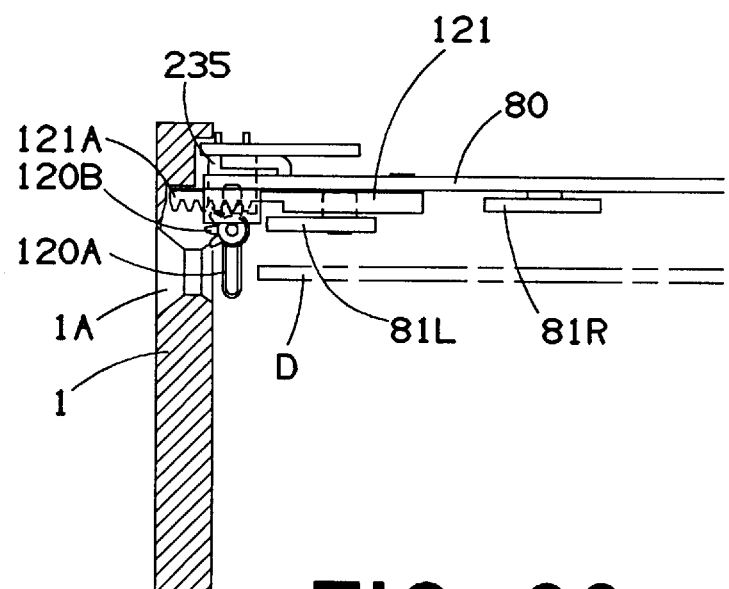
FIG. 63 is a partial section showing the disk insertion error prevention mechanism positioned as in FIG. 62.
Figure 62:
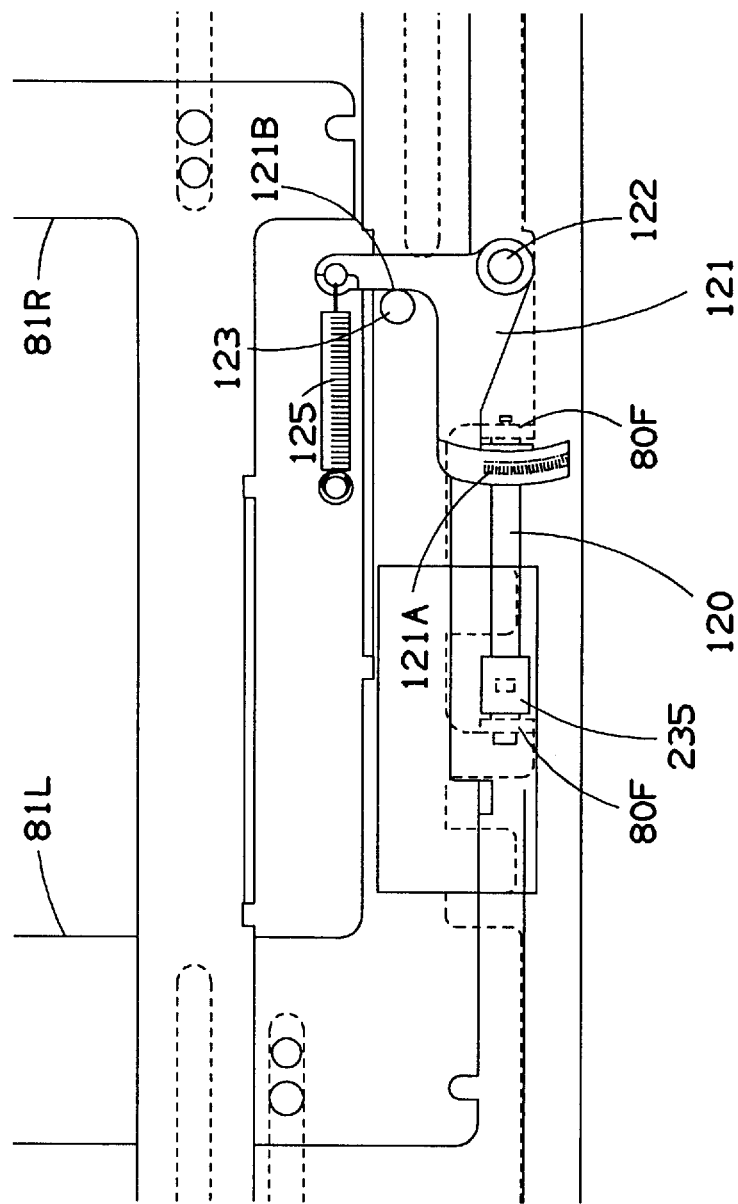
FIG. 62 is a top-view of the disk insertion error prevention mechanism closed after transport of a disk beyond a flap closure.

| State | Description |
|---|---|
| | Disk Transfer Mechanism 1001 |
| Receive | Disk receiving state with loading plates 81L and 81R in disk receiving position POS. 1 shown in FIG. 13. |
| Eject | Disk transfer mechanism 1001 supports disk D, d between timing belt 14 and friction belt 12 with the disk at the eject position, where it can be removed as shown in FIGS. 19 and 24. |
| Open | Disk transfer mechanism 1001 is in the open position, POS. 4, where timing belt 14 and friction belt 12 are separated from the outer perimeter of disk D, d as shown in FIGS. 17 and 22. |
| | Loading Plate Opening and Closing Mechanism 1094 |
| On | Rack member 87 is engaged with timing pulley 15 keeping disk transfer mechanism 1001 in the open position POS. 4 as shown in FIG. 29. |
| Off | Rack member 87 is moved away from timing pulley 15 as shown in FIG. 25. |
| | Damper Lock Mechanism 1007 |
| Locked | Optical mechanism 1006 is locked to base 40 a shown in FIG. 30. |
| Unlocked | Optical mechanism 1006 is unlocked from base 40 and elastically supported by lower dampers 41 and upper dampers 44 as shown in FIG. 33. |
| | Sliding Plate 75 Position |
| DOWN-2 | Optical mechanism vertical transport mechanism 1008 has lowered optical mechanism 1006 to the down position as shown in FIG. 43. |
| UP-2 | Optical mechanism vertical transport mechanism 1008 moves raised optical mechanism 1006 to the up position as shown in FIG. 49. |
| | Clamper Support Mechanism 1010 |
| Release | Support released on clamper 1009 and clamper 1009 is attracted to magnet 105 of turntable 102 as shown in FIG. 50. |
| Support | Clamper 1009 is supported at the support position shown in FIGS. 42 and 43. |
| | Disk Lock Mechanism 1013 |
| Locked | Lower disk lock shaft 156 is in a lock position as shown in FIGS. 52 and 53. |
| | Disk Insertion Error Prevention Mechanism 1014 |
| Engaged | Positioning of flap 120A is maintained at the angle at which flap 120A of shutter 120 engages with the top surface of disk D as shown in FIG. 64. |
| Closed | Shutter 120 is in a fully closed position preventing the insertion of a disk into insertion aperture 1A (see FIG. 63). |
| Open | Shutter 120 is in the open position, allowing a disk to be inserted into insertion aperture 1A as shown in FIGS. 60 and 61. |

-continued

| State | Description | | | |
|---|---|---|---|---|
| Mechanism States in Modes Indicated by M. FLAG | | | | |
| | Operating Modes - M. FLAG | | | |
| Mechanism | READY | EJECT | PLAY/STANDBY | STOCK |
| 1001 | Receive | Eject | Open | Open |
| 1004 | Off | Off | On | On |
| 1007 | Lock | Lock | Unlock | Unlock |
| 75 | DOWN-2 | DOWN-2 | UP-2 | UP-2 |
| 1010 | Support | Support | Release | Release |
| 1013 | Lock | Lock | Lock | Lock |
| 1014 | Open | Open | Closed | Closed |

When the power supply is turned on, controller 300 begins executing a main routine that loops through steps S1, S3, S5–10 unless an event, as described below, is detected.

When disk D is inserted into insertion aperture 1A of front panel 1, the outer edge of disk D presses against timing belt 14 and a disk guide 11E. As the disk is pushed in by the user, the outer edge of the disk slides against disk guide 11E, loading plates 81L and 81R are forced apart, and pin 123, on loading plate 81L, moves allowing spring 125 to rotate shutter arm 121 counterclockwise. The rotation of shutter arm 121 closes shutter 120. Shutter 120 is held open as it slides against disk D until disk D is inserted completely into the device. The disk is protected from damage by the compressed urethane or similar material) adhesively bonded to the periphery of flap 120A.

Figure 20:
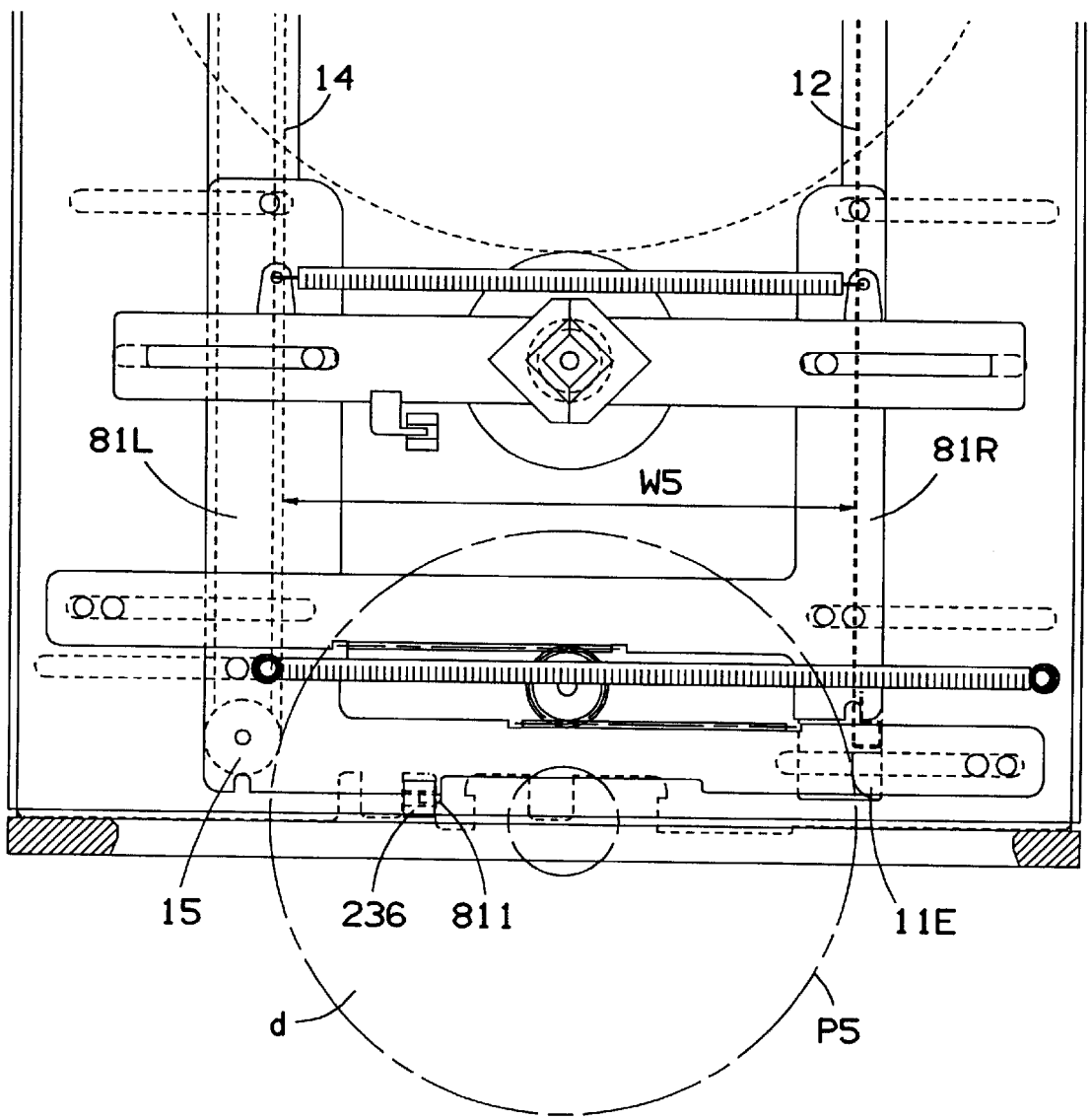
FIG. 20 is a top-view of the disk transfer mechanism of FIG. 2, with a small-diameter disk during insertion.

If a disk is inserted as far as position P0 (shown in FIG. 14 for a large disk and in FIG. 20 for small-diameter disks), the output of optical sensor 236 (signal $\overline{\text{IN}}$) goes high (H) causing the control program to branch from step S1 to step S2 and then to a procedure JOB LOAD. In procedure JOB LOAD, disk D, d is brought to the playback position in steps S20–S34 as follows. First, controller 300 outputs a high (H) state at signal REAR at step S20. Control then loops at step S21 till signal S.CLOSE goes high (H), indicating shutter 120 has closed. The high level (H) output by signal REAR causes timing belt 14 to be rotated counterclockwise, rolling disk D, d clockwise along the left side surface of friction belt 12, and toward the rear of housing 1000.

Once the disk reaches position P1 (FIG. 16 for large disks or position P6 in FIG. 21 for small-diameter disks), flap 120A of shutter 120 drops from the upper surface of disk D, d to the closed position. This causes the output from optical sensor 235, signal S.CLOSE, to go high (H). Controller then checks signal $\overline{\text{IN}}$ at step S22. If signal $\overline{\text{IN}}$ is high (H) at step S22, indicating a small diameter disk, controller 300 sets small-diameter disk flag S.FLAG(n) to 1 at step S23, where n is an internal memory variable whose value is set to represent the current stocker position. Control then advances to step S24 where disk presence flag D.FLAG(n) is set to 1. At step S25, controller 300 returns signal REAR to low (L) and sets signal FRONT to high (H). Control loops through step S26 until signal S.CLOSE goes low (L).

When signal FRONT goes high (H), timing belt 14 of disk transfer mechanism 1001 begins rotating clockwise, moving disk D, d toward the front of the disk player as the disk rolls counterclockwise. Disk D, d forces shutter 120 open toward the outside of the device. When signal S.CLOSE goes low (L), controller 300 returns signal FRONT to low (L) and sets signal REAR to high (H) at step S27. At step S28, controller 300 waits again for signal S.CLOSE to change to high (H). As a result, timing belt 14 is again rotated counterclockwise, and disk D, d moved toward the rear of housing 1000 as disk D, d rotates clockwise.

The movement of disk D, d causes shutter 120 to close, in turn causing signal S.CLOSE to go high (H). At step S29, controller 300 begins counting the output pulses (signal $\overline{\text{L. PULSE}}$) from optical sensor 232 by incrementing an internal count variable once for each pulse of signal $\overline{\text{L. PULSE}}$. At step S30, controller 300 checks to see if S.FLAG(n) has the value 1, indicating a small disk. If S.FLAG(n) is 0, indicating a large disk, then, at step S31, a value of 6 is stored in an internal memory variable, SET. If S.FLAG(n) is 1, indicating a small-diameter disk, then controller 300 sets variable SET to 46 at step S32. At step S33, controller 300 compares the internal count variable with the value of SET and loops if SET is higher than the internal count variable. Once the internal count variable reaches the value of SET, indicating that disk D (d) has reached position P2 (P7 for small disks), control proceeds to step S34. At step S34 signal FRONT and signal REAR are set high (H) for a prescribed period (50 msec) electromagnetically braking motor 250, stopping its rotation abruptly.

As just described, the initial loading operation begins when a disk is inserted through insertion aperture 1A. The disk is drawn into the disk player and immediately brought partly outward again before being drawn inward to the playback position P2/P7. This operation is performed because it allows the disk to register predictably and repeatably at the reference position defined by the closing of flap 120A. Since the playback position is identified by measuring the movement of timing belt 14, it is essential that the reference position be reliable to place the disk in the playback position accurately. By bringing the disk out, under the control of the disk player, errors due to misregistration of the disk during initial insertion can be eliminated. For example, if the user, in pushing the disk inside the disk player, forces flap 120A down prematurely, holds it open, or continues to push the disk in, such that the disk slips beyond the registration point (where flap 120A just closes), the registration will be inaccurate and an unreliable reference position will result. Bringing the disk up to the registration point, under the control of the disk player, permits a repeatable and accurate reference position to be obtained before moving the disk to the internal position. In this way, the disk is moved accurately to position P2 for large disks or P7 for small disks.

Control proceeds from step S34 to step S35. In steps S35–S39, controller 300 moves sliding plate 75 from position DOWN-2 to position UP-1. At step S35, controller 300 sets signal P.UP to high (H) causing a drive voltage to be output to move sliding panel 75 toward the right side of housing 1000. Control loops through step S36 until the output from optical sensor 237 (signal $\overline{\text{P. REF}}$) goes low (L) indicating that sliding plate 75 has shifted to the reference position signalled by optical sensor 237. Referring momentarily to FIG. 66, the reference position of sliding plate 75 is just to the right of position DOWN-1, between position DOWN-1 and position UP-1. At this position of sliding plate 75 plate 40, optical mechanism 1006, is in the up position. Additionally, lower disk lock shaft 156 is in the unlock position.

After signal $\overline{\text{P. REF}}$ goes low, a process is begun in step S37, in which an internal counter variable is incremented for each pulse of signal $\overline{\text{P. PULSE}}$. The internal counter variable is compared with the number 27 at step S38. Control loops through step S38 until the counter reaches 27. Referring momentarily to FIG. 66, during the loop through step S38, sliding plate 75 moves from the reference position to position UP-1, during which time base 40, with optical mechanism 1006, moves to the up position and lower disk lock shaft 156 moves partially toward the lock position. When the counter reaches 27, where sliding plate 75 reaches position UP-1, control passes to step S39. At step S39, signal P.UP and signal P.DWN go high for 50 msec, electromagnetically braking motor 251 to stop it quickly. Disk D, d, which is in the playback position, is mounted on turntable 102, because of the movement of optical mechanism 1006 to the up position. Thus, magnet 105 on turntable 102 attracts clamper 1009.

Figure 69:
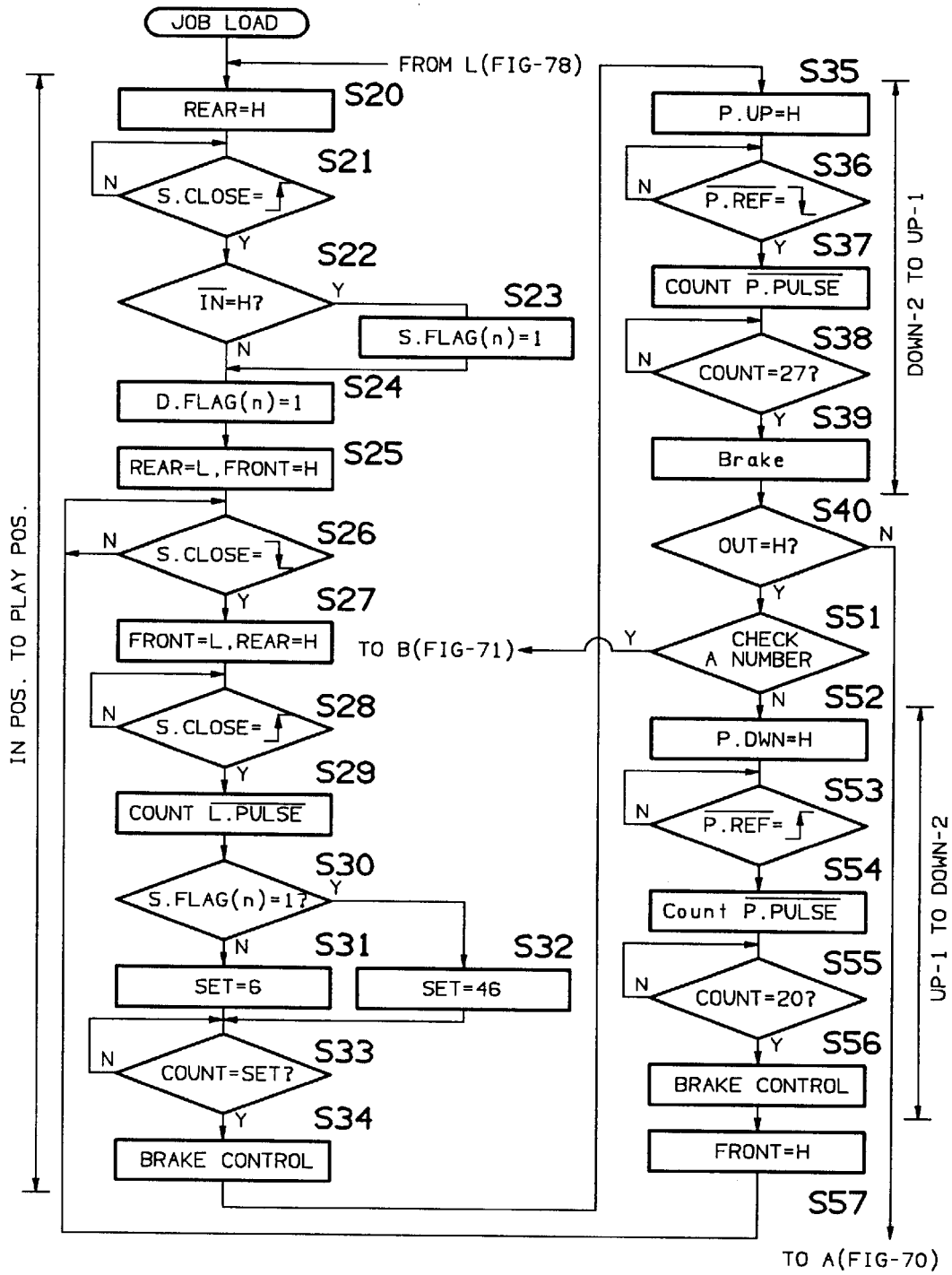
FIG. 69 is a flowchart of a JOB LOAD procedure.
Figure 70:
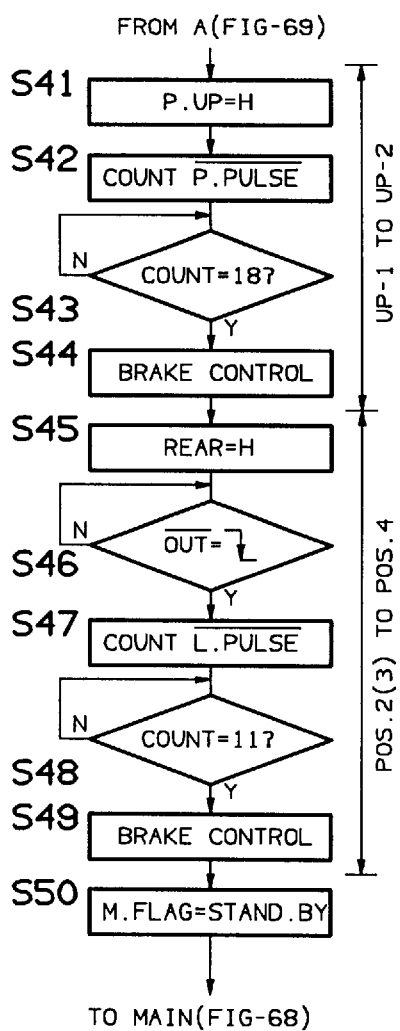
FIG. 70 is a flowchart of the JOB LOAD procedure.

As shown in FIGS. 69 and 70, at step S40, controller 300 checks signal $\overline{\text{OUT}}$ from optical sensor 234 to determine if clamper holders 77L and 77R are properly clamped about flange 115A. If clamper holders 77L and 77R are properly clamped, as indicated by a low state of signal $\overline{\text{OUT}}$, control branches to steps S41–S44 where sliding plate 75 is moved from position UP-1 to position UP-2. At step S41, controller 300 outputs high (H) at signal P.UP. At step S42, controller begins incrementing an internal counter variable for each pulse of signal $\overline{\text{P. PULSE}}$. Control loops through step S43 until the counter variable reaches the value 18. During the loop through step S43, sliding plate 75 moves toward the right of the disk player. When the counter variable reaches 18, indicating that sliding plate 75 has reached position UP-2, control proceeds to step S44. At step S44, signal P.UP and signal P.DWN are set to high (H) for 50 msec, electromagnetically braking motor 251.

Figure 59:
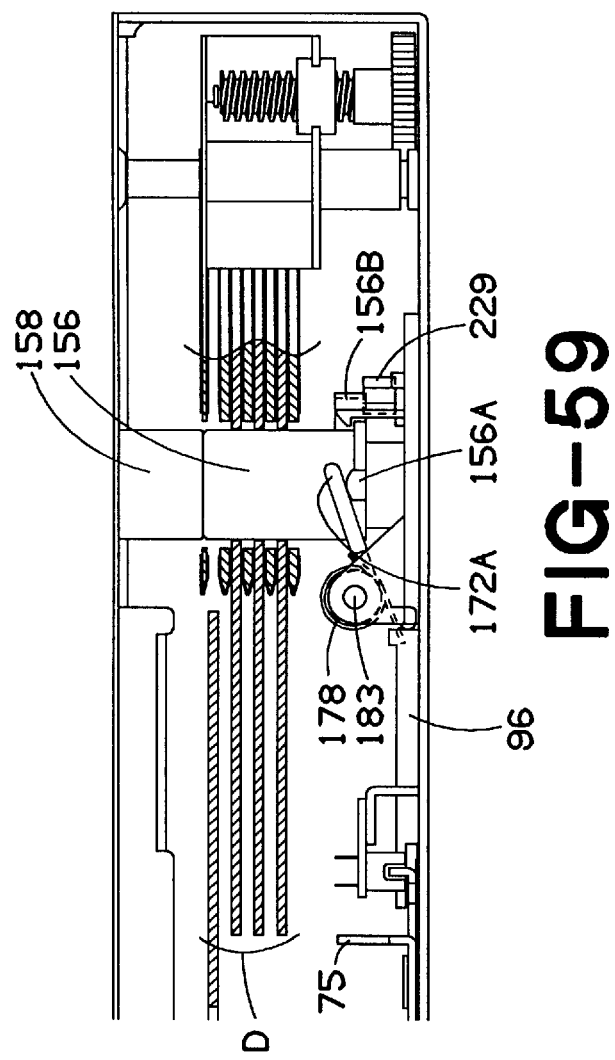
FIG. 59 is a side section showing the disk lock mechanism with the sliding plate mechanism and disk lock mechanisms in the positions of FIG. 58.

At position UP-2, optical mechanism 1006 is in the up position, and lower disk lock shaft 156 is entirely in the lock position shown in FIG. 59. In addition, the lock on optical mechanism 1006 is released as shown in FIG. 33, and rack member 87 is brought to a position where it engages with timing pulley 15 as shown in FIG. 29.

In steps S45–S49, controller 300 moves loading plates 81L and 81R from the support position POS.3 (for large disks or support position POS.2 for small-diameter disks), where timing belt 14 and friction belt 12 clamp disk D, d at its edge, to the open position POS.4 in which timing belt 14 and friction belt 12 are moved apart to free the disk. First, at step S45, controller 300 sets signal REAR to high (H), causing timing pulley 15 to rotate counterclockwise. As sliding plate 75 moves from position UP-1 to position UP-2, rack member 87 moves to cause gear 15C to engage with rack 87D. Thus, as timing pulley 15 rotates counterclockwise, loading plates 81L and 81R are moved laterally as described above. At the instant that timing pulley 15 begins rotating, timing belt 14 is engaged with the outer perimeter of disk D, d. This applies a clockwise rotation force to disk D, d, but, since disk D, d is held on turntable 102, disk D, d remains in place despite the momentary tangential force applied to it.

When signal $\overline{\text{OUT}}$ goes low (L), controller 300 begins counting signal $\overline{\text{L. PULSE}}$ at step S47. Control loops through step S48 until the count value reaches 11. During the loop, the lateral advancement of loading plates 81L and 81R causes clamper holders 77L, 77R to separate. With the separation of clamper holders 77L and 77R, the support on clamper 1009 is released, permitting clamper 1009 to move under the force of magnetic attraction, to turntable 102, clamping the disk. After the count value reaches 11, the point at which loading plates 81L and 81R are at their most open (lateral) positions (POS.4), signal FRONT and signal REAR are set to high (H) for 50 msec at step S49. Thus, at step S49, an electromagnetic braking force is applied to stop motor 250. Then, at step S50, mode flag M.FLAG is set to STAND-BY and control is returned to the main routine in FIG. 68.

An error resulting in misclamping by clamper 1009 can be caused by clamper support 115 moving upward, spreading apart clamper holders 77L, 77R, and causing signal $\overline{\text{OUT}}$ to go high (H) as discussed above. If this occurs, control branches from step S40 to step S51 in which controller 300 checks a number of times an error correction routine (the routine to be described instantly) has been executed. In steps S52–S56, sliding plate 75 is returned from position UP-1 to position DOWN-2. At step S52, controller 300 sets signal P.DWN to high (H) causing sliding plate 75 to move to the left of the disk player. Control then loops through step S53 until signal $\overline{\text{P. REF}}$ goes high (H). When sliding plate 75 moves beyond position UP-1, optical mechanism 1006 is lowered and lower disk lock shaft 156 is lowered and then raised again to the lock position. At a point just short of position DOWN-1, signal $\overline{\text{P. REF}}$ goes high (H) and control advances to step S54 where controller 300 begins counting signal $\overline{\text{P. PULSE}}$. Control loops through step S55, until the count value reaches 20, indicating that sliding plate 75 has reached position DOWN-2, whereupon control passes to step S56. At step S56, signal P.UP and signal P.DWN are set to high (H) for 50 msec, electromagnetically braking motor 251. At step S57, controller 300 sets signal FRONT to high (H), moving disk D, d toward the front of housing 1000. Control then proceeds to step S26.

Thus, when a clamping error occurs, disk D, d is returned to the front (the position in which flaps 120A are open) and the registration procedure of steps S26–S28 performed again, finally bringing the disk back to the playback position. This procedure serves to eliminate offsets in the disk playback position caused by vibration or other causes, resulting in improved reliability in clamping of disk D, d.

Figure 71:
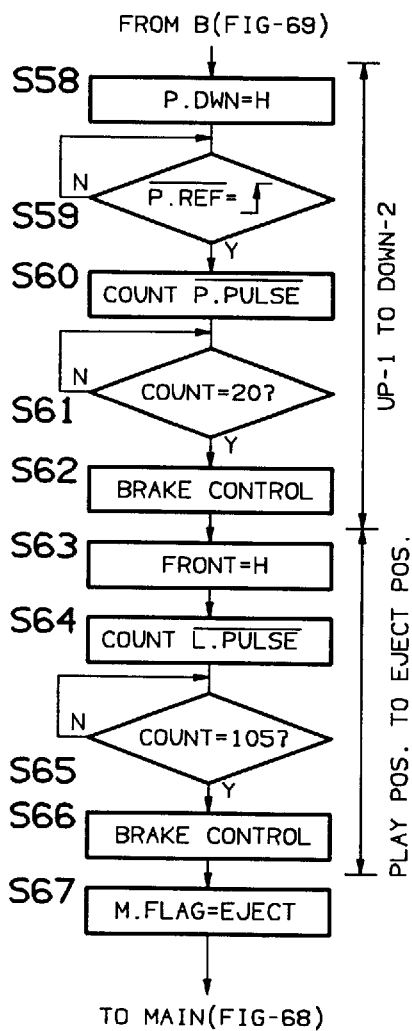
FIG. 71 is a flowchart of the JOB LOAD procedure.

Referring now also to FIG. 71, if after three consecutive executions of the error correction routine beginning at step S51, misclamping still occurs, controller 300 proceeds from step S51 to step S58. At step S58, signal P.DWN is set to high (H) causing sliding plate 75 to begin moving from position UP-1 to position DOWN-2. The description of steps S59–S62 is omitted since the details are identical to those of steps S53–S56 described above. In steps S63–S66, controller 300 brings disk D to the eject position P6 shown in FIG. 19 (small-diameter disk d is brought to eject position P9, shown in FIG. 24). At step S63, controller 300 sets signal FRONT to high (H). Then, at step S64, controller 300 begins counting signal $\overline{\text{L. PULSE}}$. Control loops through step S65 until the count value reaches 105. When signal FRONT goes high (H), timing belt 14 of disk transfer mechanism 1001 starts moving disk D, d toward the front of the disk player. As disk D, d moves toward the front, it rolls counterclockwise along friction belt 12. When the count value reaches 105, at which point disk D,d is at the eject position, control passes to step S66. At step S66, signal FRONT and signal REAR are set to high (H) for 50 msec, electromagnetically braking motor 251. Controller 300 then sets mode flag M.FLAG to EJECT at step S67, and control returns to the main routine.

Once disk D, d, at the eject position, is removed, spring 127 brings loading plates 81L and 81R toward each other to disk receiving position POS.1 (FIG. 13). The movement of loading plate 81L causes the output from optical sensor 236, signal $\overline{\text{IN}}$, to go low (L). Control branches from the main loop at step S3 when disk D, d is at the eject position (because flag M.FLAG is set to EJECT as described above) to step S4. Control proceeds to step S11 if signal $\overline{\text{IN}}$ is low, indicating that the disk has been removed from the eject position. Controller 300 then proceeds to steps S11–S13. D.FLAG(n) and S.FLAG(n) are to 0 in steps S11 and S12, respectively. M.FLAG is set to READY in step S13. Then, controller 300 returns to the main loop (steps S1–S10) at step S5 and continues to monitor for disk insertion, disk removal, eject/load key actuation, read commands from the computer, or an absence of a read command over a prescribed interval.

The following is a description of the control sequences initiated when one of E/L key 1 through E/L key 4 is pressed. Briefly, when an E/L key with the same number as the current stocker position is pressed, controller 300 brings the disk, stored in that stocker position, to the eject position if a disk D, d is present at the stock position or the playback position. If a disk D, d is in the eject position, that disk is brought to the playback position. If an E/L key is entered having a different number from the current stocker position, and if there is a disk D, d in the eject position or the playback position, then controller 300 moves that disk to a stock position, moves stocker 1011 to the position corresponding to the E/L key pressed, and brings the specified disk to the eject position. If no disk D, d is present in the specified position, then controller 300 stores the disk that is in the eject position or the playback position, in stocker 1011. After stocker 1011 is transferred to the specified position, loading plates 81L and 81R are brought to the disk receiving position.

When E/L key 1–E/L key 4 is pressed, controller stores a corresponding number (from 1 to 4) in an internal variable, m. If E/L key 1 is pressed, control branches from step S5 to step S14 where the value 1 is stored in internal memory variable m and control passes to JOB E/L. If E/L key 2 is pressed, control branches from step S6 to step S15 where the value 2 is stored in internal memory variable m and control passes to JOB E/L. If E/L key 3 is pressed, control branches from step S7 to step S16 where the value 3 is stored in internal memory variable m and control passes to JOB E/L. If E/L key 4 is pressed, control branches from step S8 to step S17 where the value 4 is stored in internal memory variable m and control passes to JOB E/L.

At step S70, controller 300 checks to see if M.FLAG is set to STOCK. If M.FLAG is set to STOCK, control proceeds to step S71, where controller 300 checks to see if the values for m and n are identical, thereby determining whether the E/L key pressed corresponds to the current stocker position. If the values are identical, controller 300 executes steps S86–S92, in which loading plates 81L and 81R are moved from open position POS.4 to a position just short of support position POS.3 (or support position POS.2 for small-diameter disks). At step S86, controller 300 sets signal FRONT to high (H). At step S87, controller 300 begins counting signal $\overline{\text{L. PULSE}}$. Control then passes from step S88 to S90, if S.FLAG is 1, indicating a small-diameter disk. Control passes from step S88 to S89, if S.FLAG is 0, indicating a large-diameter disk, or to step S90 if S.FLAG 1, indicating a small-diameter disk. In step S90, 75 is stored in internal variable SET. In step S89, 12 is stored in internal variable SET. Control loops through step S91 until the count value reaches the SET value. During the time signal FRONT is high (H) (during the looping through step S91), timing pulley 15 is rotated counterclockwise, causing it to move to the right along rack 87D. Thus loading plates 81L and 81R are moved medially together. As loading plates 81L and 81R are brought toward each, clamper holders 77L and 77R converge under the urging of spring 128 so that support mechanism 1010 lifts flange 115A of clamper 1009. At step S92, motor 250 is electromagnetically braked for 50 msec by setting signal FRONT and signal REAR to high (H). Note that the values 12 and 75 are just short of the values used to count to positions POS.3 and POS.2, respectively. The reason for using a value in SET that is smaller than the pulse count required to separate loading plates 81L and 81R exactly enough to support the disk is that if detection errors cause a pulse to be missed, the spacing will still be small enough to support the disk.

Controller 300 moves sliding plate 75 from position UP-2 to position DOWN-1 in steps S93–S97. At step S93, controller 300 outputs a high (H) level at signal P.DWN, causing motor 251 to begin moving sliding plate 75 toward the left side of housing 1000. Control loops through step S94 until signal $\overline{\text{P. REF}}$ goes high (H), indicating that sliding plate 75 has arrived at the reference position. Early in the traverse of sliding plate 75 from UP-2 to DOWN-1, clamper lock mechanism 1007 locks optical mechanism 1006 to base 40 and loading plate open/close mechanism 1004 disengages rack member 87 from timing pulley 15. As soon as rack member 87 disengages timing pulley 15, spring 127 pulls loading plates 81L and 81R together so that timing belt 14 and friction belt 12, of disk transfer mechanism 1001, are brought to positions in which disk D, d is supported between them. The motion of sliding plate 75 causes lower disk lock shaft 156 to descend, and when sliding plate 75 moves beyond UP-1, optical mechanism 1006 is moved downward. Control passes to step S95 in which controller 300 begins counting pulses of signal $\overline{\text{P. PULSE}}$. Control loops through step S96 until 3 pulses are counted indicating that sliding plate 75 has arrived at position DOWN-1. At step S97, signal P.UP and signal P.DWN are set to high (H) for 50 msec, so that motor 251 is electromagnetically braked. At position DOWN-1 of sliding plate 75, optical mechanism 1006 is lowered and lower disk lock shaft 156 is lowered to the unlocked position. This permits disk transfer within stocker 1011.

In steps S98–S101, controller 300 brings a stored disk D, d from stocker 1011 to the eject position. At step S98, controller 300 sets signal FRONT to high (H) to start motor 250 to bring disk d, D toward the front of the disk player. At step S99, controller 300 begins counting signal $\overline{\text{L. PULSE}}$. Control loops through step S100, until the count value reaches 259 indicating the arrival of disk D, d at the eject position. At step S101, signal FRONT and signal REAR are set to high (H) for 50 msec electromagnetically braking motor 250.

In steps S102–S108, controller 300 moves sliding plate 75 from position DOWN-1 to position DOWN-2. At step S102, controller 300 sets signal P.UP to high (H) causing motor 251 to begin moving sliding plate toward the right side of housing 1000. Control loops through step S103, until signal $\overline{\text{P. REF}}$ goes low (L), indicating the arrival of sliding plate 75 at the reference position. At step S104 controller 300 sets signal P.UP to low (L) and signal P.DWN to high (H) to cause motor 251 to begin moving sliding plate 75 toward the left side of housing 1000. Control loops through step S105 until signal $\overline{\text{P. REF}}$ goes high (H). At step S106, controller 300 begins counting signal $\overline{\text{P. PULSE}}$. Control loops through step S107 until the count reaches 20 indicating that sliding plate 75 has arrived at position DOWN-2. At step S108, signal P.UP and signal P.DWN are set to high (H) for 50 msec, electromagnetically braking motor 251. At step S109, M.FLAG is set to EJECT, and control returns to the main routine of FIG. 68.

If values for m and n are not identical at step S71, control proceeds to step S72 where controller 300 checks the output D.LOCK from optical sensor 229, which indicates the position of lower disk lock shaft 156. If signal D.LOCK is low (L), indicating that lower disk lock shaft 156 is at the lock position, control passes to step S73 where controller 300 moves stocker 1011 to position POS.m (Recall that m indicates the E/L key pressed). Thus, for example, if E/L key 4 is pressed, stocker 1011 is moved to position POS(4). Once stocker 1011 has been brought to the specified position, controller 300 sets internal memory variable n (which indicates the current stocker position) equal to m.

At step S75, controller 300 checks to see if D.FLAG(n) is 1 to confirm whether a disk is at position POS(n). If D.FLAG(n) is 1, indicating that there is a disk in position n of stocker 1011, controller 300 proceeds to steps S86–S92 (described above) whereupon loading plates 81L and 81R are moved from the open position POS.4 to the support position POS.3 (or position POS.2 for small-diameter disks), and disk D, d is brought to the eject position.

If, at step S75, D.FLAG(n) is 0, controller 300 moves loading plates 81L and 81R from open position POS.4 to disk receiving position POS.1 in steps S76–S79. At step S76, controller 300 sets signal FRONT to high (H), whereupon timing pulley 15 starts rotating clockwise moving timing pulley 15, and loading rack 81L, along rack member 87. At step S77, controller 300 begins counting signal L. PULSE. Control loops through step S78 until the count value reaches 82. The rotation of timing pulley 15 with gear 15C engaged with rack 87D, causes loading plates 81L and 81R to move medially together. As loading plates 81L and 81R close, spring 128 brings clamper holders 77L and 77R together so that clamper support mechanism 1010 supports flange 115A. When the count value reaches 82, indicating that loading plates 81L and 81R have arrived at a position just short of disk receiving position POS.1, control passes to step S79. At step S79, signal FRONT and signal REAR are set to high (H) for 50 msec, electromagnetically braking motor 250.

In steps S80–S84, controller 300 moves sliding plate 75 from position UP-2 to position DOWN-2. The details of this operation are similar to the operation in steps S52–S56, described above, therefore, the details are not repeated. Note that even though the result of the operation of steps S80–S84 is to move from UP-2 to DOWN-2, while that of steps S52–S56 is to move from UP-1 to DOWN-2, the procedure is identical, as can be seen by comparing FIGS. 68 and 72. At step S85, controller 300 sets M.FLAG to READY and control returns to the main routine.

In step S72, if D.LOCK is high (H), indicating that lower disk lock shaft 156 is not at the lock position, controller 300 proceeds to step S110. As described above, this situation indicates misalignment of the disk because, if the disk is not accurately positioned, lower disk lock shaft 156 is blocked by the disk. As described above, the correction mechanism for this condition is to transport the disk to a position where shutter 120 is opened and then moving it inward again until the reference position, at which shutter 120 just closes, is reached. Disk D,d is then moved again to the stock position. At step S110, controller 300 checks the number of retry attempts made. In steps S111–S117, operations identical to those in steps S86–S92 are carried out, with loading plates 81L and 81R being moved from the open position POS.4 to support position POS.3 (for large disks or POS.2 small disks). Then, in steps S118–S122, operations identical to those in steps S93–S97 are carried out, with sliding plate 75 being moved from position UP-2 to position DOWN-1, and optical mechanism 1006 and lower disk lock shaft 156 being moved to the down position and the unlock position, respectively.

In steps S123–S132, controller 300 follows a procedure that is similar to steps S57 and S26–S34 where disk D, d is brought to a position where shutter 120 is opened and then back into the disk player. However, in this case, the disk is brought to the stock position instead of position P2 (or P7 for small disks). This procedure is as follows. First, at step S123, controller 300 sets signal FRONT to high (H), starting disk transfer mechanism 1001 so that it moves disk D, d toward the front of housing 1000. Control loops through step S124 until signal S.CLOSE goes low (L), indicating the disk has pushed shutter 120 open. At step S125, controller 300 sets signal FRONT to low (L) and signal REAR to high (H) to begin moving disk D, d rearward. Control then loops through step S126 until signal S.CLOSE changes to high (H) again, indicating that shutter 120 has just closed in response to the movement of disk D, d. After signal S.CLOSE goes high (H), controller 300 begins counting signal $\overline{\text{L. PULSE}}$ at step S127. Controller 300 checks S.FLAG(n) at step S128 and if it is 1, indicating a small disk, the value 200 is stored in internal variable SET at step S130, otherwise, the value 160 is stored in SET. Control loops through step S131 until the count value reaches the value of SET indicating the disk has reached the stock position. At step S132, controller 300 sets signal FRONT and signal REAR to high (H) for 50 msec, electromagnetically braking motor 250.

In steps S133–S137, controller 300 moves sliding plate 75 from position DOWN-1 to position UP-2. First, at step S133, controller 300 sets signal P.UP to high (H). Control loops through step S134 until signal $\overline{\text{P. REF}}$ goes low (L) as sliding plate 75 moves rightwardly. When signal $\overline{\text{P. REF}}$ goes low (L), controller 300 begins counting signal $\overline{\text{P. PULSE}}$ at step S135. Control loops through step S136 until the count value reaches 45, indicating that sliding plate 75 has reached position UP-2, and control passes to step S137. At step S137, signal P.UP and signal P.DWN are set to high (H) for 50 msec, electromagnetically braking motor 251.

Steps S138–S142 perform the same operations as steps S45–S49 in which controller 300 moves loading plates 81L and 81R to open position POS.4. Since this procedure is described in detail above, it is not repeated here. After step S142, controller 300 passes to step S72 where D.LOCK is checked. If the disk lock error occurs after the retry operation described above is repeated three times, controller 300 proceeds from step S110 in FIG. 74 to step S86 in FIG. 72 and Disk D, d is brought to the eject position.

When an E/L key is entered during stand-by mode, a disk, in the storage location corresponding to the E/L key pressed, is retrieved and brought to the playback position. For example, if E/L key 1 is pressed in stand-by mode, controller 300 sets constant m to 1 at step S14 as described above. Controller 300 then proceeds to step S70 (FIG. 72) to step S150 (FIG. 75), where M.FLAG is checked. If M.FLAG is set to STAND-BY, as in this case, controller 300 proceeds to step S151. If m and n are identical, indicating the current stocker position corresponds to the E/L key pressed, control passes from step S151 to step S152. Steps S152–S157, perform the same operations as steps S86–S92. Therefore, in steps S152–S157, loading plates 81L and 81R are moved from open position POS.4 to a position just short of support position POS.3 (for large disks, or POS.2 for small disks). Control then passes to step S158.

Steps S158–S162, perform the same operations as steps S52–S56 and the details are, therefore, not repeated. Thus, in steps S158–S162, controller 300 moves sliding plate 75 from position UP-2 to position DOWN-2. In steps S163–166, controller 300 brings disk D, from the playback position, to the eject position following a procedure identical to that of steps S63–S66 and the details are, therefore, not repeated. At step S169, M.FLAG is set to EJECT, and control returns to the main routine.

Figure 72:
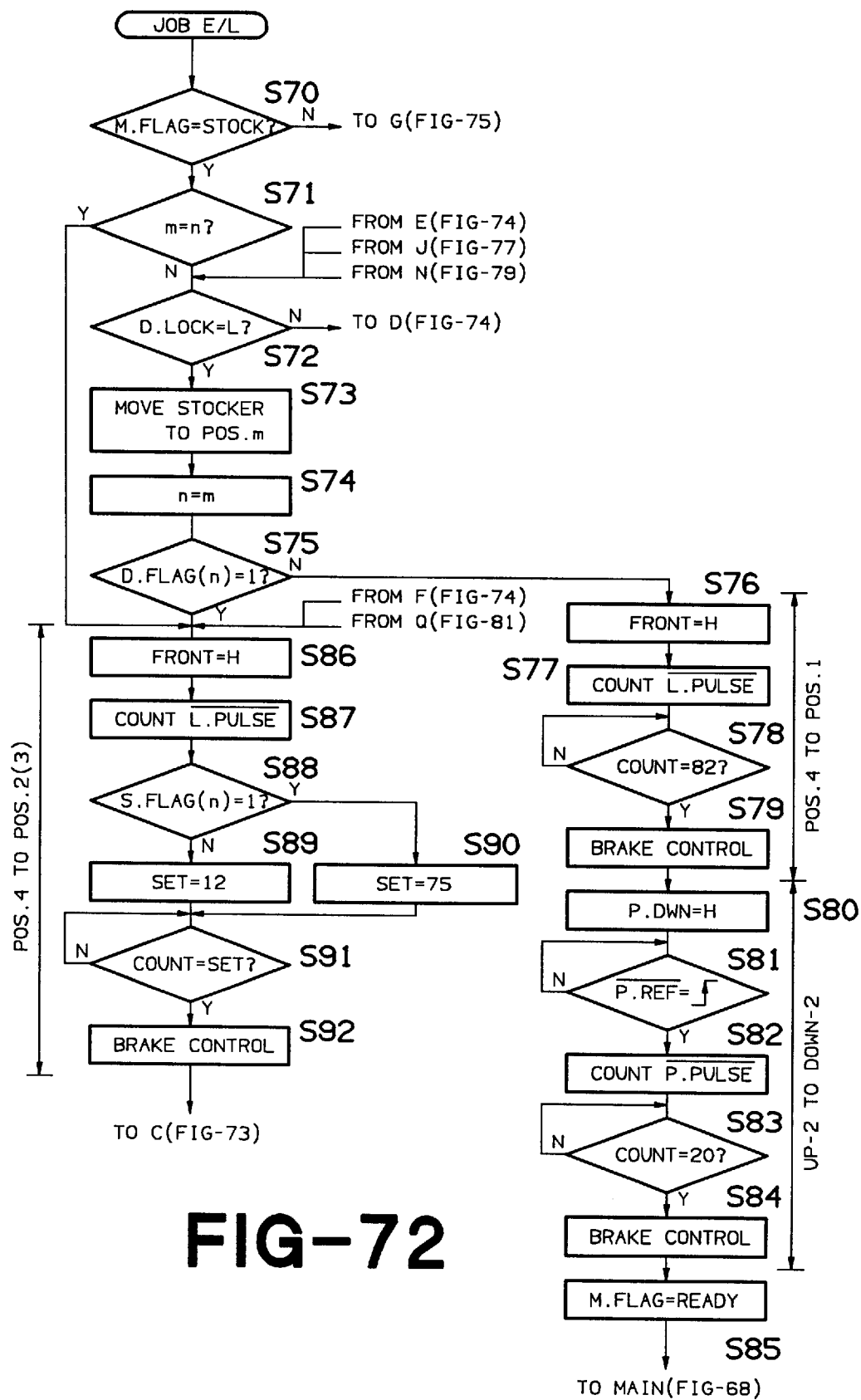
FIG. 72 is a flowchart of a JOB EJECT procedure.
Figure 73:
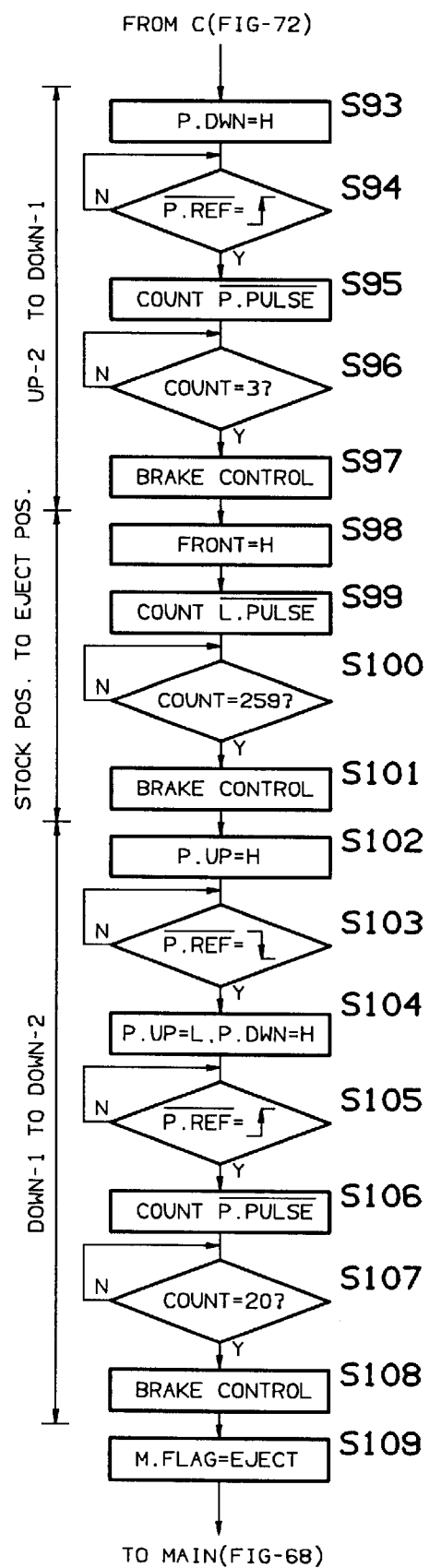
FIG. 73 is a flowchart of the JOB EJECT procedure.
Figure 74:
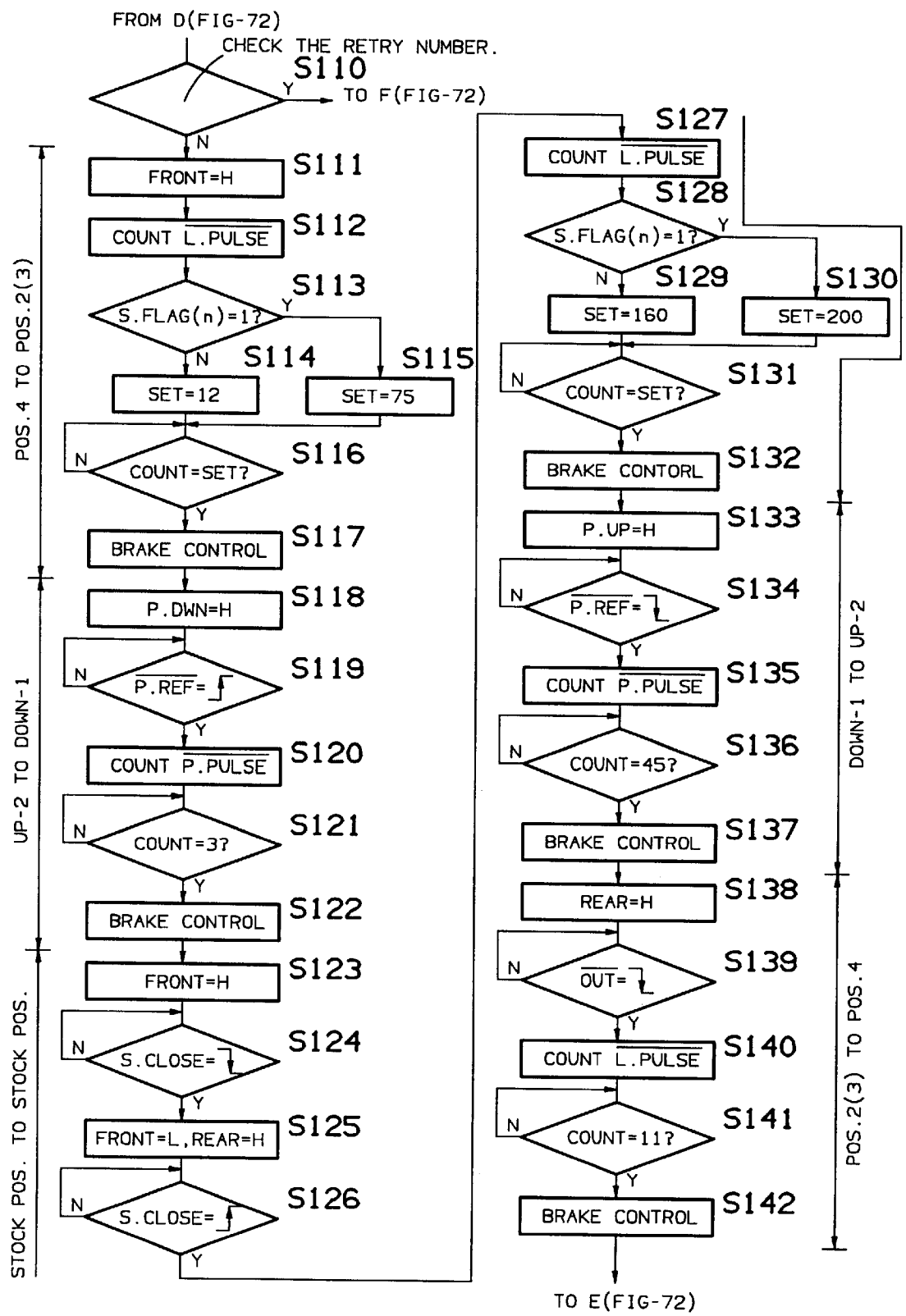
FIG. 74 is a flowchart of the JOB EJECT procedure.
Figure 75:
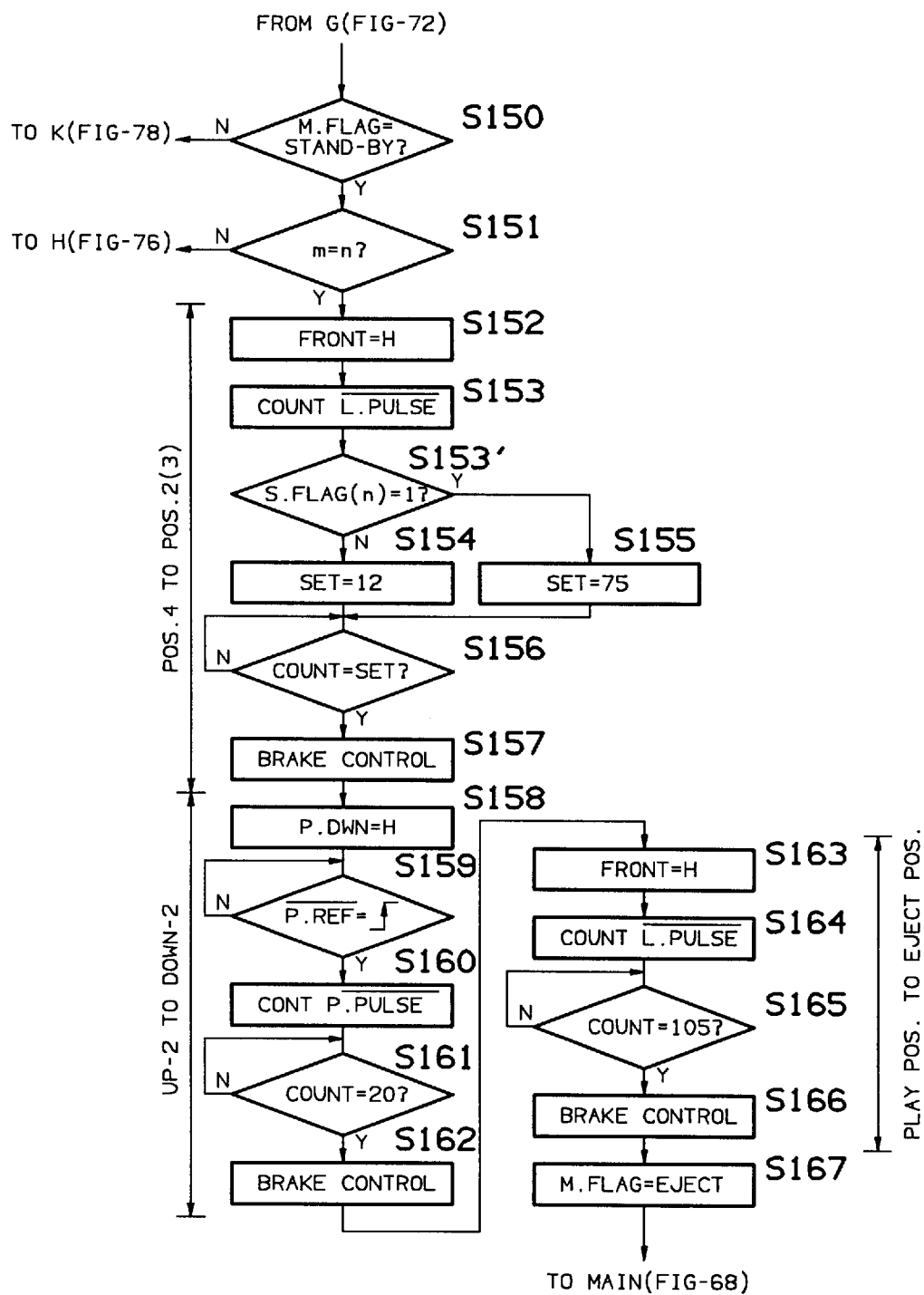
FIG. 75 is a flowchart of the JOB EJECT procedure.
Figure 76:
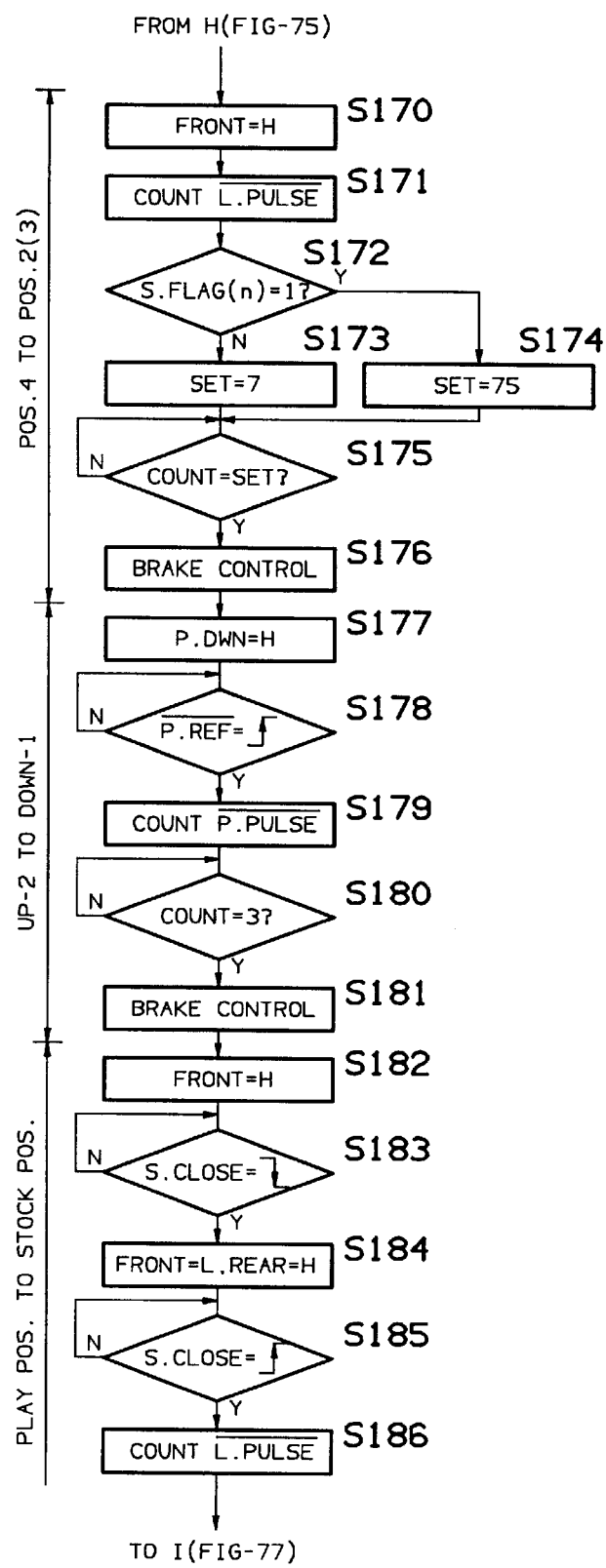
FIG. 76 is a flowchart of the JOB EJECT procedure.
Figure 77:
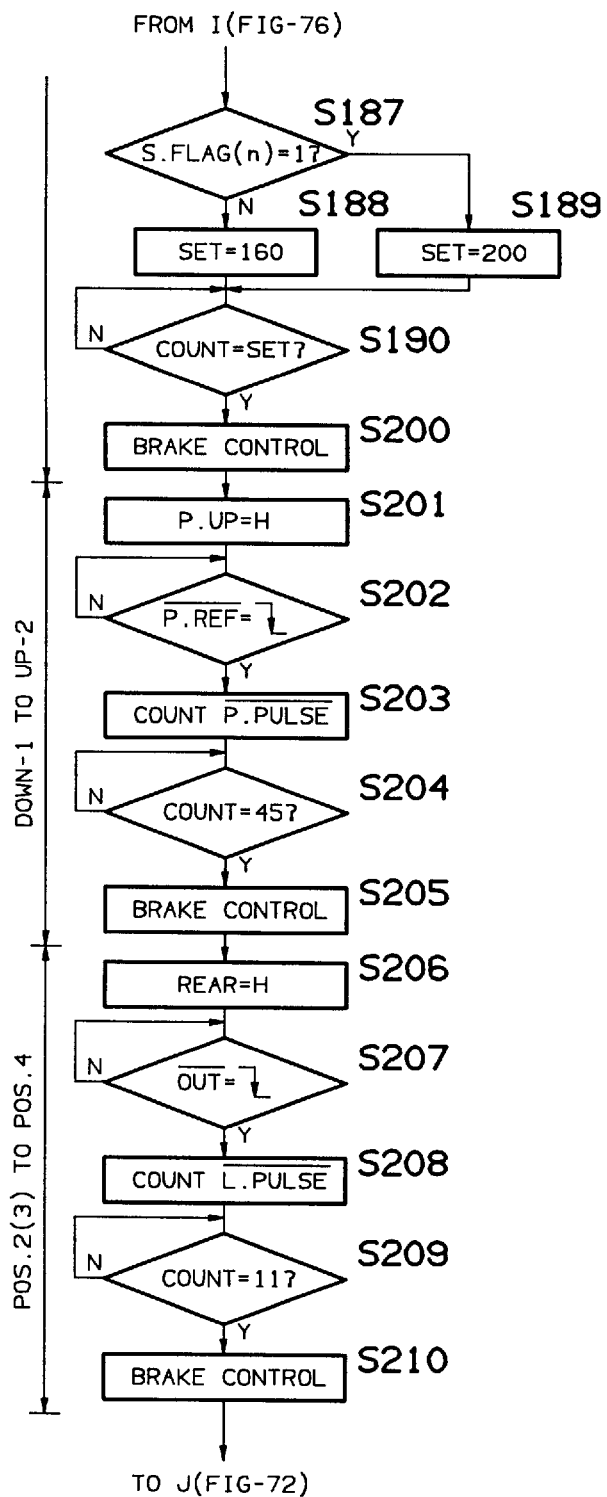
FIG. 77 is a flowchart of the JOB EJECT procedure.
Figure 78:
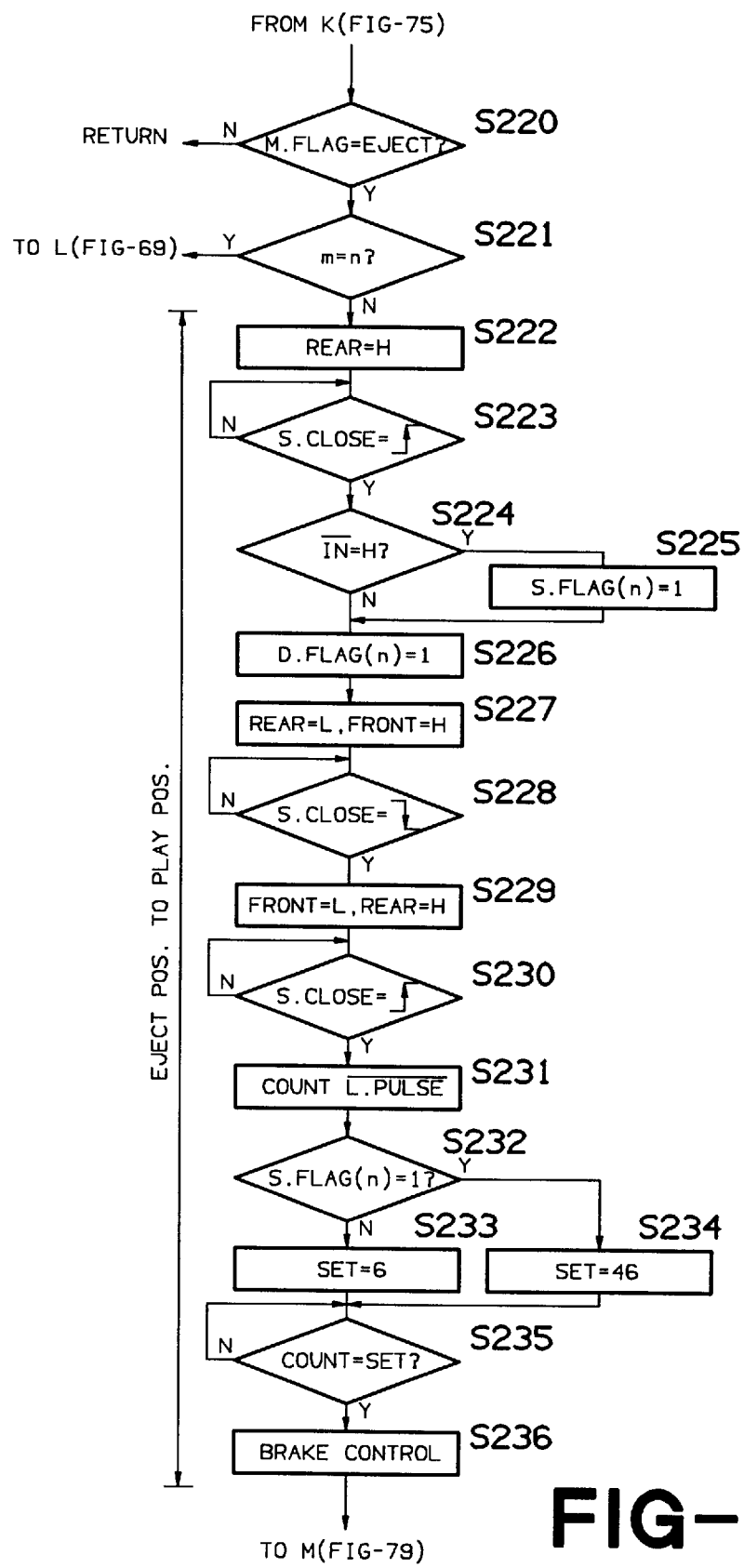
FIG. 78 is a flowchart of the JOB EJECT procedure.
Figure 79:
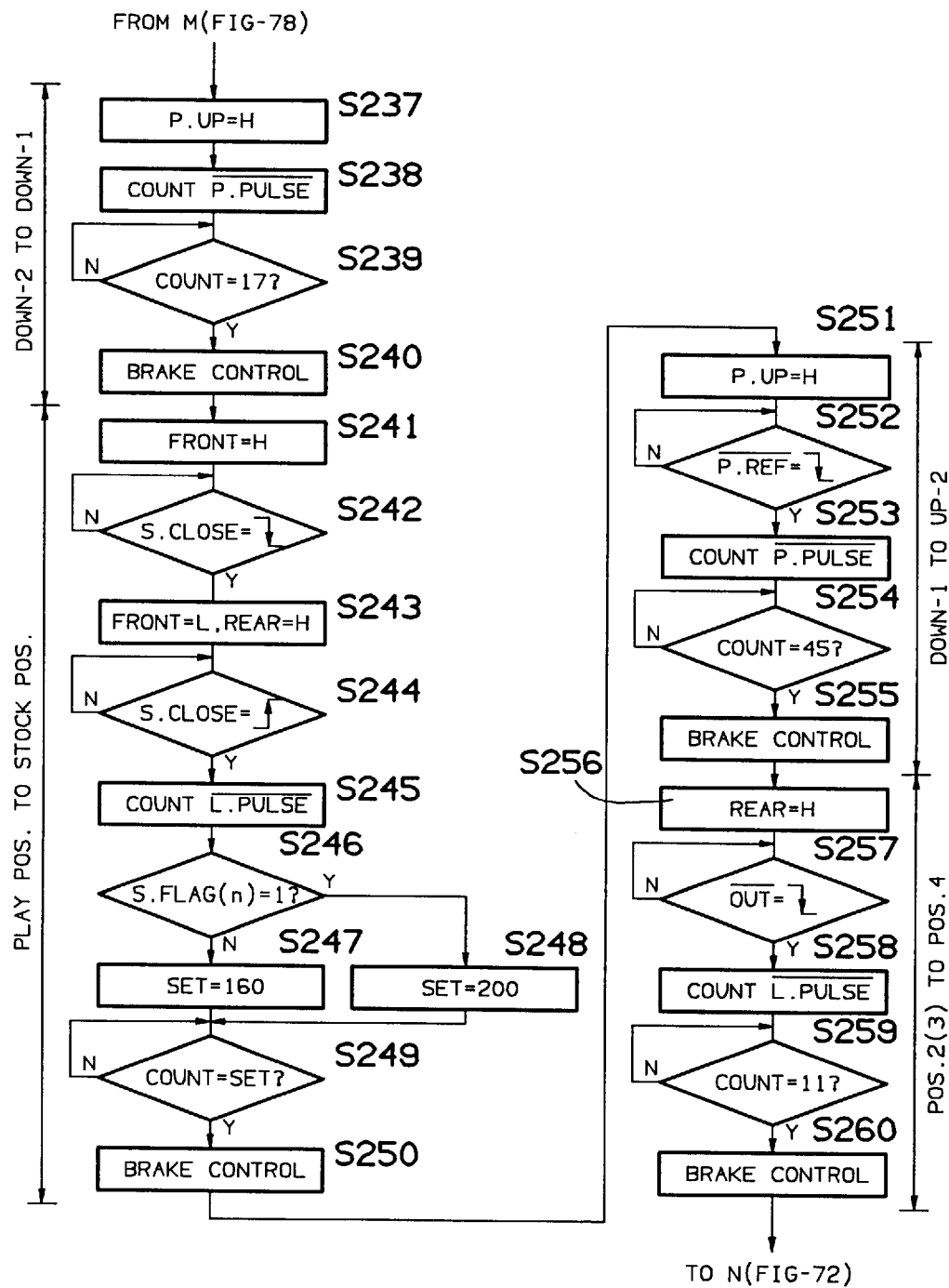
FIG. 79 is a flowchart of the JOB EJECT procedure.

If, at step S151 described above, the values for m and n differ, controller 300 proceeds to step S170 (FIG. 76). Steps S170–S210 perform the same operations as steps S11–S142. Thus, loading plates 81L and 81R are moved from open position POS.4 to a position just short of support position POS.3 (for large disks, POS.2 for small-diameter disks); sliding plate 75 is moved from position UP-2 to position DOWN-1; disk D, d, is moved from the playback position, to the stock position; sliding plate 75 is moved from position DOWN-1 to position UP-2; and loading plates 81L and 81R are moved to the open position POS.4. Controller 300 then proceeds to step S72 (FIG. 72). From step S72, operation proceeds through steps S73–S92 where stocker 1011 is moved to POS(m) and loading plates 81L and 81R close around the disk. Control proceeds to S93 through S109 where sliding plate 75 is moved from UP-2 to DOWN-1 lowering lower disk lock shaft 156 to unlock the disk and lowering optical mechanism 1006 to clear the way for movement of the disk. In steps S98–S109, the disk is moved to the eject position and lower disk lock shaft 156 locked again. Then control returns to the main routine.

Referring to FIGS. 72–79, when one of the E/L keys is pressed while the disk player is in the EJECT mode (M.FLAG=EJECT), controller 300 sets memory variable m equal to a value corresponding the E/L key pressed. For example, if E/L key 3 is pressed (step S7), the value 3 is stored in internal memory variable m (step S16). Controller 300 then proceeds from the main control flow diagram to step S220 in FIG. 78 via step S70 of FIG. 72 and step S150 of FIG. 75. At step S220, the status of M.FLAG is checked. In this case, M.FLAG=EJECT, so control to proceeds to step S221. At step S221 control branches step S20 if the values of m and n are the same, indicating that the E/L key pressed corresponds to the current stocker position. In steps S20–S40 to S41–S50, disk D, d is brought from the eject position to the playback position, clamped, loading plates 81L and 81R retracted to release disk D, d, the disk player placed in standby mode, and control returned to the main routine.

If, in step S221, the values for m and n are not identical, controller 300 proceeds through steps S222–S236, which perform the same operations as steps S20–S34 described earlier. That is, in steps S222–S236, disk D, d is brought from the eject position to the playback position. In steps S237–S240, controller 300 moves sliding plate 75 from position DOWN-2 to position DOWN-1 as follows. At step S237 (FIG. 79), controller 300 outputs high (H) at signal P.UP causing sliding plate 75 to begin moving to the right side of housing 1000. At step S238, controller 300 begins counting signal P. PULSE. Control loops through step S107 until the count value reaches 17 indicating sliding plate 75 has arrived at position DOWN-1. At step S240, signal P.UP and signal P.DWN are set high (H) for 50 msec, electromagnetically braking motor 251. As a result of sliding plate 75 being moved to position DOWN-1, lower disk lock shaft 156 is in the unlock position, permitting disk D, d to be moved to the stock position.

Steps S241–S260 perform the same functions as steps S182–S210 described above. That is, controller 300 moves disk D, d, from the playback position to the stock position; sliding plate 75 from position DOWN-1 to position UP-2; and loading plates 81L and 81R to open position POS.4. Control then passes to step S72 (FIG. 72). From step S72, operation proceeds through steps S73–S92 where stocker 1011 is moved to POS(m) and loading plates 81L and 81R closed around the disk. Then control proceeds to steps S93 through S197 where sliding plate 75 is moved from UP-2 to DOWN-1 lowering disk lock shaft 156 to unlock the disk and lowering optical mechanism 1006 to clear the way for movement of the disk. Then, in steps S98–S109, the disk is moved to the eject position and lower disk lock shaft 156 locked again. Finally control returns to the main routine.

Figure 68:
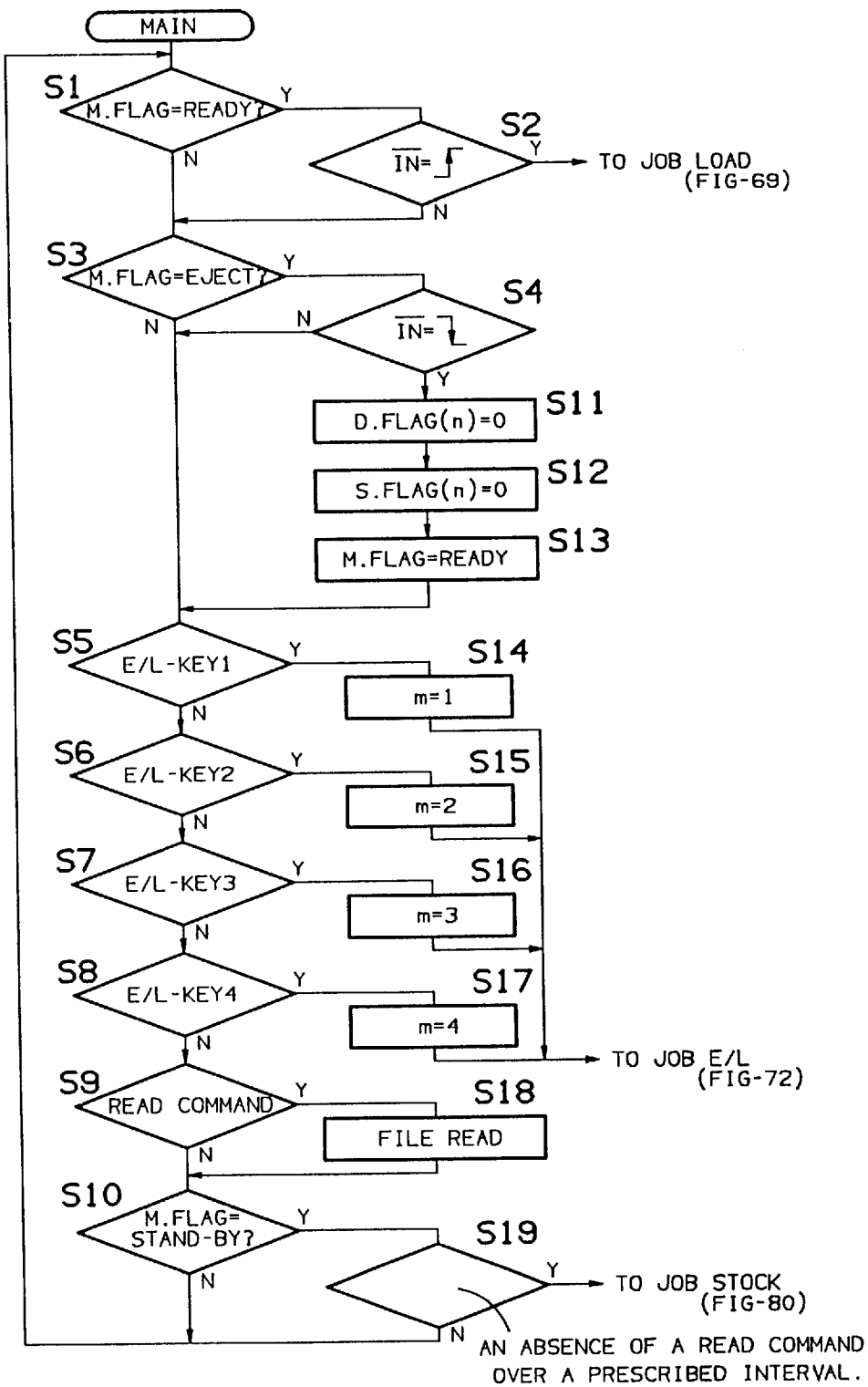
FIG. 68 is a flowchart of a main procedure of system controller 300.

When an externally connected computer 303 (FIG. 67) sends a read command, control proceeds from step S9 to step S18 in the main routine shown in FIG. 68. The various mechanisms are controlled, as described above, to bring the selected disk D, d to the playback position and the stand-by mode activated. The read command for the specified file is sent to signal processing circuit 307 and servo circuit 308. The read signal generated by optical pickup amp 2 is sent to signal processing circuit 307 via RF amp 309. After EFM demodulation, deinterleaving, error correction and other usual operations are performed, the signal is sent to externally connected computer 303 via interface circuit 302. Once the reading of the specified file is complete, controller 300 stops signal processing circuit 307 and servo circuit 308. M.FLAG is then set again to STAND-BY and controller 300 returns to the main routine.

Figure 80:
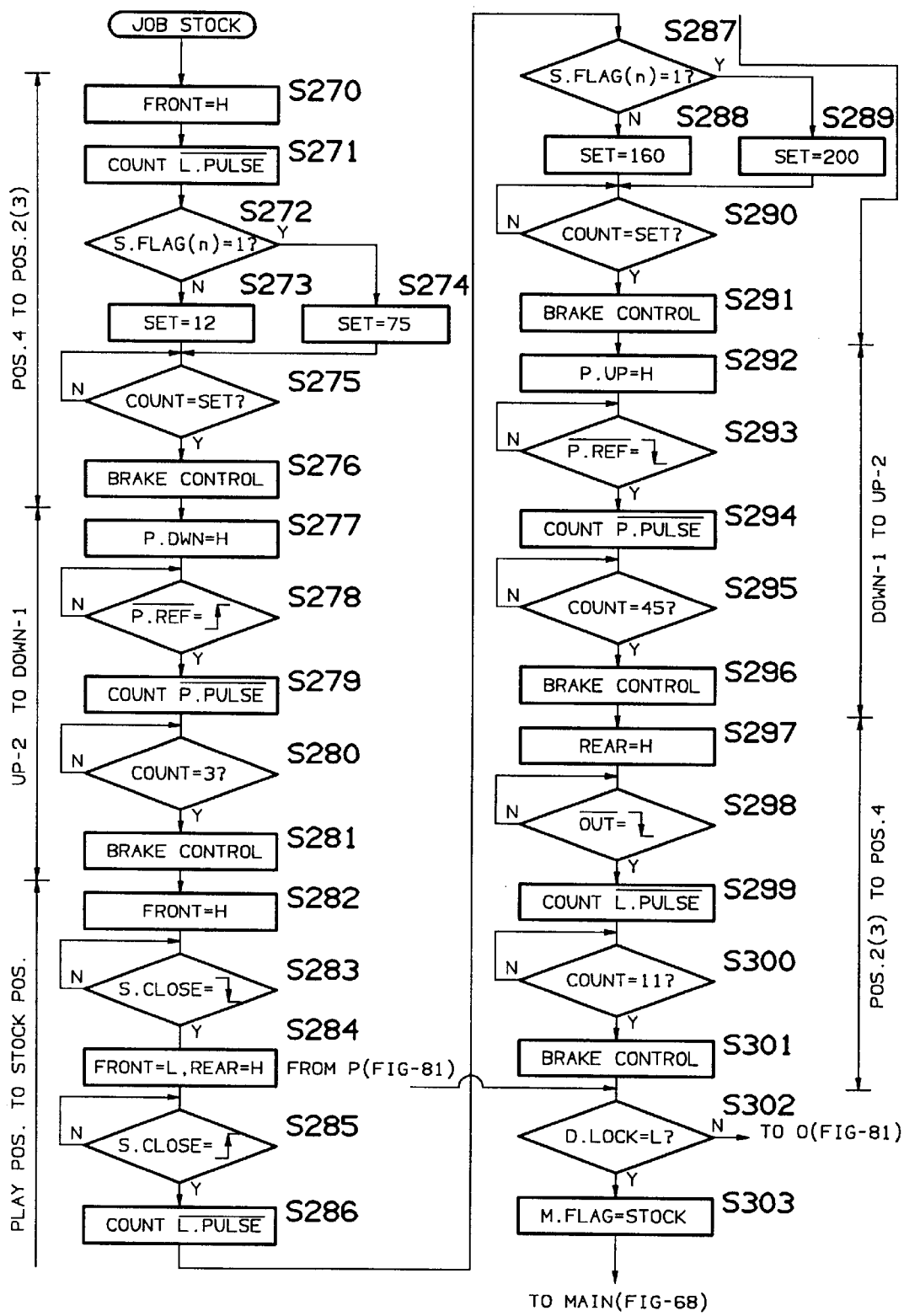
FIG. 80 is a flowchart of the JOB STOCK procedure.
Figure 81:
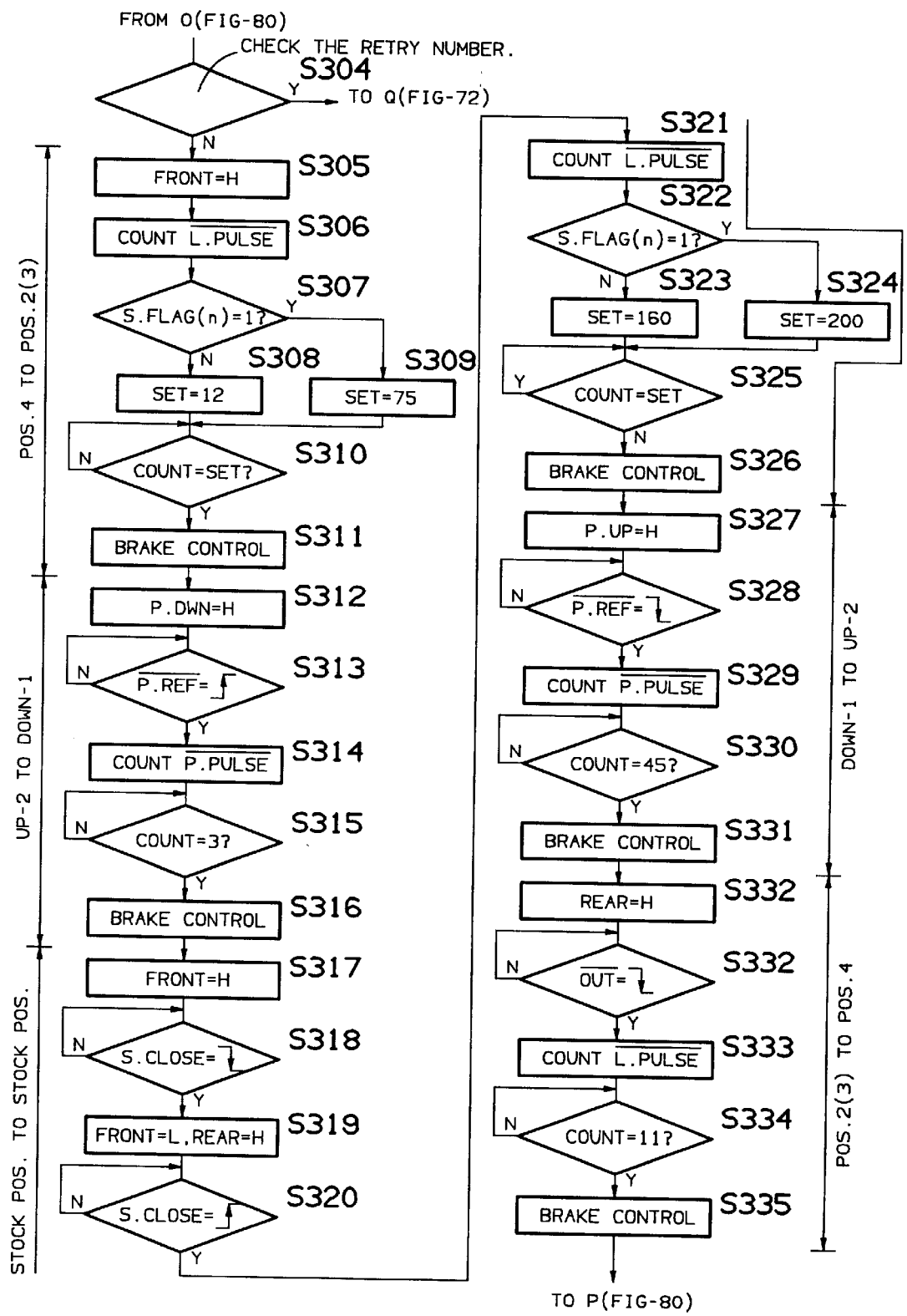
FIG. 81 is a flowchart of the JOB STOCK procedure.

Referring to FIGS. 68, 80, and 81, if, while in stand-by mode, controller 300 does not receive a read command from computer 303 for a prescribed interval, for example, 10 minutes, then controller 300 proceeds from step S10 to step S19 to step S270 (FIG. 80). Steps S270–S301, perform the same operations as steps S111–S142, described above. Thus, loading plates 81L and 81R are moved from open position POS.4 to a position just short of support position POS.3 (for large disks, or position POS.2 for small-diameter disks); sliding plate 75 is moved from position UP-2 to position DOWN-1; disk D, d, is brought from the playback position, to the stock position; sliding plate 75 is brought from position DOWN-1 to position UP-2; and loading plates 81L and 81R are moved to open position POS.4. Control branches from step S302 to step S303 if signal D.LOCK is low (L) In step S303, M.FLAG is set to STOCK at step S303. Control then returns to the main routine.

If signal D.LOCK does not pass to a low state at step S302, indicating that it is misaligned, then controller 300 proceeds to step S304 (FIG. 81). In steps S304–S335, controller 300 moves the disk toward the front until shutter 120 opens and then returns it to a point where shutter 120 closes again, thereby registering the disk again. The disk is then brought again to the stock position. Controller 300 returns to step S302 shown in FIG. 80, and signal D.LOCK is checked again. The details of the operations performed in steps S304–S336 are identical to the operations performed in steps S110–S142 described above, so the description is omitted here.

Figure 83:
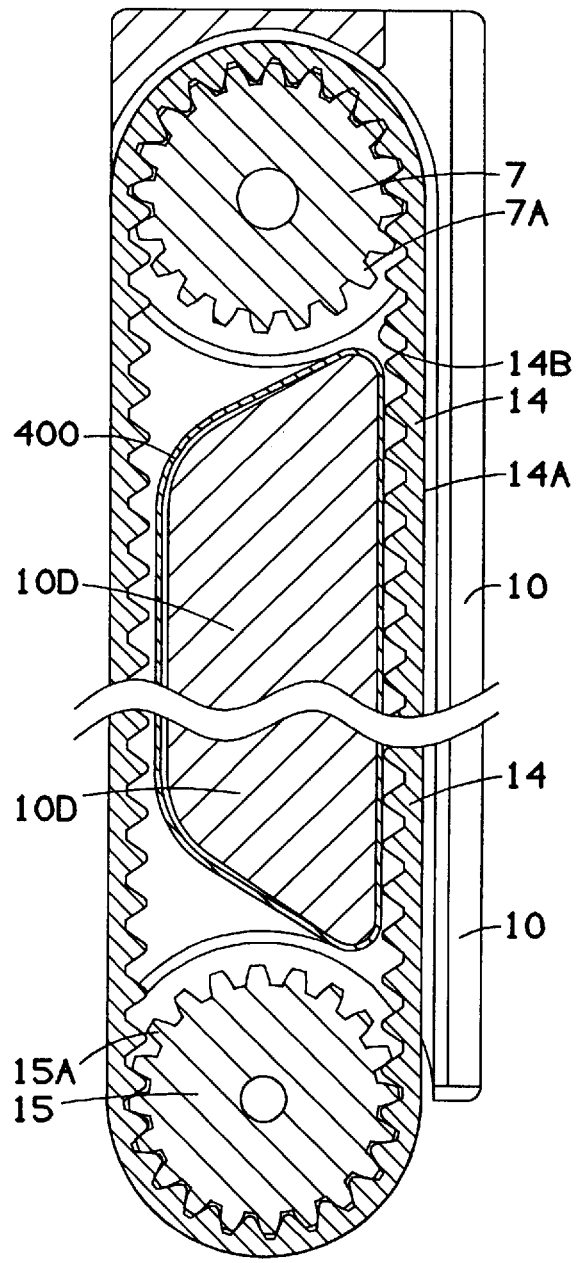
FIG. 83 is a cross-section of a second embodiment of the drive-side disk guide.

Referring to FIG. 83, a second embodiment of a support for timing belt 14 provides smoother operation. An endless teflon sheet 400 having a low friction coefficient is wrapped around the peripheral surface of a guide wall 10D, which supports timing belt 14. Thus, when timing belt 14 is revolved, teflon sheet 400 lubricates the adjacent sliding surfaces of timing belt 14 and guide wall 10D. This provides smoother sliding compared to direct contact between timing belt 14 and guide wall 10D. Of course, the teflon sheet can be made from another material having a low friction coefficient.

Figure 84:
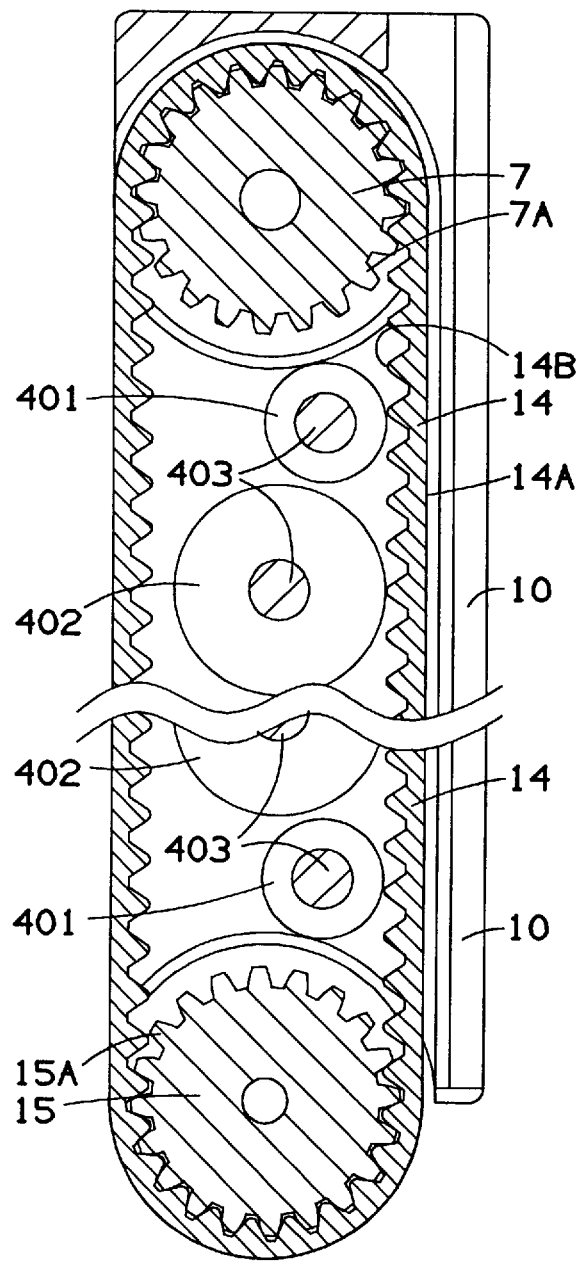
FIG. 84 is a cross-section of a third embodiment of the drive-side disk guide.

Referring to FIG. 84, a third embodiment of drive-side disk guide 1002, also provides low friction support for timing belt 14. In this embodiment, small-diameter rollers 401 alternate with large-diameter rollers 402 on the inside of timing belt 14. The rollers are supported on shafts 403. Inward flexure of timing belt 14 could also be effectively prevented by using just small-diameter rollers 401, but such an arrangement has poor potential from a production cost standpoint. By using large rollers and small rollers in an alternating pattern, it is possible to achieve nearly the sam result with fewer components, thereby reducing production cost while effectively preventing inward flexure of timing belt 14.

Figure 85:
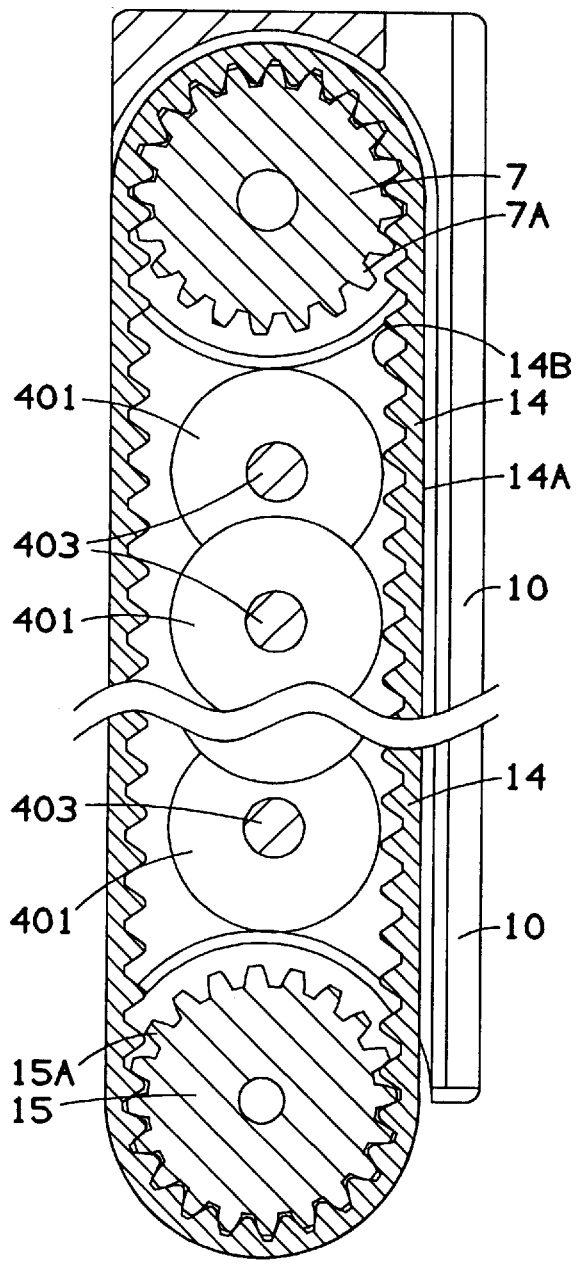
FIG. 85 is a cross-section of a fourth embodiment of the drive-side disk guide.

Referring to FIG. 85, a fourth embodiment of drive-side disk guide 1002 also provides low friction support of timing belt 14. In this embodiment, the distances between shafts 403 of rollers 401 are made smaller than the diameter of rollers 401. Thus, rollers 401 overlap each other. This decreases the interval between support points (the points of contact between rollers 401 and the inside surface of timing belt 14) thereby improving the support and straightness of timing belt 14.

Figure 86:
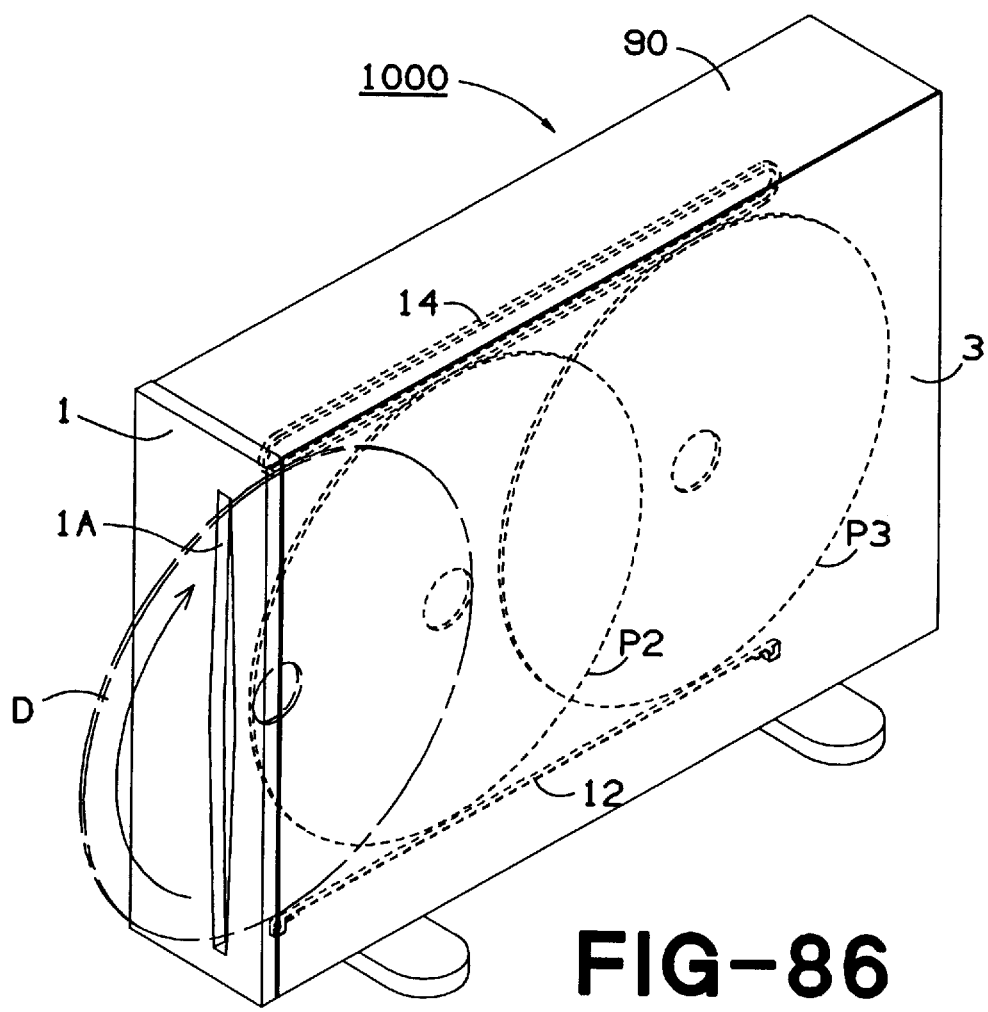
FIG. 86 is a perspective drawing indicating an alternative embodiment of the disk player in which the disk player is mounted vertically.

Referring to FIG. 86, although the embodiment of the invention described above is a horizontal configuration in which CD's are inserted, stored, and transported with their recording surfaces horizontal, an alternative embodiment could be a vertical configuration. In a vertical configuration, timing belt 14 would be optimally located on the upper side, and disk D would be inserted from insertion aperture 1A in front panel 1. Disk D would then rotate with its top moving toward the back of the disk player as it is fed and rotated. This would provide a natural feel to the user as opposed to having to push the bottom in faster than the top of the CD.

Although the above embodiments describe a CD player with a built-in changer mechanism, many aspects of the invention may be applied to a single disk player as well with or without internal CD storage capability.

Although in the embodiments described, the disk transfer mechanism has a moving drive belt and a fixed disk guide causing the disk to roll while it is transported, it is also possible that both sides of the disk could be supported with moving drive belts. In the latter configuration, the disk would not roll during transport.

Although in the embodiments described above, a drive belt and a disk guide are interconnected by a rack and pinion mechanism so that they each move apart and together with no net movement between them. Thus, when a disk is inserted, they each move the same distance. However, it would also be possible, for example, to fix the drive belt and have only the disk guide move responsively to the insertion of a disk. In this case, depending on whether the inserted disk is a 120 mm disk or an 80 mm disk, the center of the disk would track a different line inside the disk player. However, either type of disk could be accommodated by employing a read mechanism capable of moving laterally in response to the size of disk inserted.

Although in the embodiments described above, a disk guide 11E is located at an end of friction belt 12, it is clear from the present disclosure, that a disk guide 11E could be located at the end of timing belt 14. This would achieve a similar effect and advantage as the disk guide described above. Either a single disk guide could be located at a respective end of either the friction belt or the timing belt or two disk guides could be used, one for each of the friction belt and the timing belt. Any of the above configurations are considered to be within the bounds of the present invention and enabled by the present disclosure.

As described above, the present invention allows transporting of disks regardless of the diameter of the disk since the distance between the pair of disk transporting means, when a disk is not inserted, is smaller than the diameter of the disk to be inserted.

In the above embodiment, the present invention is implemented in a changer-type disk player. However, the present invention is not restricted to this, and can be implemented in a single disk player that is not a changer-type player.

In the embodiments described above, the disk is transferred by a drive belt system. However it is clear from the description that the invention can be applied to disk players with other transport mechanisms. For example, a device the holds the disk by the disk edges by means for rollers or a movable tray-type support could be used. Such alternative embodiments are considered to be in the scope of the present invention.

In the embodiments described above, the clamper is moved and held to the turntable by means of magnetic attraction. However it is clear from the description that the invention can be applied to disk players that employ other mechanisms for moving a clamper to the turntable and urging it against the turntable surface. For example, the lifting mechanism could also incorporate a spring or other mechanical means for forcing the clamper toward the turntable, with a bearing to isolate the means for forcing from the rotating clamper, as well as the means for lifting the clamper. Such alternative embodiments are considered to be in the scope of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk playback device, comprising:
    a turntable having a disk mounted thereon;
    a clamper, on a side of said disk opposite said turntable, for clamping said disk to said turntable;
    supporting means for supporting said clamper at a first position away from said disk prior to a clamping of said disk; and
    said supporting means inclicing means for releasing said clamper, whereby said clamper is freed to move toward said disk;
    a chassis;
    said turntable and said supporting means being connected to chassis;
    said disk having a recording surface;
    said supporting means including a first engagement element being movably connected to said chassis and movable in direction parallel to said recording surface;
    said supporting means also including a second engagement element connected to said clamper;
    said first engagement element engaging and moving said second engagement element when said first engagement element is moved in a first direction, said moving of said second engagement element being such that said clamper is moved away from said disk; and
    said first engagement element releasing said second engagement element when said first engagment element is moved in a direction opposite said first direction;
    said first engagement element including a lifting surface substantially inclined with respect to said recording surface;
    said second engagement element being guided by said lifting surface to move said second engagment element and, thereby, move said clamper away from said disk;

said first engagement element including a detecting surface substantially inclined with respect to said recording surface such that said detecting surface and said lifting surface form oppositely directed angles with respect to said recording surface;

said disk having a center holes;

a spindle on said turntable for insertion into said center hole when said spindle is aligned with said hole;

means for inserting said spindle in said center hole;

means for pressing a portion of said clamper against said detecting surface when said spindle hole is not aligned with said center hole.

2. A disk player, comprising:

a turntable having a disk mounted thereon;

a clamper, on a side of said disk opposite said turntable, for clamping said disk to said turntable;

supporting means for supporting said clamper at first position away from said disk prior to a clamping of said disk; and said supporting means including means for releasing said clamper, whereby said clamper is freed to move toward said disk;

said disk having a center hole;

a spindle on said turntable for insertion into said center hole when said spindle is aligned with said hole;

means for inserting said spindle in said center hole; and means for detecting a misalignment between said center hole and said spindle by detecting a movement of said clamper;

said disk has a back surface opposite a recording surface;

said means for inserting moves said spindle toward said disk to insert said spindle and presses said spindle against said recording surface when said center hole is not aligned with said spindle;

said means for insertinig is operated to insert said spindle in said center hole prior to a release of said clamper; and said means for detecting a misalignment including means for detecting an irregular movement of said clamper prior to said release of said clamper, said irregular movement being caused by said back surface pushing against said clamper as a result of a pressing of said spindle against said recording surface.

3. A disk player, comprising:

a turntable having a disk mounted thereon;

a clamper, on a side of said disk opposite said turntable, for clamping said disk to said turntable;

supporting means for supporting said clamper at a first position away from said disk prior to a clamping of said disk;

said supporting means including releasing said clamper, whereby said clamper is freed to move toward said disk;

said disk having a center hole;

a spindle on said turntable for insertion into said center hole when said spindle is aligned with said hole;

means for inserting said spindle in said center hole; and means for detecting a misalingnment between said center hole and said spindle by detecting a movement of said clamper;

said disk has a back surface opposite said recording surface;

said means for inserting moves said spindle toward said disk to insert said spindle and presses said spindle against one of said recording surface and said back surface when said center hole is not aligned with said spindle;

said means for inserting is operated to insert said spindle in said center hole prior to a release of said clamper; and said means for detecting a misalignment including means for detecting an irregular movement of said clamper prior to said release of said clamper, said irregular movement being caused by the other of said recording surface and said back surface pushing against said clamper as a result of a pressing of said spindle against said one of said recording surface said back surface.

\* \* \* \* \*